US012528265B2

(12) United States Patent
Langen

(10) Patent No.: US 12,528,265 B2
(45) Date of Patent: Jan. 20, 2026

(54) METHOD AND APPARATUS FOR ERECTING CARTONS AND FOR ORDER FULFILMENT AND PACKING

(71) Applicant: H. J. Paul Langen, Brampton (CA)

(72) Inventor: H. J. Paul Langen, Brampton (CA)

( * ) Notice: Subject to any disclaimer, the term of this patent is extended or adjusted under 35 U.S.C. 154(b) by 147 days.

(21) Appl. No.: 18/230,425

(22) Filed: Aug. 4, 2023

(65) Prior Publication Data

US 2023/0382074 A1 Nov. 30, 2023

Related U.S. Application Data

(63) Continuation of application No. 16/808,140, filed on Mar. 3, 2020, now Pat. No. 11,752,723, which is a continuation-in-part of application No. 16/677,139, filed on Nov. 7, 2019, now Pat. No. 11,390,049.

(51) Int. Cl.

| | |
|---|---|
| ***B31B 50/00*** | (2017.01) |
| ***B31B 50/02*** | (2017.01) |
| ***B31B 50/07*** | (2017.01) |
| ***B31B 50/26*** | (2017.01) |
| ***B65H 5/08*** | (2006.01) |

(52) U.S. Cl.

CPC ............ *B31B 50/07* (2017.08); *B31B 50/022* (2017.08); *B31B 50/262* (2017.08); *B65H 5/08* (2013.01); *B65H 2701/1764* (2013.01)

(58) Field of Classification Search

CPC ....... B31B 50/04; B31B 50/044; B31B 50/06; B31B 50/07; B31B 50/022; B31B 50/26; B31B 50/262; B31B 2100/00; B31B 2120/30; B65H 5/08; B65H 2701/1764

USPC ................................ 493/313, 315, 183, 309

See application file for complete search history.

(56) References Cited

U.S. PATENT DOCUMENTS

| | | | |
|---|---|---|---|
| 1,434,230 | A | 10/1922 | Richardson |
| 1,471,924 | A | 10/1923 | Saylor et al. |
| 2,786,316 | A | 3/1957 | Silva et al. |
| 2,869,297 | A | 1/1959 | Neer |
| 2,879,638 | A | 3/1959 | Hill |
| 2,900,778 | A | 8/1959 | Hartbauer |
| 2,902,810 | A | 9/1959 | McGihon |

(Continued)

FOREIGN PATENT DOCUMENTS

| | | | |
|---|---|---|---|
| CA | 2700657 | C | 11/2007 |
| CA | 2712878 | C | 2/2011 |

(Continued)

OTHER PUBLICATIONS

Non-Final Office Action mailed Sep. 24, 2024, by the USPTO, in U.S. Appl. No. 17/459,936.

(Continued)

*Primary Examiner* — Jacob A Smith

(57) ABSTRACT

A system and method of packing an order. A first sequence of bins corresponding to orders is transported on a first conveyor to a packing station. A case for each order is constructed by a case forming system, the case forming system able to construct cases from blanks of various sizes. The cases are transported from the case construction apparatus to the packing station in a second sequence, wherein the sequential order of the cases corresponds to the bins in the first sequence. The bin in the first sequence are brought to the packing station with the cases in the second sequence.

8 Claims, 45 Drawing Sheets

(56) References Cited

U.S. PATENT DOCUMENTS 3,292,813 A 12/1966 Roegner
3,461,642 A 8/1969 Langen et al.
3,619,967 A 11/1971 Alduk
3,698,151 A 10/1972 Arneson
3,716,962 A 2/1973 Langen et al.
3,757,486 A 9/1973 Feurston et al.
3,940,907 A 3/1976 Ganz
4,010,593 A 3/1977 Graham
4,010,597 A 3/1977 Nelson
4,031,817 A 6/1977 Raschke
4,061,081 A 12/1977 Pinto et al.
4,109,444 A 8/1978 Lee
4,163,414 A 8/1979 Bachman, Jr. et al.
4,213,285 A 7/1980 Mancini
4,414,789 A 11/1983 Pattarozzi
4,553,954 A 11/1985 Sewell et al.
4,569,182 A 2/1986 Leuvering
4,823,539 A 4/1989 Kuckhermann et al.
4,915,678 A 4/1990 Morita
4,942,720 A 7/1990 Berney
5,024,640 A 6/1991 Saitoh
5,060,451 A 10/1991 DeMay et al.
5,061,231 A 10/1991 Dietrich et al.
5,105,600 A 4/1992 DePoint, Jr. et al.
5,106,359 A 4/1992 Lott
5,115,625 A 5/1992 Barbulesco et al.
5,145,070 A 9/1992 Pallett et al.
5,207,630 A 5/1993 Decker et al.
5,341,626 A 8/1994 Beckmann
5,352,178 A 10/1994 Pazdernik
5,393,291 A 2/1995 Wingerter
5,411,464 A 5/1995 Calvert et al.
5,440,852 A 8/1995 Lam
5,456,570 A 10/1995 Davis et al.
5,531,852 A 7/1996 Walsh et al.
5,624,368 A 4/1997 Cromwell
5,626,002 A 5/1997 Ford et al.
5,720,156 A 2/1998 Bridges et al.
5,782,064 A 7/1998 Beeman
5,997,458 A 12/1999 Guttinger et al.
6,032,853 A 3/2000 Chevalier
6,099,450 A * 8/2000 Schenone ............... B31B 50/00
493/110
6,226,965 B1 5/2001 Lam
6,378,275 B1 4/2002 Andersson
6,588,175 B1 7/2003 Gaudenzi
6,688,075 B2 2/2004 Cristina
6,721,762 B1 4/2004 Levine et al.
6,764,436 B1 7/2004 Mazurek
6,799,671 B1 10/2004 Gomes
6,876,958 B1 4/2005 Chowdhury et al.
6,912,762 B2 7/2005 Lile et al.
6,913,568 B2 7/2005 Frank et al.
6,955,032 B2 10/2005 Smith
6,968,668 B1 11/2005 Dimario et al.
7,093,408 B2 8/2006 Duperray et al.
7,131,941 B2 11/2006 Makar et al.
7,174,698 B2 2/2007 Spatafora et al.
7,243,481 B2 7/2007 Draghetti
7,326,165 B2 2/2008 Baclija et al.
7,404,788 B2 7/2008 Monti
7,510,517 B2 3/2009 Goodman
7,682,122 B2 3/2010 Maynard et al.
7,720,567 B2 5/2010 Doke et al.
7,788,881 B2 9/2010 Johnson et al.
7,828,708 B2 11/2010 Huang et al.
7,832,183 B2 11/2010 Jacob et al.
7,988,406 B2 8/2011 Schafer
7,991,505 B2 8/2011 Lert, Jr. et al.
8,156,013 B2 4/2012 Dearlove et al.
8,340,812 B1 12/2012 Tian et al.
8,365,389 B2 2/2013 Taylor
8,622,883 B2 1/2014 Flynn
8,671,654 B2 3/2014 Langen
8,961,380 B2 2/2015 Langen
9,061,477 B2 6/2015 Chandaria
9,090,400 B2 7/2015 Wurman et al.
9,114,897 B2 8/2015 Kim et al.
9,126,380 B2 9/2015 Dittmer et al.
9,315,344 B1 4/2016 Lehmann
9,336,509 B1 5/2016 Arun Singhal et al.
9,714,145 B1 7/2017 Lehmann
9,718,570 B1 8/2017 Ortiz et al.
9,796,080 B2 10/2017 Lindbo et al.
9,927,815 B2 3/2018 Nusser et al.
9,975,699 B2 5/2018 Yamashita
10,074,073 B2 9/2018 Stevens et al.
10,214,353 B2 2/2019 Solignac
10,233,019 B2 3/2019 Lert
10,248,112 B2 4/2019 Zhu et al.
10,471,597 B1 11/2019 Murphy et al.
10,489,870 B2 11/2019 Asaria et al.
10,556,713 B2 2/2020 Langen
10,618,736 B2 4/2020 Khodl et al.
11,332,311 B2 5/2022 Fosnight et al.
2003/0200111 A1 10/2003 Damji
2004/0112520 A1 6/2004 Hanschen et al.
2004/0148911 A1 8/2004 Hermodsson et al.
2004/0168408 A1 9/2004 Spatafora
2005/0079966 A1 4/2005 Moshier et al.
2006/0096242 A1 5/2006 Makar et al.
2006/0096712 A1 5/2006 Makar et al.
2006/0277269 A1 12/2006 Dent et al.
2007/0038673 A1 2/2007 Broussard et al.
2007/0072755 A1 3/2007 Monti
2007/0197364 A1 8/2007 Monti
2007/0204567 A1 9/2007 Wintring et al.
2008/0067225 A1 3/2008 Moore
2008/0110135 A1 5/2008 Jacob et al.
2008/0141632 A1 6/2008 Monti
2009/0239726 A1 9/2009 Huang
2009/0277134 A1 11/2009 Jacob et al.
2009/0319395 A1 12/2009 Chandaria
2010/0263333 A1 10/2010 Langen
2011/0111939 A1 5/2011 Bassi
2011/0297559 A1 12/2011 Davis
2012/0094817 A1 4/2012 Monti
2013/0039731 A1 2/2013 Lundgren et al.
2013/0218799 A1 8/2013 Lehmann et al.
2013/0247519 A1 9/2013 Clark et al.
2014/0179501 A1* 6/2014 Akama ................ B31B 50/262
493/162
2014/0260119 A1 9/2014 Baltes et al.
2015/0072847 A1 3/2015 Graham et al.
2015/0072848 A1 3/2015 Graham et al.
2015/0073587 A1 3/2015 Vliet et al.
2015/0087491 A1 3/2015 Langen
2015/0225104 A1 8/2015 Reed
2015/0291295 A1 10/2015 Langen
2015/0324893 A1 11/2015 Langen
2016/0129587 A1 5/2016 Lindbo et al.
2016/0304281 A1 10/2016 Elazary et al.
2018/0065807 A1 3/2018 Lert, Jr.
2018/0086019 A1 3/2018 Langen
2018/0126683 A1* 5/2018 Johnson ................ B31B 50/046
2018/0150793 A1 5/2018 Lert, Jr. et al.
2018/0327161 A1 11/2018 Helms
2019/0152703 A1 5/2019 Sellner et al.
2019/0160774 A1 5/2019 Langen
2020/0039744 A1 2/2020 Lert et al.
2020/0087010 A1 3/2020 Almogy et al.
2020/0254707 A1 8/2020 Iwasa et al.
2020/0406570 A1 12/2020 Hirata et al.
2021/0016905 A1 1/2021 Lindbo et al.
2021/0237385 A1 8/2021 Fridolfsson

FOREIGN PATENT DOCUMENTS

CA 3023959 A1 11/2017
CA 3044850 A1 6/2018
CN 108891698 A 11/2018
DE 2250667 C3 9/1980
DE 19726593 A1 1/1998
EP 0559604 A1 9/1993

(56) References Cited

FOREIGN PATENT DOCUMENTS

| | | | |
|---|---|---|---|
| EP | 1177980 | A2 | 2/2002 |
| EP | 3337739 | B1 | 2/2020 |
| GB | 2 096 093 | A | 10/1982 |
| WO | 96/032322 | A1 | 10/1996 |
| WO | 2013/142106 | A1 | 9/2013 |
| WO | 2014/161644 | A2 | 10/2014 |
| WO | 2017/081281 | A1 | 5/2017 |
| WO | 2018/197400 | A1 | 11/2018 |
| WO | 2019/021281 | A2 | 1/2019 |

OTHER PUBLICATIONS

Non-Final Office Action mailed by the USPTO on Mar. 28, 2024, for related U.S. Appl. No. 17/968,689.
International Search Report issued by the Canadian Intellectual Property Office on Nov. 30, 2021, in connection with International Patent Application No. PCT/CA2021/051193, 4 pages.
Written Opinion of the International Searching Authority issued by the Canadian Intellectual Property Office on Nov. 30, 2021, in connection with International Patent Application No. PCT/CA2021/051193, 5 pages.
Non-Final Office Action dated Aug. 17, 2021, in the related U.S. Appl. No. 16/677,139.
Non-Final Office Action dated Mar. 3, 2022, mailed in the related U.S. Appl. No. 16/262,163.
Non-Final Office Action dated Apr. 19, 2022, mailed in the related U.S. Appl. No. 16/569,298.
Notice of Allowance dated Jan. 19, 2023, mailed in the related U.S. Appl. No. 16/808,140.
International Search Report issued by the Canadian Intellectual Property Office on Feb. 12, 2021 in connection with International Patent Application No. PCT/CA2020/051502, 6 pages.
Written Opinion of the International Searching Authority issued by the Canadian Intellectual Property Office on Feb. 12, 2021 in connection with International Patent Application No. PCT/CA2020/051502, 9 pages.
International Search Report issued by the Canadian Intellectual Property Office on Jun. 27, 2013 in connection with International PCT Patent Application No. PCT/CA2013/000245 filed on Mar. 15, 2013, 5 pages.
Written Opinion of the International Searching Authority issued by the Canadian Intellectual Property Office on Jun. 27, 2013 in connection with International PCT Patent Application No. PCT/CA2013/000245 filed on Mar. 15, 2013, 6 pages.
International Preliminary Report on Patentability issued by the International Bureau of WIPO on Oct. 28, 2014 in connection with International PCT Patent Application No. PCT/CA2013/000245 filed on Mar. 15, 2013, 7 pages.
XPAK USA, LLC, XPAK ROBOX™—Robotic Random-Size Box Erector Brochure, http://www.xpakusa.com/pdf/XPAK%20-%20ROBOX%20Robotic%20Case%20Erector%20Model%20XP-E3000R.pdf (last printed Mar. 22, 2016).
Random Robotics Case Erector—obtained online https://motioncontrolsrobotics.com/product/random-robotic-case- erector/.
Robotics Case Erector and Installation Archive—obtained online from https://swspackaging.com/installations/robotic-case-erector-tote-tender-32217/.
"Pick2Pallet LED Light System—Designed for Order Picking", Video available online at: https://www.youtube.com/watch?v=msSBgPByolY, Jul. 11, 2017.
"Krones: Automatic order-picking system", Video available online at: https://www.youtube.com/watch?v=yU6OwsqETzl&t=84s, Feb. 15, 2010.
"New Concepts in Robotics for Distribution", Video available online at: https://www.youtube.com/watch?v=w7shAlf2Wjs, Apr. 19, 2011.
"DB Schenker implementing next generation e-commerce", Video available online at: https://www.youtube.com/watch?v=udr0OOxmPbc, Jan. 22, 2016.
"Advanced Automation with AutoStore Warehouse Robots", Video available online at: https://www.youtube.com/watch?v=ecftHVqxRpg&t=133s, Oct. 9, 2015.
"OPRA—Order Picking Robotic AGV", Video available online at: https://www.youtube.com/watch?v=yGhmOfAbi_U, Apr. 21, 2011.
"Smart automated machine loading with Pickit and Universal robots", Video available online at: https://www.youtube.com/watch?v=9fYcaisl1qY, Jun. 10, 2016.
"Pick it 3drobotvisionmadeeasy universalrobots depalletizing pallet crates flex", Video available online at: https://www.youtube.com/watch?v =-Js1DfvBq40, Jun. 9, 2016.
"Automated Bottle Pallet Unloader with FANUC Pick & Place Robot—Clear Automation", Video available online at: https://www.youtube.com/watch?v=qwbDX58FVFM, Sep. 2, 2016.
"Warehouse Pallet Robots and Pick Station", Video available online at: https://www.youtube.com/watch?v=S4H8_0X3SOY, Mar. 12, 2019.
"Swisslog ItemPiQ: Efficient robot-based automated item picking for order fulfillment", Video available online at: https://www.youtube.com/watch?v=qMsgnTq6C_s, Feb. 22, 2019.
"Solutech robot pallet picking", Video available online at: https://www.youtube.com/watch?v=rUrll1u64Qc, Mar. 26, 2015.
"Robotic order picking from pallets and flowracks by Robomotive", Video available online at: https://www.youtube.com/watch?v=07641Lfo81c, Sep. 18, 2018.
"Full Layer Glass Bottle and Case Palletizer / Depalletizer", Video available online at: https://www.youtube.com/watch?v=PGajWaQ9jNg&t=75s, Dec. 17, 2013.
"Pack, Seal & Palletize—Garbage Bag Rolls", Video available online at: https://www.youtube.com/watch?v=qFHUX6bqXcg, Sep. 24, 2019.
"Robotic Palletizing Cell with Accumulation—HSC & RSC Cases", Video available online at: https://www.youtube.com/watch?v=mF0yF5hTrZ8, Dec. 18, 2019.
"VPick™ Robot Guidance for Mixed Case Depalletizing", Video available online at: https://www.youtube.com/watch?v=z-FbC2CMmus&t=60s, Apr. 19, 2019.
"AQFlex® XS: advanced performance and unique agility in a compact design", Video available online at: https://www.youtube.com/watch?v=prx18DnJjTw, May 5, 2017.
"Intralox ARB Technology, Enabling Rapid Depalletizing (6 of 6)", Video available online at: https://www.youtube.com/watch?v=1kdMZCxiElc, Dec. 9, 2011.
"Depalletizing Robot | Autotec Solutions", Video available online at: https://www.youtube.com/watch?v=8yOsG4t41Hc, Jul. 17, 2018.
"Autotec Solutions", Video available online at: https://www.youtube.com/channel/UCEtJjzx-G7nGvYgKqB4yitg, Jun. 27, 2018.
"Intralox ARB Depalletizing Systems", Video available online at: https://www.youtube.com/watch?v=YIRbmxGlzj4, Mar. 31, 2014.
"Combi RCE Robotic Random Case Erector installed by SWS Packaging", Video available online at: https://youtu.be/9-W9gfCtZhE, Aug. 13, 2017.
"Palletizing and Depalletizing | Honeywell Intelligrated", Video available online at: https://www.youtube.com/watch?v=8nFn6xnnTbc&t=83s, Oct. 4, 2018.
"The Magic Bus: A fully automated can depalletizer with pallet management", Video available online at: https://www.youtube.com/watch?v=y073yPWZSx0&t=258s, Apr. 9, 2020.
"Dual Case Robotic Palletizing System with Corner Board Stretch Wrapper—Kaufman Engineered Systems", Video available online at: https://www.youtube.com/watch?v=h4tyZt2seVE, May 12, 2017.
"Automated Depalletizing System Uses FANUC Robots for Complex Depalletizing—PASCO", Video available online at: https://www.youtube.com/watch?v=VVz3xNIjYAk, Jan. 16, 2015.
"Automated Pallet Jack Order Selection.wmv", Video available online at: https://www.youtube.com/watch?v=g_-V31UL4Ww&t=98s, Mar. 5, 2010.
"System Logistics APPS: Automatic Pick to Pallet System", Video available online at: https://www.youtube.com/watch?v=v5bPGIgENP8, Oct. 15, 2013.
"A look inside one of Amazon's robotic fulfillment centers", Video available online at: https://youtu.be/YL9XjyXsKKk, Jan. 2, 2019.

(56) References Cited

OTHER PUBLICATIONS

"Automatic Horizontal Baler / Baling Press Machine (HBA150-110130)", Video available online at: https://youtu.be/vLbAbSLBSyY, Jun. 28, 2018.
"Poly bagmaker inserter FLEXIM-31", Video available online at: https://youtu.be/D88VRdm68mk, Mar. 20, 2017.
"Inside Amazon's Fulfillment Center in Kent, Washington", Video available online at: https://youtu.be/Zm0toTbg8J4, May 31, 2018.
"The Grand Theory of Amazon", Video available online at: https://youtu.be/UyohSu-Ft_U, Jun. 2, 2018.
"How Amazon Receives Your Inventory", Video available online at: https://youtu.be/dAXdeqcHBp4, Dec. 23, 2013.
"Inside An Amazon Warehouse on Cyber Monday", Video available online at: https://youtu.be/qRQwkJLRfWw, Nov. 28, 2016.
Non-Final Office Action dated Oct. 16, 2023, mailed by the USPTO in the related U.S. Appl. No. 16/262,163.
"Order Fulfillment Process", Video available online at: https://youtu.be/jqaJAfmBvBM, Mar. 7, 2015.
"E-Commerce Automation at Newegg's Robotic Distribution Center", Video available online at: https://youtu.be/ZBRoXW6YtGI, Oct. 16, 2018.
"Picking: A logistics centre sectored in different areas", Video available online at: https://youtu.be/9KAXH-D05XU, Mar. 31, 2017.
"Witron realizes automated logistics center of E.Leclerc SOCARA", Video available online at: https://youtu.be/qLCSHUqhnYs, Oct. 8, 2018.
"Thomann, New logistics centre for eCommerce-giant (english)", Video available online at: https://youtu.be/NRLpIXRqs78, Jun. 27, 2017.
"Inside A Warehouse Where Thousands Of Robots Pack Groceries", Video available online at: https://youtu.be/4DKrcpa8Z_E, May 9, 2018.
"Inside Alibaba's smart warehouse staffed by robots", Video available online at: https://youtu.be/FBI4Y55V2Z4, Sep. 20, 2017.
"Automated warehouse solutions for CSH | SSI Schaefer", Video available online at: https://youtu.be/xKrQQYHMT-A, Oct. 8, 2018.
"Corrugated Boxes: How It's Made Step By Step Process | Georgia-Pacific", Video available online at: https://youtu.be/C5nNUPNVWAw, Mar. 16, 2015.
"AGV Automation—Food Industry", Video available online at: https://youtu.be/dVR8Qmq1Ytl, Nov. 7, 2016.
"RCE Random Robotic Case Erector Bottom Taper", Video available online at: https://youtu.be/WEHgWYnSDmk, Oct. 10, 2017.
"Inside Edition Producer Goes Undercover to Deliver Amazon Packages", Video available online at: https://youtu.be/YzdEQJ9V-8M, Nov. 20, 2018.
"I went undercover as an Amazon delivery driver. Here's what I learned about the hidden costs of free shipping", Title retrieved at: https://www.thestar.com/news/investigations/2019/12/19/i-went-undercover-as-an-amazon-delivery-driver-heres-what-i-learned-about-the-hidden-costs-of-free-shipping.html, Dec. 19, 2019.
"Automated Decasing System Uses Six FANUC Robots to Decase Bottles—StrongPoint Automat", Video available online at: https://youtu.be/bTkz4RYkevQ, May 20, 2016.
"Automated labeling and palletizing, courtesy of StrongPoint Automation", Video available online at: https://youtu.be/X6ukaEe_vOM, Jan. 24, 2020.
"New Concepts in Robotics for Distribution", Video available online at: https://youtu.be/w7shAlf2Wjs, Apr. 19, 2011.
"Fruits Picking with FANUC", Video available online at: https://youtu.be/Xq2yTJs8NXI, Jun. 30, 2019.
"The Warehouse of the Future—WITRON's OPM Technology at Meijer in Wisconsin", Video available online at: https://youtu.be/bn5jjVKhFUs, Mar. 29, 2017.
"AutoStore | The Future of Warehousing is Reality | English", Video available online at: https://youtu.be/b3X3r5UVtEM, Jul. 29, 2015.
Notice of Allowance mailed by the USPTO on May 25, 2021, in the related U.S. Appl. No. 16/444,673.
International Search Report issued by the Canadian Intellectual Property Office on Aug. 8, 2013, in connection with International PCT Patent Application No. PCT/CA2013/000230, 5 pages.
Written Opinion of the International Searching Authority issued by the Canadian Intellectual Property Office on Aug. 8, 2013, in connection with International PCT Patent Application No. PCT/CA2013/000230, 8 pages.
International Preliminary Report on Patentability issued by the Canadian Intellectual Property Office on May 26, 2015, in connection with International PCT Patent Application No. PCT/CA2013/000230, 9 pages.
Non-Final Office Action dated Apr. 10, 2023, mailed in the related U.S. Appl. No. 17/459,936.
Non-Final Office Action dated Mar. 26, 2018, mailed in the related U.S. Appl. No. 14/646,321.
Non-Final Office Action dated Aug. 4, 2023, mailed in the related U.S. Appl. No. 17/827,171.

* cited by examiner

2912

| Product_ID | Product_L | Product_W | Product_D |
|---|---|---|---|
| 20576 | 16.8 | 21.5 | 22.8 |
| 20027 | 19.4 | 21.2 | 15.2 |
| 99178 | 23.7 | 28.3 | 27.0 |
| 62060 | 29.9 | 19.1 | 10.1 |
| 46097 | 6.4 | 14.7 | 6.7 |

3206

3208

2914

| Order ID | Bin ID | Product_IDs | Case Size | Dunnage_Type | Dunnage_Length | Packing Cell |
|---|---|---|---|---|---|---|
| 90001 | 9114 | 424234; 424234; 834588; | 5 | Bubble | 6.35 | 1 |
| 9000 | 9117 | 235873; 932293; | 7 | Paper | 2.73 | 6 |
| 90005 | 9118 | 578678 | 3 | Paper | 1.57 | 3 |
| 90006 | 9119 | 235238 | 8 | Paper | 3.47 | 4 |
| 90007 | 9120 | 667868; 281584; 273641; | 5 | Bubble | 4.41 | 5 |

3302 3304 3306 3308 3310 3312 3314

FIG. 33

| Case Size ID | Total Product Vol Min. | Total Product Vol Max. | Height | Width | Depth | Packing Cell |
|---|---|---|---|---|---|---|
| 1 | 500 | 1000 | 10 | 10 | 10 | 1,2,3 |
| 2 | 1001 | 3375 | 15 | 15 | 15 | 2,3,4 |
| 3 | 3376 | 8000 | 20 | 20 | 20 | 1,3,4 |
| 4 | 8001 | 15625 | 25 | 25 | 25 | 1 |
| 5 | 15626 | 27000 | 30 | 30 | 30 | 4 |

3502 3504 3506 3208 3510

2966

| Order ID | Bin ID | Case Size | Dunnage_Type | Dunnage_Length | Packing Cell |
|---|---|---|---|---|---|
| 90011 | 9124 | 2 | Paper | 6.34 | 1 |
| 90012 | 9127 | 3 | Paper | 3.47 | 1 |
| 90013 | 9128 | 3 | Paper | 9.38 | 1 |
| 90014 | 9129 | 1 | Paper | 2.73 | 1 |
| 90015 | 9120 | 4 | Paper | 1.57 | 1 |

3302 3304 3308 3310 3312 3314

METHOD AND APPARATUS FOR ERECTING CARTONS AND FOR ORDER FULFILMENT AND PACKING

CROSS-REFERENCE TO RELATED APPLICATION

This application is a continuation of U.S. patent application Ser. No. 16/808,140 filed on Mar. 3, 2020, which is a continuation-in-part of U.S. patent application Ser. No. 16/677,139 filed on Nov. 7, 2019 (now issued as U.S. Pat. No. 11,390,049 on Jul. 19, 2022), and the entire contents of both said applications are hereby incorporated herein by reference. This application is related to U.S. application Ser. No. 16/230,979, filed on Dec. 21, 2018, the entire contents of which are hereby incorporated herein by reference.

FIELD

The present invention relates generally to methods and systems for forming containers and for order fulfilment and order packing.

BACKGROUND

Containers are used to package many different kinds of items. One form of container used in the packaging industry is what is known generically as a "box" and it can be used to hold various items including products and sometimes other boxes containing products. Some in the packaging industry refer to boxes used to package one or more products as "cartons". Also in the industry there are containers/boxes that are known by some as "cases". Examples of cases include what are known as regular slotted cases ("RSC"). Another type of container is what is known as a "tray" which generally is formed only on five sides and has a permanently open top. Some types of trays are used to hold other boxes or cartons; some types of trays are used to hold products (e.g. trays are sometimes used to hold bottled water). In this patent document, including the claims, the words "carton" and "cartons" and "containers" are used collectively to refer to boxes, cartons, trays, and/or cases that can be used to package any type of items including products and other cartons.

Cartons come in many different configurations and are made from a wide variety of materials. However, many cartons are foldable and are formed from a flattened state—commonly called a carton blank. Cartons may be made from an assortment of foldable materials, including but not limited to cardboard, chipboard, paperboard, corrugated fibreboard, other types of corrugated materials, plastic materials, composite materials, and the like and possibly even combinations thereof.

In many known systems, carton blanks may be serially retrieved from a carton magazine, and reconfigured from a flattened state into an erected state, and placed in a slot on a carton conveyor. The erected carton may then be moved by the carton conveyor to a loading station where the carton may be filled with one or more items and then sealed.

To permit the carton blanks to be readily opened up into an erected state from a flattened state, the blanks may be held in the magazine in a generally completely flattened configuration and then can be folded and sealed such as by gluing or taping panels and/or flaps together to form an erected carton. Specialized apparatus that can handle only flat, unfolded and unsealed blanks for cartons are known.

However, some blanks are provided to users not in a flat, unfolded and unsealed form, but rather in what is known as a "knock-down" blank or "KD". A KD blank may be provided in a folded configuration and be partially glued or otherwise sealed along one side seam thus being formed in a generally flattened tubular shape. Accordingly, each carton may require opposite panels to be pulled apart and reconfigured from a flattened tubular configuration to an open tubular configuration that is suitable for delivery to a carton conveyor. The carton blank may then have one side closed by folding and sealing the bottom flaps, and then be filled from the opposite side while on the carton conveyor. Also, any required additional flap folding and sealing such as with glue or tape can be carried out to enclose and completely close and seal the carton with one or more items contained therein. Alternately, for example the erected carton blank can be reoriented from a side orientation to an upright orientation with the opening facing upwards. The erected carton can then be moved to a loading station or loading system where it is top loaded with one or more items, such as products or other carton containing products. The top opening can then be closed by folding over and sealing the top flaps.

However, the forming of a carton ready to be filled with a product, using such a knock-down carton blank—i.e., a tubular carton blank that is flattened but partially glued along one side seam—has in the past involved quite complex machinery. Typically, tubular carton blanks are held in a magazine with the blanks being in an angled but generally downwardly disposed orientation. Another apparatus referred to as a carton erector or carton feeder fulfils the functions of retrieving the carton from the magazine, opening the flattened carton up into a generally tubular configuration, and then placing it on a carton conveyor. The carton feeder typically has suction cups and will move in a generally arcuate path between the various stations for retrieval, opening and discharge. Examples of such carton feeders are disclosed in U.S. Pat. No. 5,997,458 to Guttinger et al. issued Dec. 7, 1999, and U.S. Pat. No. 7,326,165 issued to Baclija et al. on Feb. 5, 2008, the contents of both of which are hereby incorporated herein in their entirety. Other similar types of carton erectors may retrieve blanks in series from a magazine using suctions cups, open the blanks using some other kind of mechanism such as carton breaker, and then feed the opened blanks to belt mechanisms which can pass the blanks to a carton conveyor to transport the blank. However, in such systems, difficulties arise in designing system components that can achieve a clean retrieval and handoff by the carton feeder/erectors apparatus.

In the formation of cartons from a corrugated or otherwise strengthened material such as a corrugated fibreboard material, it is also typically necessary as part of the forming process to fold over various parts of a blank made from a corrugated fibreboard material. However, current folding processes and machines are relatively complex.

Accordingly, an improved forming method and system is desirable which can readily form a container such as a carton from a generally flat blank.

SUMMARY

In an aspect, there is provided an order packing system for orders containing at least one product, the system comprising: a first conveyer operable to transport bins to a packing station in a first sequence, each one of said bins containing an order comprising at least one product, a case construction apparatus, operable to erect cases from blanks of a plurality of sizes, a second conveyer operable to transport blanks to said case construction apparatus and to transport constructed cases to the packing station, a controller operable to: cause said second conveyor to transport blanks to said case construction apparatus in a second sequence, wherein sizes of constructed cases in said second sequence correspond to sizes of said at least one product in said first sequence, and cause the first and second conveyor to transport to the packing station each bin in the first sequence with its corresponding constructed case in the second sequence.

In another aspect, there is provided a method of packing product orders, said method comprising: (a) receiving a plurality of bins in a first sequence, wherein each bin comprises at least one product in an order; (b) accessing a next request from said queue; (c) determining a size for a case from said next request; (d) based on said size, automatically adjusting components of a case forming apparatus to adapt said case forming apparatus to form said case of said size; (e) transferring a case blank for said case of said size from a particular repository to said case forming apparatus, said particular repository holding case blanks for cases of said size; (f) operating said case forming apparatus to form said case from said case blank in a second sequence; (g) transporting said case to a packing station with the corresponding bin for the order; (h) until said queue is empty, repeating (b) to (g) for a request in said queue next following said next request.

In another aspect, there is provided an order packing system for orders containing at least one product, the system comprising: a first conveyer operable to transport bins to a packing station in a first sequence, each of said bins containing an order comprising at least one product, a case construction apparatus, operable to construct cases from blanks of a plurality of sizes; a second conveyer operable to transport constructed cases from said case construction apparatus to said packing station; a controller operable to: cause said case construction apparatus to construct cases in a second sequence and to cause said second conveyor to transport said constructed cases, in said second sequence to said packing station, wherein sizes of constructed cases in said second sequence correspond to the sizes of said at least one product in each of said bins in said first sequence, and cause the first and second conveyor to deliver each bin in the first sequence at the packing station with its corresponding constructed case in the second sequence, such that said orders in said bins in said first sequence can be transferred sequentially to corresponding constructed cases in said second sequence.

In another aspect, there is provided a packaging method, comprising: (a) delivering a plurality of bins in a first sequence to a packing station, wherein each bin contains an order of at least one product; (b) accessing a request from a queue of requests, said queue of requests being generated based on said first sequence; (c) determining a size for a case based on said request; (d) based on said size, automatically adjusting one or more components of a case forming apparatus to adapt said case forming apparatus to form said case of said size; (e) transferring a case blank for said case of said size from a particular blank repository to said case forming apparatus, said particular blank repository holding case blanks for cases of said size; (f) operating said case forming apparatus to form said case from said case blank; (g) repeating (b) to (g) for each request in said queue; to create a second sequence; (h) delivering said cases in said second sequence to said packing station with the corresponding bin for the order, such that said bins are delivered to said packing station in said first sequence, in a manner that enables said orders in said bins in said first sequence to be transferred sequentially to corresponding formed cases in said second sequence.

In another aspect, there is provided a method of erecting a first case from a first knock-down blank have a first length L1 and after erecting said first case, erecting a second case from a second knock-down blank having a second length L2 that is a different length than L1, said method comprising: conveying a first knock-down blank to a pick-up position wherein said front edge of said first knock down blank is proximate to or in abutment with a facing surface of a front edge guide located at a first position; gripping a top side panel of said first knock-down carton blank at said pick-up location with an end effector of a movement apparatus; translating said first knock-down carton blank with said movement apparatus from said pick-up location to a position over a shuttle base of a shuttle; lowering said first knock-down carton blank with said movement apparatus onto said shuttle base of said shuttle, such that a bottom side panel of said knock-down blank abuts said base; gripping said bottom side panel of said first blank with a gripper of said shuttle base; raising a top side panel of said first knock-down carton blank while advancing said shuttle from a first start position in a horizontal direction so as to open said first knock-down carton blank into a first carton sleeve; adjusting the longitudinal position of said front edge guide; conveying a second knock-down blank to a pick-up position wherein said front edge of said second knock down blank is proximate to or abuts with said facing surface of a front edge guide located at a second position that is different than the first position; gripping a top side panel of said second knock-down carton blank at said pick-up location with said end effector of a movement apparatus; translating said second knock-down carton blank with said movement apparatus from said pick-up location to a position over said shuttle; lowering said second knock-down carton blank with said movement apparatus onto said base of said shuttle bed, such that a bottom side panel of said second knock-down blank abuts said base; gripping said bottom side panel of said second blank with a gripper of said base; raising a top side panel of said second knock-down carton blank while advancing said shuttle from a second start position in said horizontal direction so as to open said second knock-down carton blank into a second carton sleeve.

In another aspect, there is provided a method of erecting a first case from a first knock-down blank have a first length L1 and after erecting said first case, erecting a second case from a second knock-down blank having a second length L2 that is a different length than L1; wherein said first blank has a crease line between a top side panel and a further side panel of said first knock down blank, wherein said further side panel is hingedly connected to said top side panel and to said bottom side panel of said first knock-down blank; wherein said second knock-down blank has a crease line between a top side panel and a further side panel of said second knock down blank, wherein said further side panel is hingedly connected to said top side panel and to said bottom side panel of said second knock-down blank; and wherein said method comprises: conveying a first knock-down blank to a pick-up position wherein said crease line of said first knock-down blank is aligned with a transverse axis; gripping a top side panel of said first knock-down carton blank at said pick-up location with an end effector of a movement apparatus; translating said first knock-down carton blank with said movement apparatus from said pick-up location to a position over said shuttle; vertically lowering said first knock-down carton blank with said movement apparatus onto said base of said shuttle bed, such that a bottom side panel of said knock-down blank abuts said base; gripping said bottom side panel of said first blank with a gripper of said base; raising a top side panel of said first knock-down carton blank while advancing said shuttle in a horizontal direction so as to open said first knock-down carton blank into a first carton sleeve; conveying a second knock-down blank to a pick-up position wherein said crease line of said second knock-down blank is aligned with said transverse axis; gripping a top side panel of said second knock-down carton blank at said pick-up location with said end effector of a movement apparatus; translating said second knock-down carton blank with said movement apparatus from said pick-up location to a position over said shuttle; vertically lowering said second knock-down carton blank with said movement apparatus onto said base of said shuttle bed, such that a bottom side panel of said second knock-down blank abuts said base; gripping said bottom side panel of said second blank with a gripper of said base; raising a top side panel of said second knock-down carton blank while advancing said shuttle in a horizontal direction so as to open said second knock-down carton blank into a second carton sleeve.

In another aspect, there is provided an apparatus for use in erecting a first case from a first knock-down blank have a first length L1 and after erecting said first case, erecting a second case from a second knock-down blank having a second length L2 that is a different length than L1, said apparatus comprising: a knock-down blank feeding apparatus operable to feed a first knock down blank and a second knock down blank to a pick up station; a shuttle having a bed with a horizontally extending base having base grippers; shuttle drive apparatus for driving said shuttle in a horizontal advancement direction; an end effector having end effector grippers; an end effector movement device for moving said end effector; a movable edge guide; a controller operatively associated with said movable edge guide, said shuttle drive apparatus, said end effector movement device and said grippers and configured to: operate said feeding apparatus to feed a first knock down blank to a pick-up position in which a leading edge abuts said movable edge guide; operate said movement device and said end effector to grip a top side panel of said first knock-down carton blank and move said first knock down blank and place said first knock-down carton blank on said horizontally extending base of said shuttle such that a bottom side panel of said first knock-down carton blank abuts said horizontally extending base; activate said base grippers to grip said bottom side panel of said first knock-down blank; operate said movement device to raise said top side panel of said first knock-down carton blank with said end effector while horizontally advancing said shuttle in order to open said first knock-down carton blank into a first carton sleeve; adjust the position of said movable edge guide; operate said feeding apparatus to feed a second knock down blank to a pick-up position in which a leading edge abuts said movable edge guide; operate said movement device and said end effector to grip a top side panel of said second knock-down carton blank and place said second knock-down carton blank on said horizontally extending base of said shuttle such that a bottom side panel of said second knock-down carton blank abuts said horizontally extending base; activate said base grippers to grip said bottom side panel of said second knock-down blank; operate said movement device to raise said top side panel of said second knock-down carton blank with said end effector while horizontally advancing said shuttle in order to open said second knock-down carton blank into a second carton sleeve.

In another aspect, there is provided a method for use in erecting a carton, comprising: (a) placing a knock-down carton blank on a base of a bed of a shuttle such that a bottom side panel of said knock-down carton blank abuts said base; (b) gripping said bottom side panel of said blank with a gripper of said base; (c) raising a top side panel of said knock-down carton blank while advancing said shuttle in a horizontal direction so as to open said knock-down carton blank into a carton sleeve.

In another aspect, there is provided an apparatus for use in erecting a carton, comprising: a shuttle having a bed with a horizontally extending base having base grippers; shuttle drive apparatus for driving said shuttle in a horizontal advancement direction; an end effector having end effector grippers; an end effector movement device for moving said end effector; a controller operatively associated with said shuttle drive apparatus, said end effector movement device and said grippers and configured to: operate said movement device and end effector to grip a top side panel of a knock-down carton blank and place said knock-down carton blank on said horizontally extending base of said shuttle such that a bottom side panel of said knock-down carton blank abuts said horizontally extending base; activate said base grippers to grip said bottom side panel of said blank; operate said movement device to raise said top side panel of said knock-down carton blank with said end effector while horizontally advancing said shuttle in order to open said knock-down carton blank into a carton sleeve.

Other aspects and features will become apparent to those of ordinary skill in the art upon review of the following description of specific embodiments of the invention in conjunction with the accompanying Figures.

BRIEF DESCRIPTION OF THE DRAWINGS

In the Figures which illustrate example embodiments,

FIG. 33 is an example order repository;

DETAILED DESCRIPTION

Figure 1:
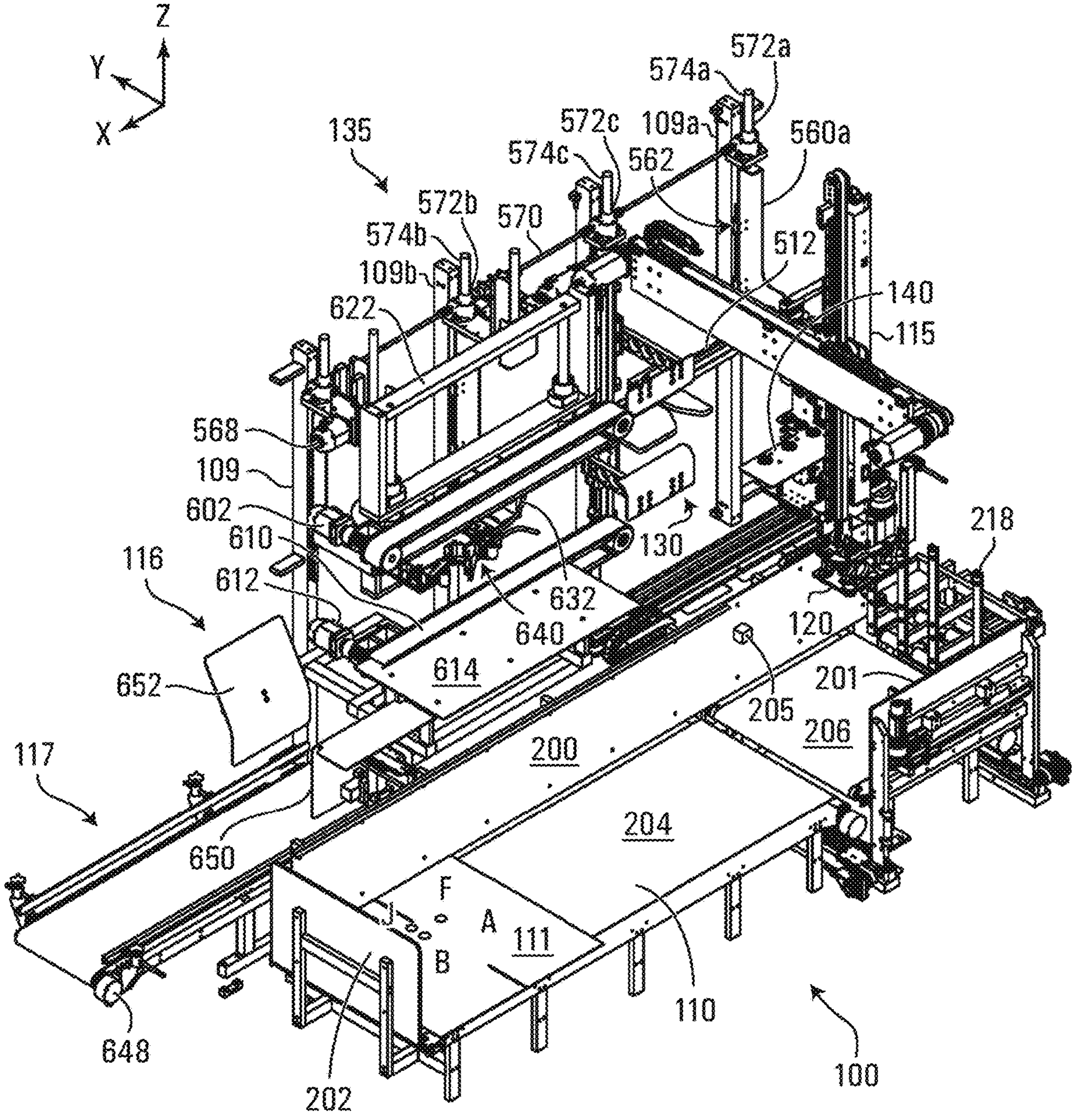
FIGS. 1 and 2 are top perspective views of a system made in accordance with an embodiment.
Figure 2:
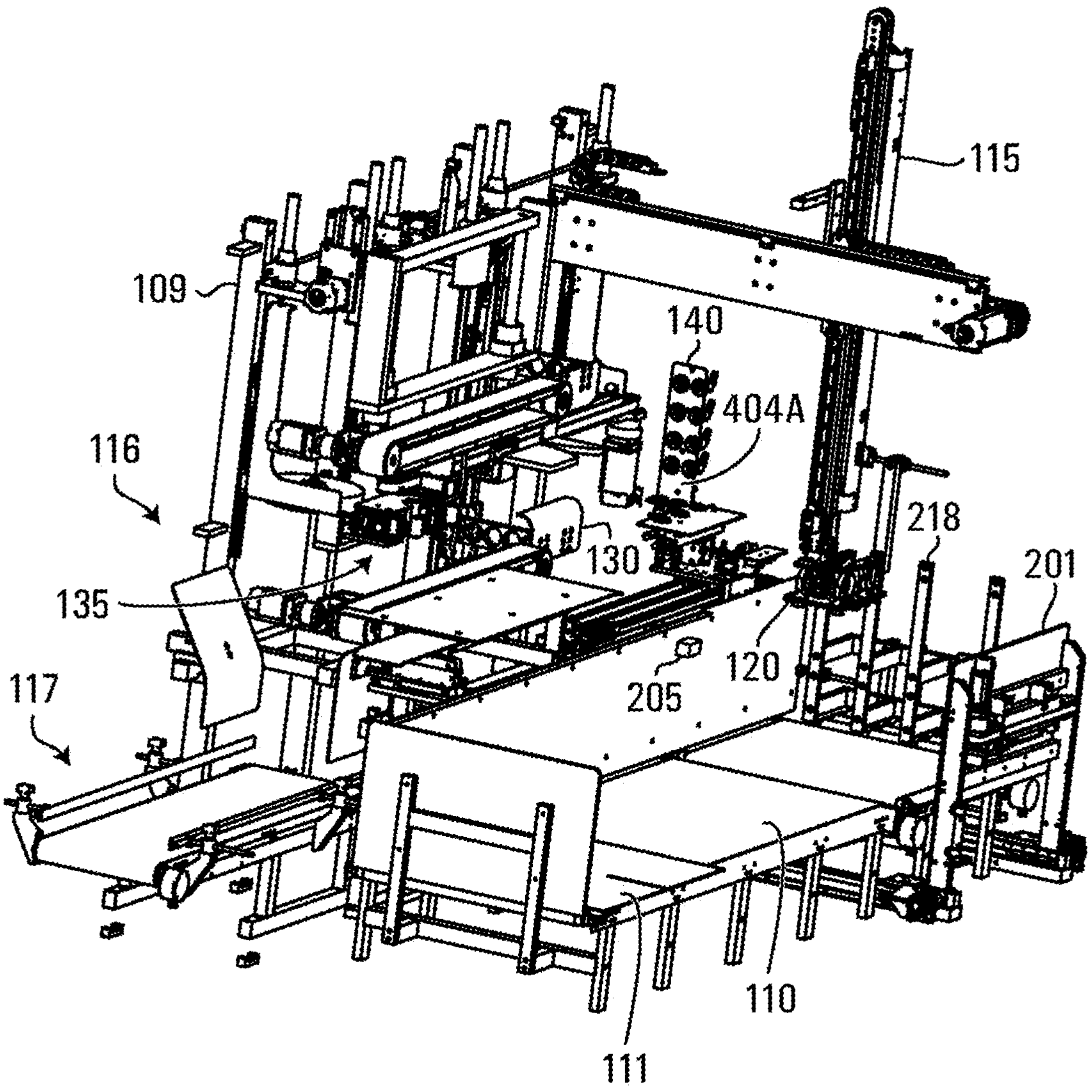

With reference initially to FIGS. 1 and 2, in overview, a carton forming system 100 has a magazine 110 adapted to receive and hold a plurality of knock-down carton blanks 111 and an end effector 120 for retrieving the knock-down carton blanks from a pick-up area and placing them on a shuttle 140. As will be described hereinafter, the end effector 120 and shuttle 140 co-operate to manipulate the knock-down blanks in such a way as to erect them into sleeves.

System 100 may also include a folding apparatus generally designated 130, configured to fold one or more flaps of each sleeve, and a sealing station 135 at which flaps of the cartons are sealed. System 100 may also include a carton re-orienting station 116 and a carton discharge conveyor 117 for receiving and moving cartons away once they have been fully erected.

Figure 3:
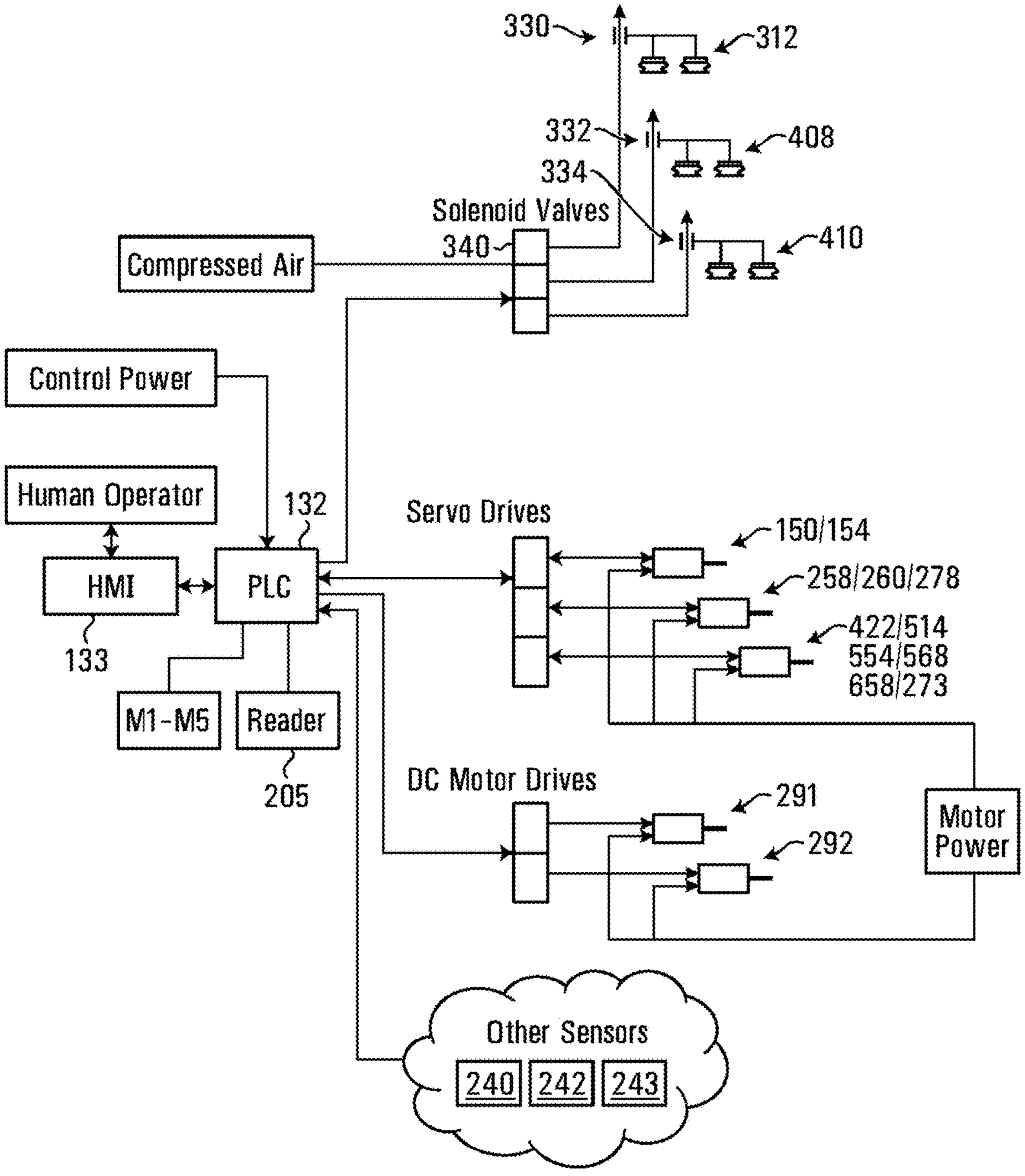
FIG. 3 is a schematic control diagram.

An example of a scheme for the power and data/communication configuration for system 100 is illustrated in FIG. 3. The operation of the components of carton forming system 100, and of system 100 as a whole, may be controlled by a programmable logic controller ("PLC") 132. PLC 132 may be accessed by a human operator through a Human Machine Interface (HMI) module 133 secured to a frame 109 (FIG. 1) of the system. HMI module 133 may be in electronic communication with PLC 132. PLC 132 may be any suitable PLC and may for example include a unit chosen from the Logix 5000 series devices made by Allen-Bradley/Rockwell Automation, such as the ControlLogix 5561 device. HMI module 132 may be a Panelview part number 2711 P-T15C4D1 module also made by Allen-Bradley/Rockwell Automation.

Electrical power can be supplied to PLC 132/HMI 133, and to all the various servo motors and DC motors that are described further herein. Compressed/pressurized air can also be supplied to the vacuum generators and pneumatic actuator through valve devices such as solenoid valves that are controlled by PLC 132, all as described further herein. Servo motors may be connected to and in communication with servo drives that are in communication with and controlled by PLC 132. Similarly, DC motors may be connected to DC motor drives that are in communication with and controlled by PLC 132, again all as described further herein. Additionally, various other sensors are in communication with PLC 132 and may (although not shown) also be supplied with electrical power.

Figure 4A:
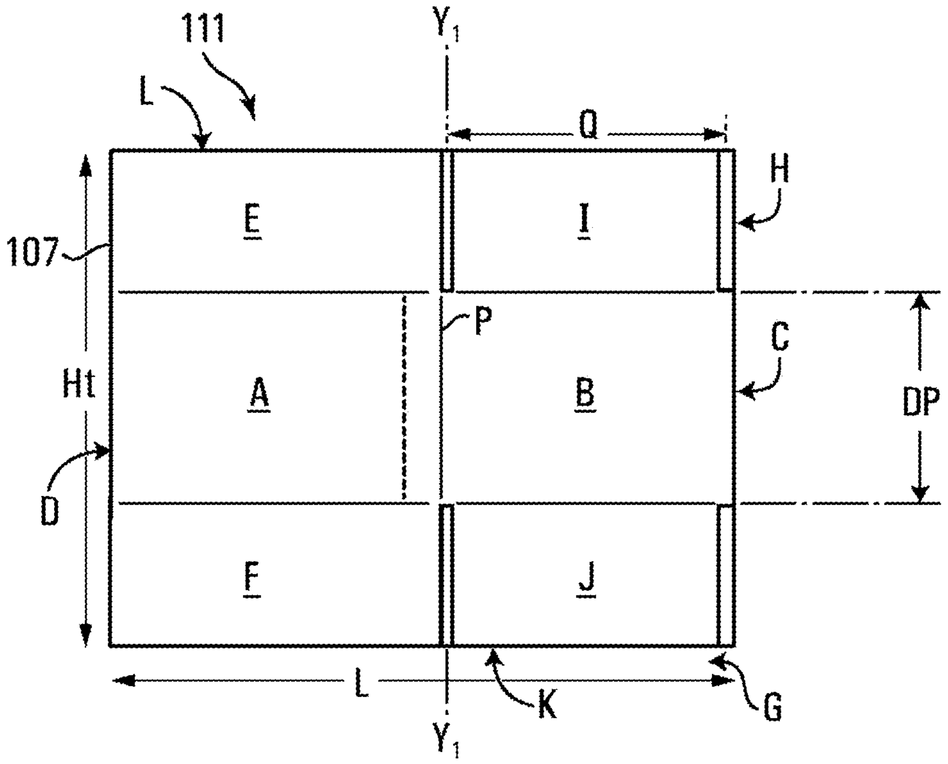
FIG. 4A is a plan view of one side of a knock-down blank that may be processed by the system.
Figure 4B:
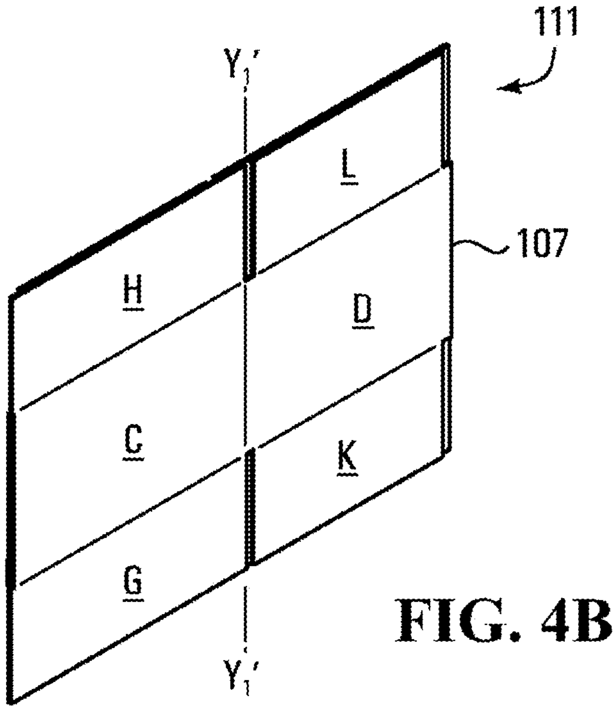
FIG. 4B is a perspective view an opposite side of the knock-down blank of FIG. 4A.
Figure 5:
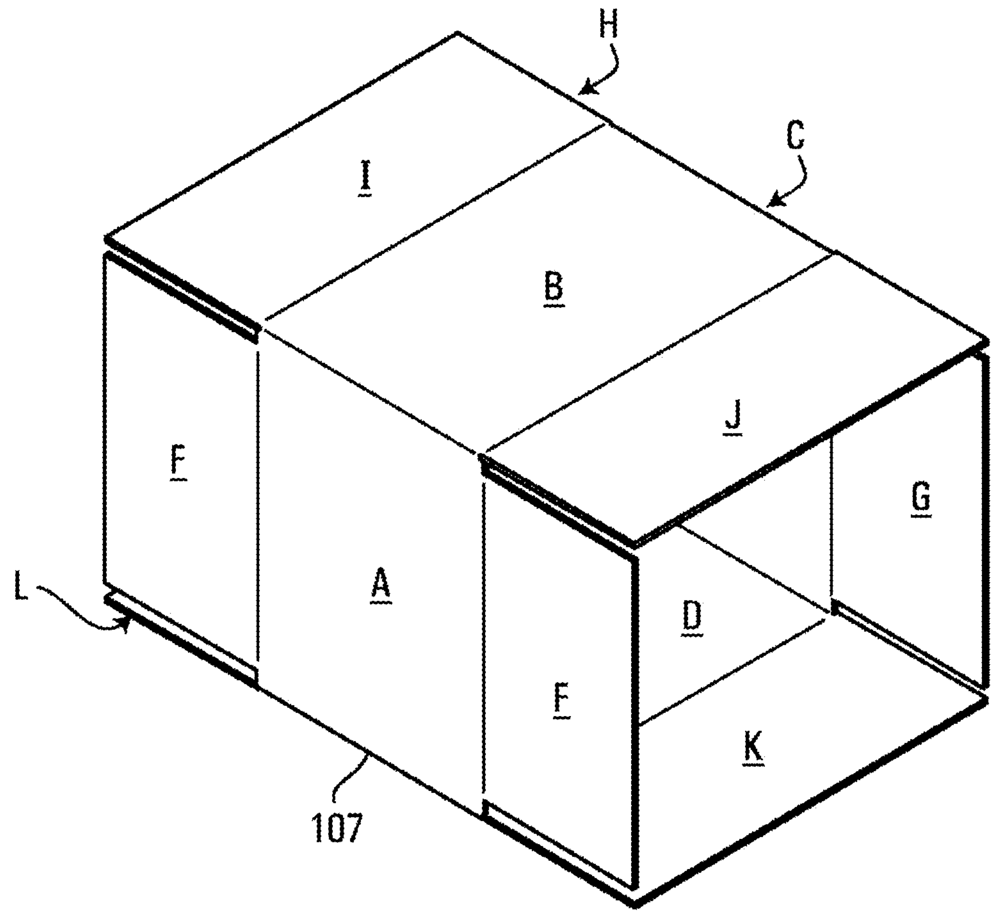
FIG. 5 is a perspective view of a carton erected from the knock-down blank of FIGS. 4A and 4B.

With reference now to FIGS. 4A, 4B, and 5, an example of one kind of knock-down carton blank 111 that can be processed by system 100 to form a regular slotted case (RSC) is disclosed. Other types of knock-down carton blanks, and knock-down carton blanks of different sizes can also be processed by system 100.

Each carton blank 111 may be generally initially formed and provided in a knock-down configuration—i.e., a flattened tubular configuration—as shown in FIGS. 4A and 4B. Each bank 111 has a height dimension "Ht"; a length dimension "L"; and a major panel Length "Q" (see FIG. 4A). By inputting each of these three dimensions for a blank to be processed by system 100 into PLC 132, PLC 132 can determine if the system 100 can process that size blank without the necessity for manual intervention to make an adjustment to one or more components of the system 100. If PLC 132 determines that the adjustment can be made without human intervention, the PLC may make the necessary adjustments to positions and/or movements of at least some of the components forming system 100.

Blank 111 may have opposed major side panels A and C integrally interconnected to a pair of opposed minor side panels B and D to form a sleeve, seen in FIG. 5, when opened. An overlap strip of carton blank material may be provided between panel B and panel A that can be sealed by conventional means such as a suitable adhesive, to provide an overlapping seam joint in the vicinity of "P" (see FIG. 4A). This seam joint at the overlap forms a knock-down carton blank in which the panels A, B, C and D are joined into a continuous blank that is of generally flattened tubular configuration, as shown in FIGS. 4A and 4B.

Also, as shown in FIGS. 4A, 4B and 5, are major and minor end flaps E, H, L, I that are provided at one end of the respective major and minor side panels A-D. A second set of major and minor end flaps F, G, K and J are provided on the opposite, lower/bottom end of the major and minor side panels A-D. However, in other embodiments, cartons having other panel configurations can be formed. The panels and flaps are connected to adjacent flaps and/or panels by predetermined fold/crease lines as shown in FIGS. 4A and 4B. These fold/crease lines may for example be formed by a weakened area of material and/or the formation of a crease with a crease forming apparatus. The effect of the fold lines is such that one panel such as for example panel A can be rotated relative to an adjacent panel such as D or B along the fold lines. Flaps may also fold and rotate about fold lines that connect them to their respective panels.

As will be described hereinafter, carton blank 111 may be transformed from a knock-down blank (i.e., a generally flattened tubular configuration) to an open sleeve (open tubular configuration) and the flaps may be folded and sealed to form the desired erected carton configuration. System 100 is configured to deliver each carton with an upwardly facing opening suitable for top loading. In another embodiment, system 100 may be configured to deliver each carton with a sidewards facing opening suitable for side loading.

Carton blanks 111 may have flaps that provide material that can, in conjunction with a connection mechanism (such as for example with application of an adhesive, sealing tape or a mechanical connection such as is provided in so-called "Klick-lok™" carton blanks) interconnect flap surfaces, to join or otherwise interconnect, flaps to adjacent flaps (or in some embodiments flaps to panels), to hold the carton in its desired erected configuration.

Carton blanks 111 may be made of any suitable material(s) configured and adapted to permit the required folding/bending/displacement of the material to reach the desired configuration. Examples of suitable materials are chipboard, cardboard or creased corrugated fiber-board. It should be noted that the blank may be formed of a material which itself is rigid or semi-rigid, and not easily foldable but which is divided into separate panels and flaps separated by creases or hinge type mechanisms so that the carton can be erected and formed.

Turning now to the various portions of system 100, with reference to FIG. 1 to 3, magazine 110 may be configured to hold a plurality of vertically stacked knock-down carton blanks 111, and be operable to move the stack of carton blanks 111 in a horizontal direction generally parallel to horizontal axis X under the control of PLC 132, to a pick-up location where end effector 120 can retrieve cartons from the magazine.

Magazine 110 may comprise a single conveyor or other blank feed apparatus to deliver blanks to a pick-up location. In the illustrated embodiment, two conveyors are disclosed: an infeed conveyor 204 and an alignment conveyor 206. Infeed conveyor 204 may be configured and operable to move a stack of blanks 111 from a stack input position (where a stack may be loaded onto conveyor 204 such as by human or robotic placement) to a position where the stack of blanks is transferred to a horizontally and transversely aligning, alignment conveyor 206. Alignment conveyor 206 may be positioned downstream in relation to infeed conveyor 204 and be used to move the stack of blanks to the pick-up location. Magazine 110 may be loaded with, and initially hold, a large number of carton blanks 111 in vertical stacks, with the stacks resting on infeed conveyer 204. A rear wall 202 mounted to frame 109 is configured to retain a stack from falling backwards when initially loaded on conveyor 204. Rear wall 202 may have a generally planar, vertically and transversely oriented surface facing the stack of blanks 111. Conveyor 204 may be of an appropriate length to be able to store a satisfactory number of stacks of blanks in series on conveyor 204. PLC 132 can control the operation of conveyor 204 to move one stack at a time to the alignment conveyor 206.

With infeed-conveyor having one or more stacks of blanks arranged longitudinally on infeed conveyor 204, the stacks can be fed in turn onto alignment conveyor 206. A sensor (not shown) may be provided in the vicinity of conveyor 204 to monitor whether there is a stack waiting on conveyor 204 and that sensor may be operable to send a warning signal to PLC 132 that can alert an operator that the magazine is low and needs to be replenished. The sensor may be a part number 42GRP-9000-QD made by Allen Bradley.

Of particular note, a plurality of stacks of blanks might be provided on conveyor 204 and each stack may be have associated information that can be read by an information reader 205 such as electronic or an optical reading device. For example, a bar code may be provided on each stack of blanks, such as on the top or bottom blank of the stack. The bar code may be read by a bar code reader associated with the infeed conveyor 204. The bar code reader may be in communication with PLC 132. The bar code may provide information indicative of a characteristic of the blanks in the stack. For example, the bar code may identify the size and/or type of blank in a particular stack. Other information indicators may be used such as for example RFID tags/chips and RFID readers. The information can then be automatically provided by the information reader to PLC 132 which can determine whether the current configuration of system 100 can handle the processing the particular type/size of blanks without having to make manual adjustments to any of the components. It is contemplated that within a certain range of types/sizes of blanks, system 100 is able to handle the processing of different types/sizes of blanks without manual adjustment of any components of system 100. The bar code/RFID tag may provide the information about the dimensions of the blank as discussed above and then PLC 132 can determine adjustments, if any, that need to be made to (a) the components of the magazine; (b) the movement of the end effector 120; (c) the movement of the shuttle 140; and (d) at least some of the components of the folding apparatus 130 and some components at the sealing station 135 to be able to process a particular blank or a particular stack of blanks. The result is that system 100 may be able to automatically process at least some different types of blanks to form different cartons, without having to make manual operator adjustments to any components of system 100.

The belt of infeed conveyor 204 may be driven by a suitable motor such as a DC motor or a variable frequency drive motor 291 (see FIG. 3) controlled through a DC motor drive (all sold by Oriental under model AXH-5100-KC-30) by PLC 132.

Once PLC 132 is given an instruction (such as by a human operator through HMI module 133), infeed conveyor 204 may be activated to move a stack of blanks 111 horizontally downstream. PLC 132 can control motor 291 through the motor drive and thus conveyor 204 can be operated to move and transfer the stack towards and for transfer to the alignment conveyor 206.

Stack alignment conveyer 206 may be driven by a motor 292 (FIG. 3) that may be like motor 291 and with a corresponding motor drive. Motor 292 may also be controlled by PLC 132. Conveyor 206 may be operated to move the stack of blanks 111 further horizontally until the front face of the stack abuts a planar front stop picket wall 218.

The belts of conveyors 204 and 206 may be made from any suitable material such as for example Ropanyl.

A sensor 242 (FIG. 3), such as an electronic eye model 42KL-D1 LB-F4 made by ALLEN BRADLEY, may be located within the horizontal gap between conveyors 204 and 206. Sensor 242 may be positioned and operable to detect the presence of the front edge of a stack of blanks as the stack of blanks begins to move over the gap between conveyors 202 and 206. Upon detecting the front edge, sensor 242 may send a digital signal to PLC 132 (FIG. 3) signalling that a stack has moved to a position where conveyor 206 can start to move. PLC 132 can then cause the motor 292 (FIG. 3) for conveyor 206 to be activated. In this way, there can be a "hand-off" of the stack of blanks from infeed conveyor 204 to alignment conveyor 206.

Once the rear edge of the stack of blanks 111 has passed the sensor 242 a signal may be sent to PLC 132 which can then respond by sending a signal to shut down the motor 291 (FIG. 3) driving conveyor 204. Conveyor 204 is then in a condition ready to be loaded with another stack of blanks 111. Meanwhile conveyor 206 can continue to operate as it moves the stack of blanks 111 to the pick-up location.

The presence of a stack of blanks 111 at the pick-up location may be detected by a sensor 240 (FIG. 3) that may be the same type of sensor as sensor 242. The sensor 240 may detect the presence of the front edge of a stack of blanks at the pick-up location and may send a digital signal to PLC 132 signalling that a stack is at the pick-up location. At the pick-up location, the stack of blanks may be "squared up" and thereafter, once properly aligned, single carton blanks 111 may be retrieved in series from the stack of blanks 111 by engagement of the end effector 120 with the uppermost blank in the stack.

During movement of the stack of blanks 111 horizontally by conveyors 204 and 206, the left hand side of the stack of blanks may be supported and guided by a left hand side wall 200 which is fixed to the frame 190. Side wall 200 may be oriented generally vertically and may extend horizontally for substantially the full lengths of conveyors 204 and 206.

Figure 6:
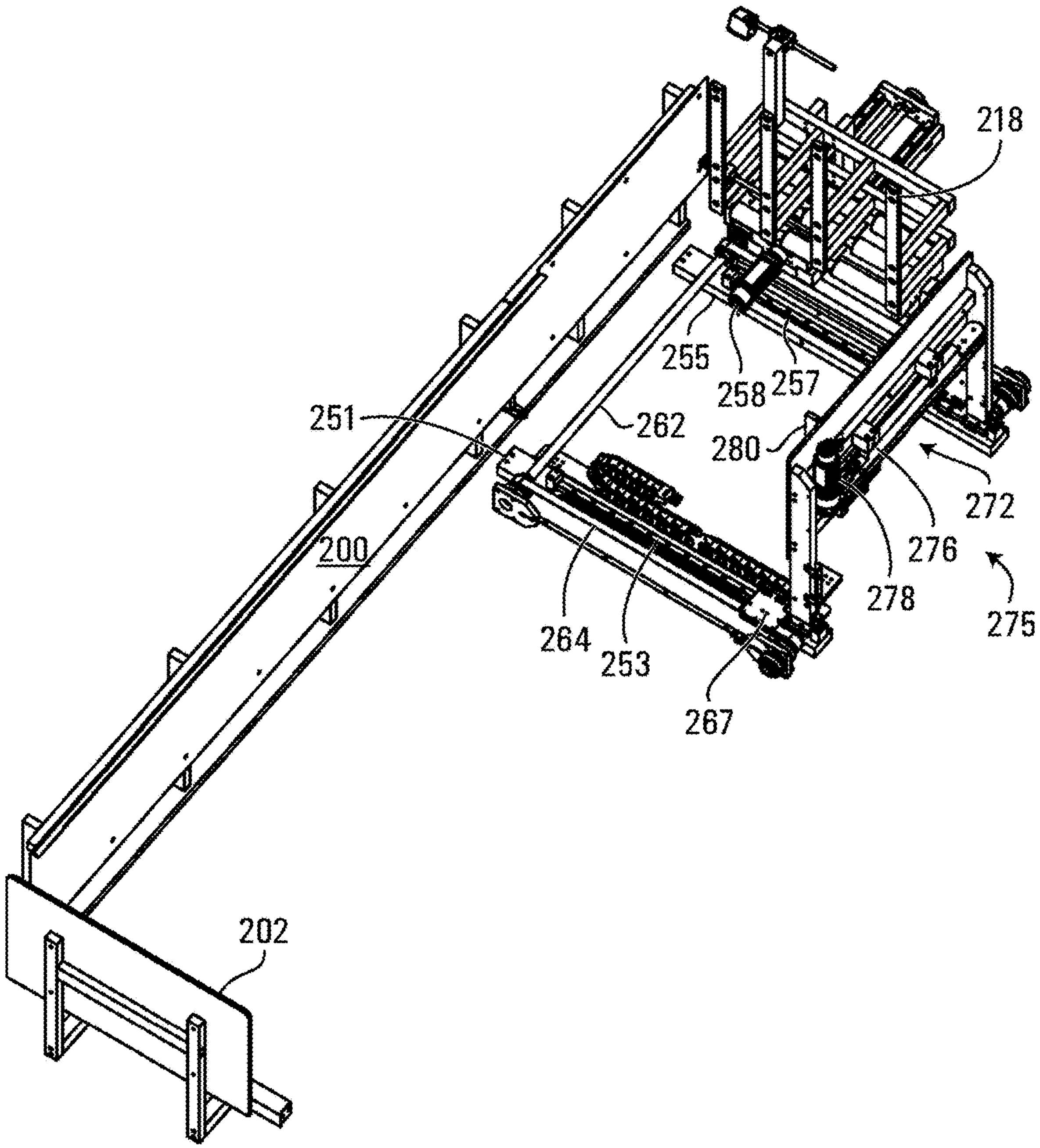
FIG. 6 is a top perspective view of a portion of the system of FIGS. 1 and 2.
Figure 7:
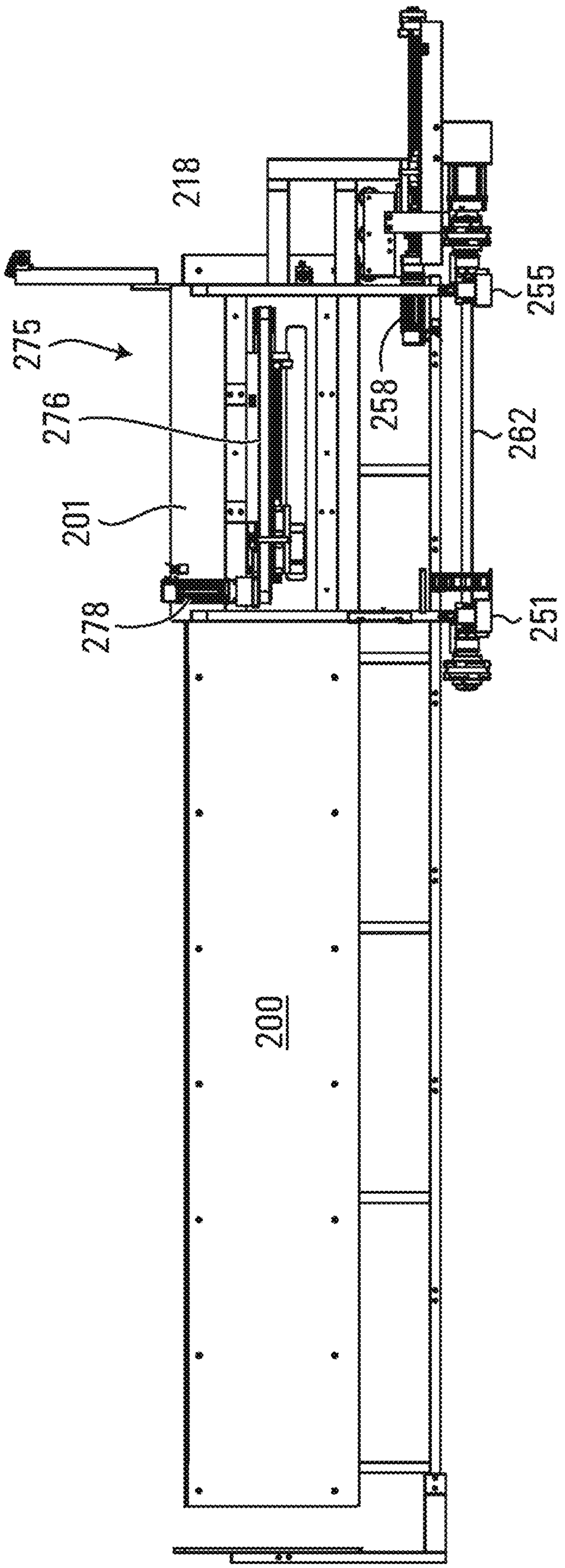
FIG. 7 is a side view of the portion of FIG. 6.

The outer side of the magazine 110 adjacent conveyor 204 may be left open; however the outer side of conveyor 206 has a moveable outer guide wall 201. The mounting arrangement for side wall 201 is illustrated in FIGS. 6 and 7. Turning to these Figures, transverse bottom support plates 251 and 255 are supported on the factory floor spaced from, and parallel to, each other. Each of support plates 251, 255 has mounted to a respective upper surface thereof tracks 253, 257. Side wall 201 is supported by connector blocks 267 which are slidably received on tracks 253, 257.

A drive mechanism in electronic communication with PLC 132 may be provided to drive side wall 201 on its tracks. Specifically, a servo motor 258 may be provided and be in electronic communication with PLC 132 through a servo drive (as seen in FIG. 3). Examples that could be used are servo motor MPL-B1530U-VJ42AA made by ALLEN BRADLEY, in combination with servo drive 2094-BC01-MP5-S also made by ALLEN BRADLEY and gear head AE050-010 FOR MPL-A1520 made by Apex. The servo motor 258 may drive a shaft 262 to, in turn, drive an endless belt 264 attached to each of the blocks 267. An encoder may be provided within or in association with servo drive motor 258 and the encoder may rotate in relation to the rotation of the shaft of the servo drive. The encoder may be in communication with, and provide signals to the servo drive which can then pass on the information to PLC 132. Thus, PLC 132 may be able to determine the transverse position of side wall 201 and can operate the servo drive 258 to adjust the position of the side wall 201. The particular type of encoder that may be used is known as an "absolute" encoder. Thus once the encoder is calibrated so that a position of the shaft 262 is "zeroed", then even if power is lost to system 100, the encoder can maintain its zero position calibration.

During operation of system 100, while side wall 200 is fixed, side wall 201 is moved laterally as part of a blank stack alignment procedure to provide for generally longitudinal alignment of the end edges of blanks 111 in the stack being prepared for processing as the stack is held between side walls 200 and 201. Specifically, the PLC positions side wall 201 based on the height dimension Ht (FIG. 4A) of the knock-down blanks in the stack being readied for processing as previously read by information reader 205.

Side wall 201 has a lateral tamping apparatus 275 to tamp the blanks 111 in a direction toward the front picket wall 218 so as to align of the front and rear side edges of the blanks 111 in the stack. Tamping apparatus has a tamping plate 280 that rides in a longitudinal slot 272 in wall 201. The end of tamping plate 280 which extends through the slot to the outside of wall 201 is joined to endless belt 276 that is driven by servo motor 278 under control of the PLC.

Tamping plate 280 that is located transversely inwardly of the inner surface of side wall 201. Movement of endless belt 276 causes tamping plate 280 to engage the rear side edges of the blanks 111 in the stack to be processed with the consequence that, as the front edges of those blanks are pushed up against the inner surface of the front picket wall 218, the front and rear edges of the blanks become laterally aligned. While a servo drive and belt combination is illustrated, other alignment devices, such as a pneumatic actuator with a piston attached to the tamping plate, could be used.

By operation of PLC 132, suitable adjustment of outside wall 201 and tamping plate 280, a stack of blanks 111 can be "squared-up" and precisely located at a pick-up location—that is, held against inside wall 200 and front picket wall 218. Once in the pick-up location, the blanks are in the proper location for being engaged by the end effector 120.

In particular, once the stack of blanks 111 have generally reached the pick-up location, PLC 132 can send a signal to drive mechanism 260 to cause the drive mechanism 260 to cause side wall 201 to move laterally inwards towards the side of stack of blanks 111. PLC 132 will cause the drive mechanism 260 to move a sufficient distance to cause the edges of the blanks 111 to become in contact along their length with inner surface of longitudinally aligned inner surface of side wall 201. However, PLC 132 will not cause side wall 201 to be moved to such an extent that it creates a force on the stack of blanks such that causes the blanks to buckle/be damaged if they are compressed to a significant extent between side walls 200 and 201. PLC 132 determines how much to move side wall 201 towards side wall 200 by virtue of the carton size dimensions that have been input to the PLC, including dimension Ht (see FIG. 4A). The wall 201 can be moved so as to apply a slight compression that can be fine-tuned such as by trial and error for different sized carton blanks. It should be noted that for many sized cartons, the manufacturers comply with industry standard carton sizes.

Once the longitudinal alignment has been effected by movement of side wall 201, PLC 132 can cause actuator 276 to be activated to cause the vertical plate 280 to engage the rear edges of the blanks 111 in the stack. PLC 132 may cause the vertical plate 280 to move a sufficient distance to cause the rear edges of the blanks 111 to come in contact with inner surface of plate 280. However, the vertical plate 280 is not moved to such an extent that it creates a force on the stack of blanks that would cause the blanks to buckle/be damaged if they are compressed too much between plate 280 and front picket wall 218.

Thus, by way of review: The vertical tamping plate 280 can be adjusted by the PLC operating servo drive 278 in the X-direction so that when the vertical tamping plate 280 is retracted it is in the right position to push the blanks up against the front picket wall 218 (without squeezing them).

In review the tamping sequence for ensuring the blanks are properly squared up at the pick-up location steps include the following:

The right-hand-side magazine side guide wall 201 under control of PLC 132 expands wide enough to allow the stack of blanks to enter on alignment conveyor 206, and clear tamping plate 280 even if the stack is misaligned and/or the blanks in the stack are not perfectly square with each other and in relation to the X-Y axes.

The conveyor 206 advances the stack of blanks 111 towards the front stop picket wall and such that the stack may abut the front stop picket wall 218.

The side guide wall 201 may move inwardly to make contact with the side of the case stack and press the side wall 201 against the left hand side guide wall 200. This aligns the cases so the side edges of blanks are aligned with each other and the longitudinal side wall of the walls 200 and 201. This also brings the tamping plate in behind the stack of blanks.

The servo drive 278 may be activated to cause the tamping plate 280 to press the stack forward, thereby aligning the blanks in the stack so that their front and rear edges are vertically aligned with each other and with the inner face of the plate 280 and the inside surface of front wall 218.

The blanks are then properly positioned so that the end effector can begin picking up blanks from the stack.

In order to pick-up blanks, the end effector may have one or more suction cups providing a suction force to a panel acting generally normal to the surface of the panel that is engaged, as described further below. Other types of suitable engagement devices might be employed.

Figure 8:
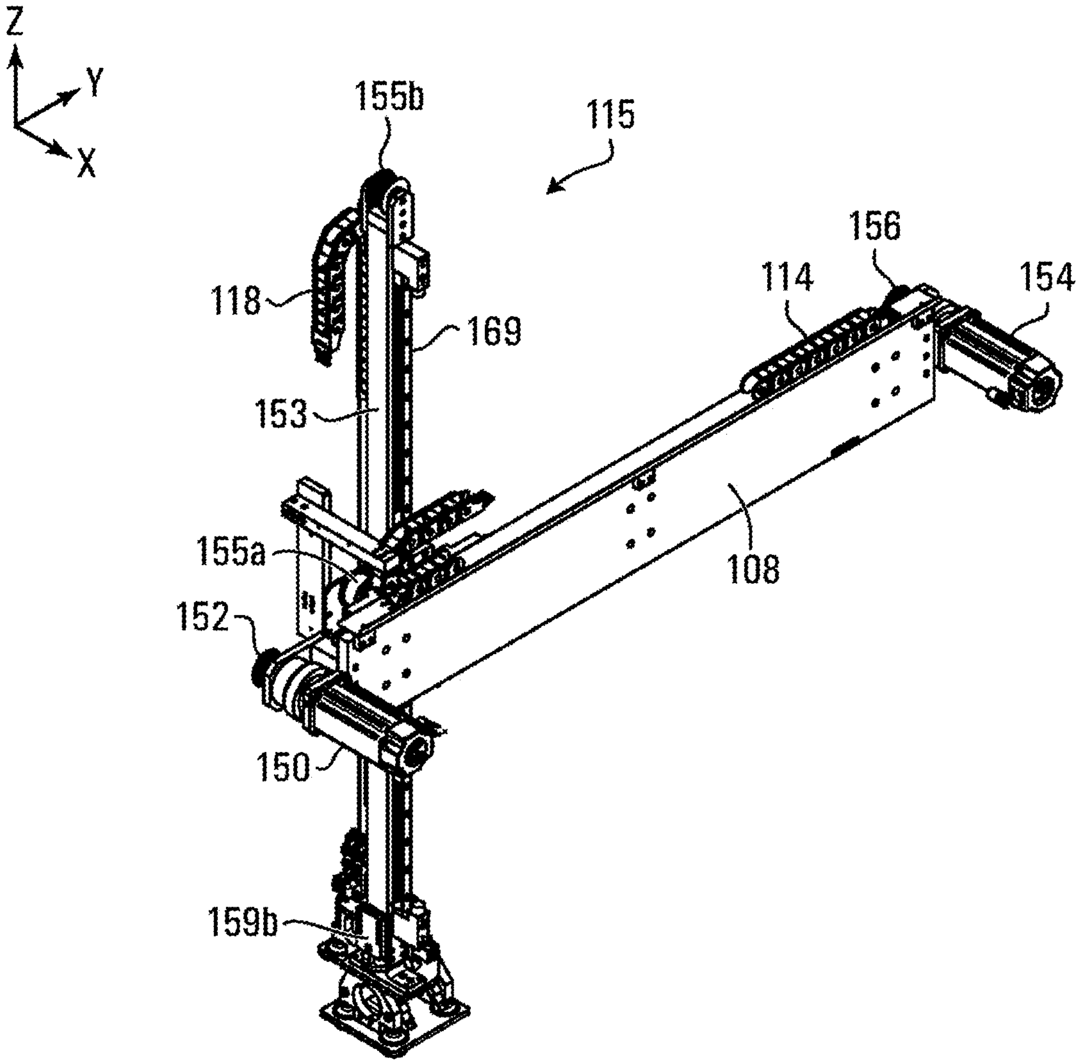
FIG. 8 is a top perspective view of another portion of the system of FIGS. 1 and 2.
Figure 9:
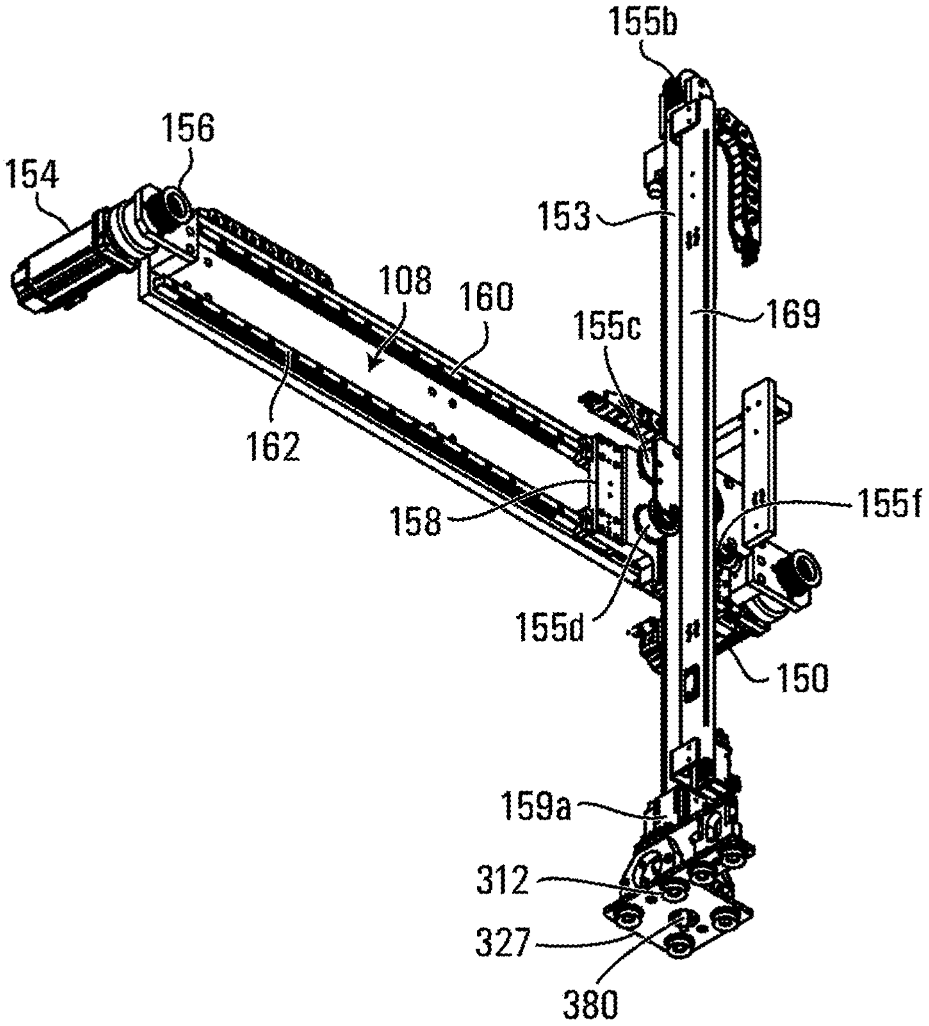
FIG. 9 is a bottom perspective view of the portion of FIG. 8.

Turning to FIGS. 8 and 9, end effector 120 has a dedicated, independently driven and controlled movement apparatus 115 that allows end effector 120 to move in a plane defined by both vertical axis Z and horizontal axis Y in FIG. 8. Thus, movement of the end effector 120 can only be in the vertical Z and horizontal Y directions (i.e. directions parallel to axes Z and Y in FIG. 8)—the end effector cannot move in a horizontal X direction (i.e. a direction parallel to axis X in FIG. 8). If the movement of the end effector 120 is restricted to only Z and Y directions, a moving apparatus can be constructed that is relatively less complex than if movement in all three directions is required.

Movement apparatus 115 includes a vertically oriented support tube 169 that may be generally rectangular in cross section to which end effector 120 is mounted by mounting blocks 190 so that end effector 120 moves in space with support tube 169.

The support tube 169 is slidably mounted to a slide block 158 for vertical movement and slide block 158 is, in turn, mounted to a horizontal rail system for horizontal movement. More specifically, slide block 158 has a pair of spaced, longitudinally and horizontally extending short inner blocks, each one fitting on one longitudinally extending rail 160, 162 that holds the blocks securely but allows blocks to slide horizontally relative to the rails. An example of a suitable rails system is the Bosch Rexroth ball rail system in which the rails are made from steel and the blocks have a race of ceramic balls inside allowing the block to slide on the rails. Rails 160, 162 are generally oriented horizontally are attached to a horizontally extending beam 108 that is connected to frame 109. Slide block 158 may be mounted to rails 160 or 162 for horizontal sliding movement along the rails. Slide block 158 has a rail system allow support tube 169 to be connected to it so as to be able to move vertically relative to slide block 158. More specifically, a rail extends vertically along a back surface of tube 169 and is interconnected to a runner of slide block 158. Again, a suitable rail system is the Bosch Rexroth ball rail system referenced above. Thus, support tube 169 can slide vertically relative to slide block 158 and will move horizontally with the slide block.

To drive the end effector 120 horizontally and vertically, a drive apparatus is provided which includes a left side drive motor 150 and a right side drive motor 154 (both of which may be servo motors such as the model MPL-B330P-MJ24AA made by Allen Bradley) mounted to either end of beam 108. Servo drive 150 has a drive wheel 152 and servo drive 154 has a drive wheel 156. Both servo motors 150 and 154 can be independently driven in both directions at varying speeds by PLC 132 (FIG. 3) through servo drives. In this regard, both servo motors 150 and 154 may be provided with two separate ports, one for connection to a power line and the other for connection to a communication line to provide communication with the servo drive and PLC 132. Servo motors 150, 154 may also have a third input which may provide input for an electric braking mechanism. It should be noted that all of the servo motors described herein may be similarly equipped.

Four freely rotatable pulley wheels **155*a*, 155*c*, 155*d* and 155*f* are secured to the front face of the slider block 158 and a further freely rotatable pulley wheel 155*b* is attached to the upper end of support tube 169. One end of a drive belt 153—that may for example be made from urethane with steel wires running through it—is fixedly attached to the bottom of support tube 169 by a belt block 159*b*. From there the belt extends upwardly to block pulley 155*f*, around the upper side of block pulley 155*f* and then horizontally to servo drive wheel 152. The belt loops around the servo drive wheel 152 and extends around the underside of pulley 155*a* and then upwards to pulley 155*b*. From there belt extends around pulley 155*b*, downwards to block pulley 155*c*, around block pulley 155*c* and then to servo drive wheel 156. After passing around servo drive wheel 156, belt 153 extends to the upper side of block pulley 155*d*. From block pulley 155*d*, belt 153 then extends vertically downwards to the bottom of the support tube 169 where it attached to the support tube by a belt block 159*a*. With this arrangement, by adjusting the relative rotations of servo drive wheels 152 and 156 through the operation of the servo motors 150 and 154, the vertical position of support tube 169 relative to slide block 158 can be adjusted. Additionally, by adjusting the relative rotations of servo drive wheels 152 and 156, the horizontal position of slide block 158 on rails 160, 162 can be adjusted thus altering the horizontal position of support tube 169 and end effector 120. It will thus be appreciated that by adjusting the direction and speeds of rotation of drive wheels 152, 156 relative to each other the support tube 169 can be moved vertically and/or horizontally in space within the physical constraints imposed by among other things the position of the servo drive wheels 152 and 156, the length of the belt 153, and the length of support tube 169**. The following will be appreciated in particular:

(a) If wheels 152 and 156 both remain stationary then the position of support tube 169 will not be altered;

(b) If wheels 152 and 156 both rotate in the same clockwise direction and at the same speed relative to each other, then support tube 169 (and thus end effector 120) will move horizontally from right to left;

(c) If wheels 152 and 156 both rotate in the same counter-clockwise direction and at the same speed relative to each other, then support tube 169 (and thus end effector 120) will move horizontally from left to right;

(d) If wheel 152 rotates counter-clockwise, and wheel 156 rotates in opposite clockwise rotational directions, but both wheels rotate at the same rotational speed relative to each other, then support tube 169, and thus end effector 120, will move vertically downwardly;

(e) If wheel 152 rotates clockwise, and wheel 156 rotates in opposite counter-clockwise rotational directions, but both wheels rotate at the same rotational speed relative to each other, then plates 164, 166 will move vertically upwardly.

It will be appreciated that if the speeds and directions of the two servo motors are varied in different manner, then the motion of the support tube 169 (and thus end effector 120) can be created that has both a vertical component as well as a horizontal component. Thus any desired path within these two degrees of freedom (vertical in the Z direction and horizontal in the Y direction) can be created for support tube 169—and thus for the end effector 120 (such as a path having curved path portions). Thus, by controlling the rotational direction and speed of the motors 150, 154 independently of each other, PLC 132 can cause support tube 169 (and thus end effector 120) to move along any path within these two degrees of freedom, within the physical constraints imposed by the spacing of the drive wheels 152, 156 and pulley wheel **155*b*, and the bottom of support tube 169**.

An encoder may be provided for each of the servo drive motors 150 and 154 and the encoders may rotate in relation to the rotation of the respective drive wheels 152, 156. The encoders may be in communication with, and provide signals through the servo drives to PLC 132. Thus PLC 132 can in real time know/determine/monitor the position of the belt 153 in space and thus will determine and know the position of the end effector 120 in space at any given time. The particular types of encoders that may be used are known as "absolute" encoders. Thus the system can be zeroed such that due to the calibration of both encoders of both servo drives 150 and 154, the zero-zero position of the end effector in both Z and Y directions is set within PLC 132. The zero-zero position can be set with the end effector at its most horizontally left and vertically raised position. PLC 132 can then substantially in real time, keep track of the position of the end effector 120 as it moves through the processing sequence for a blank 111.

Also associated with moving apparatus 115 is a first, generally horizontally oriented caterpillar device 114 and a second generally vertically oriented caterpillar device 118. Each of the caterpillars 114 and 118 have a hollow cavity housing hoses and wires carrying pressurized air/vacuum and electrical/communication wires. Caterpillar 114 allows such hoses and wires to move longitudinally as the support tube 169 and erector head **120*b* are moved longitudinally. Caterpillar 118 allows such hoses and wires to move vertically as the support tube 169 and erector head 120*b* are moved vertically. The caterpillars allow hoses and wires to supply end effector 120. In this way both pressurized air/vacuum and/or electrical communication wires may be brought form locations external to the frame 109 onto the moving end effector 120. An example of suitable caterpillar devices that could be employed is the E-Chain Cable Carrier System model #240-03-055-0 made by Ignus Inc. It should be noted that electrical communication between the PLC 132 and the end effector 120** could in other embodiments be accomplished using wireless technologies that are commercially available.

End effector 120 has a bottom suction plate 327 with a generally square shape and four peripheral flanged openings, each receiving a suction cup 312. It should be noted that while many types of suction cups may be employed on the end effector, a preferred type of suction cup is the model B40.10.04AB made by Piab. Each suction cup 312 is connected to an outlet from a vacuum generator 330 (FIG. 3). The vacuum generator may be any suitable vacuum generator device such as for example the model VCH12-016C made by Pisco. Vacuum generators each have an inlet interconnected to a hose (not shown) that can carry pressurized air from an air compressor or other vacuum source to the vacuum generator. The vacuum generator converts the pressurized air supplied to the inlet port into a vacuum at one of the outlet ports. That vacuum outlet port is interconnected to a suction cup 312 so that the suction cup can have a vacuum force. A solenoid valve device 340 (FIG. 3) is interposed along the pressurized air channel running between each vacuum generator and the source of pressurized air. The solenoid valve device 340 may for example be a model CPE14-M1 BH-5L-1/8 made by Festo. Valve device 340 is in electronic communication with PLC 132 and controlled by PLC 132. In this way PLC 132 can turn on and off the supply of vacuum force to the suction cups 312.

End effector 120 also has a reciprocating sensor rod 380 which, when not in contact with a carton blank, extends downwards through a central aperture in plate 327, below the level of the plane of suction cups 312. When the end effector 120 is brought vertically downwards to retrieve a blank on a stack of blanks 111 in magazine 110, the erector head's movement just prior to suction cups 312 contacting with the upper surface of the blank will be generally vertically downwards. Prior to the suction cups 312 contacting the surface of a top panel of a blank, sensor rod 380 will impact the top panel and cause sensor rod 380, which may be resiliently displaced due to a spring mechanism biasing the rod downwards, to be pushed upwards. This movement upwards of sensor rod 380 relative to plate 327 will cause a sensor (not shown) to be activated and send a signal to PLC 132. The sensor may be an inductive proximity sensor where a metal cylinder fixed on the rod is sensed by the sensor's circuitry due to changes in the inductance of an induction loop inside the sensor. Such a sensor may be an 871 FM-D8NP25-P3 sensor made by ALLEN BRADLEY. PLC 132. When the PLC receives a signal from the sensor, it may respond to that signal by causing servo drives 150 and 154 to slow down so that the final few centimeters (e.g. 3.5 cm) of movement downwards towards contact between suction cups 312 and the top panel of the blank occurs at a much slower rate. The sensor also allows the PLC to know how much further vertically downwards end effector 120 must be lowered to establish proper contact between suction cups 312 and the top panel of the carton blank. It should also be noted that sensor rod 380 and its associated sensor device can also be used to ensure that PLC 132 is aware of whether, once a blank has been engaged, it remains engaged with the end effector 120 until it is intentionally released.

Figure 10:
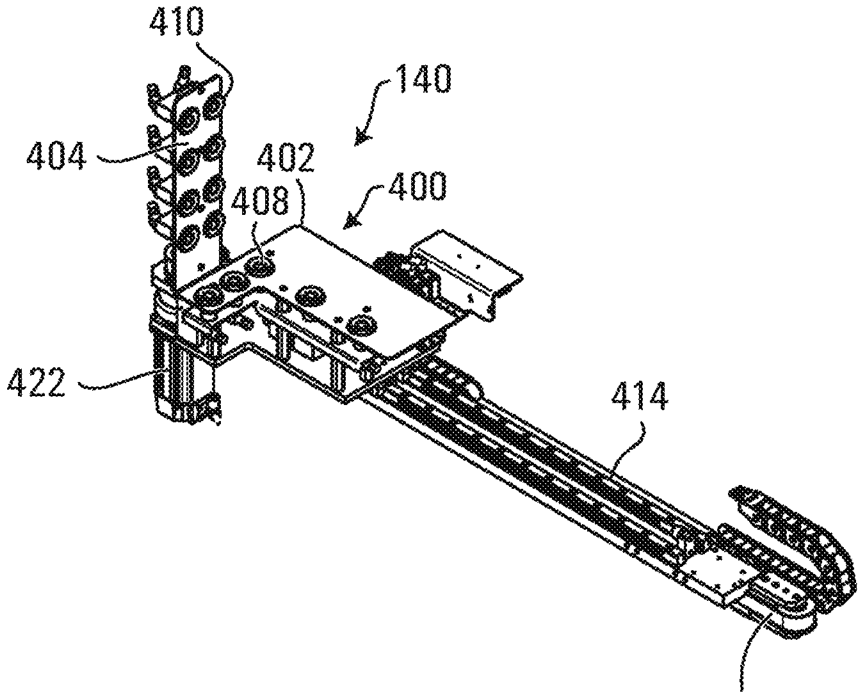
FIG. 10 is a top perspective view of another portion of the system of FIGS. 1 and 2.
Figure 11:
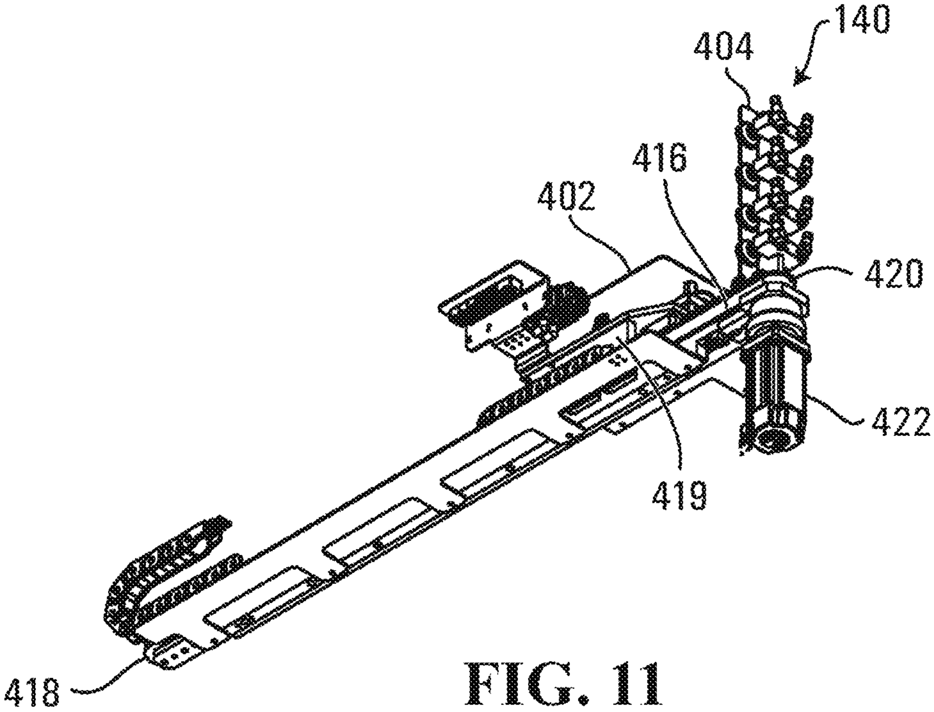
FIG. 11 is a bottom perspective view of the portion of FIG. 10.

Turning to FIGS. 10 and 11, shuttle 140 of system 100 has an L-shaped bed 400 with a horizontally extending base 402 and a vertically extending back wall 404. The base has openings receiving suction cups 408 which are coupled to a solenoid controlled vacuum generator 332 (FIG. 3). Similarly, back wall 404 has openings receiving suction cups 410 coupled to a solenoid controlled vacuum generator 334 (FIG. 3). The shuttle rides on a horizontal rail 414 extending in the X-direction. Rail 414 is supported on the factory floor. The shuttle has a depending belt block 419 attached to an endless drive belt 416. From the belt block, the drive belt extends along rail 414 to free-wheel 418 located at one end of rail 414, around the free-wheel 418 and back along the rail 414 to the its other end where the belt passes around drive wheel 420 of a servo motor 422 and then returns along the rail 414 again to the belt block 419. Given this arrangement, operating the servo motor in a counter-clockwise direction will move the shuttle in a downstream direction (toward the free-wheel 418) and operating the servo motor in a clockwise direction will move the shuttle in an upstream direction (toward servo motor 422).

Figure 12:
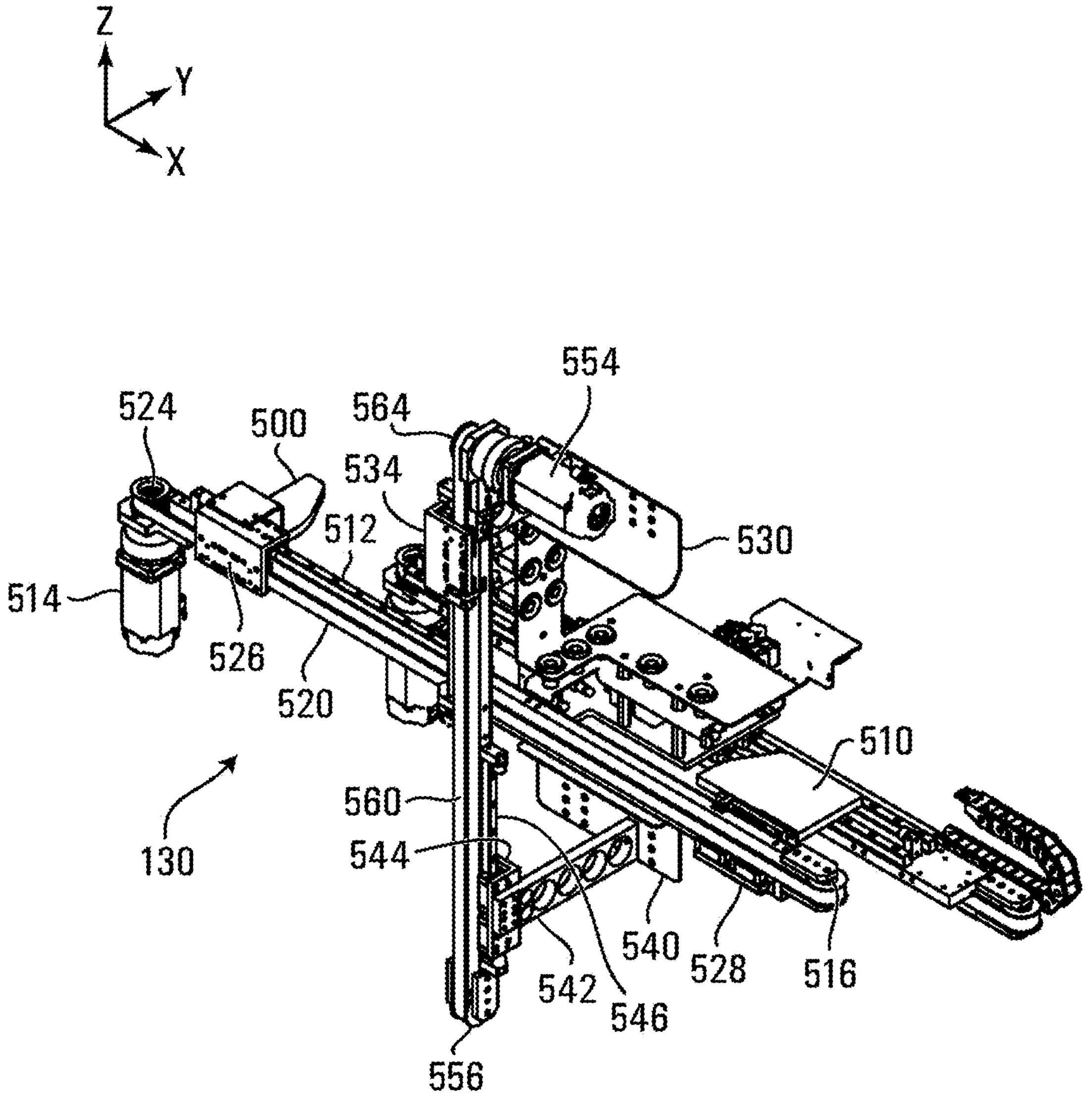
FIG. 12 is a top perspective view of another portion of the system of FIGS. 1 and 2.
Figure 13:
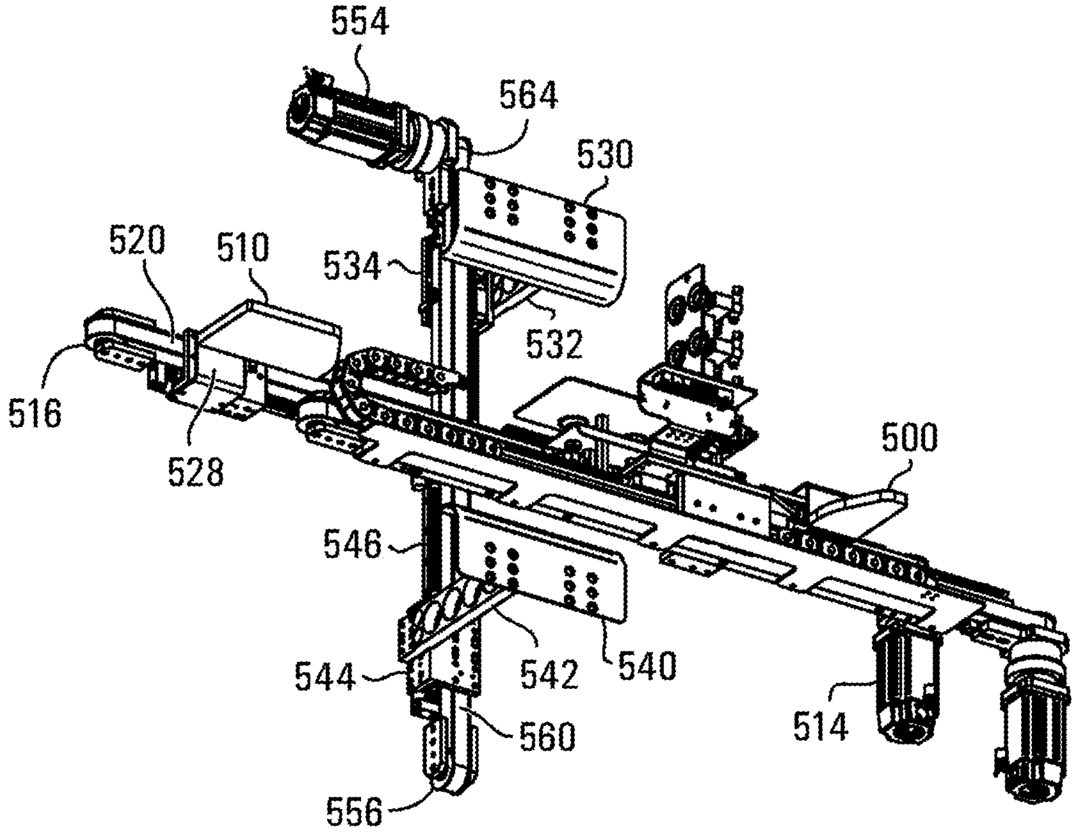
FIG. 13 is a bottom perspective view of the portion of FIG. 12.

FIGS. 12 and 13 detail folding apparatus 130. Turning to these Figures, the folding apparatus has opposed horizontally reciprocating fin ploughs, namely an upstream fin plough 500 and a downstream fin plough 510. These fins are slidably supported on a horizontal rail 512 that extends in the X-direction. A servo motor 514 is attached to the upstream end of rail 512 and a free-wheel 516 is attached to the downstream end of the rail. A continuous drive belt 520 runs around the drive wheel 524 of servo motor 514 and the free-wheel 516. Upstream fin 500 has a back plate 526 which is attached to the drive belt and downstream fin 510 has a front plate 528 attached to the drive belt. With this arrangement, if the servo motor 514 is operated in a counter-clockwise direction, fins 500, 510 move toward each other and when servo motor is operated in a clockwise direction, fins 500, 510 move away from each other. The folding apparatus also has opposed vertically reciprocating folding ploughs, namely an upper plough 530 and a lower plough 540. Each folding plough has a planar base terminating in a curved ploughing face. The ploughs 530, 540 are mounted to the ends of respective support arms 532, 542 and the arms are mounted to carriages 534, 544 slidably supported on a vertical rail 546 (i.e., a rail extending in the Z-direction). A servo motor 554 is attached to the upper end of vertical rail 546 and a free-wheel 556 is attached to the lower end of the rail. A continuous drive belt 560 runs around the drive wheel 564 of the servo motor 554 and the free-wheel 556. A back of the upper carriage 534 is attached to belt 560 and a front of lower carriage 544 is attached to the belt. With this arrangement, if the servo motor 554 is operated in a counter-clockwise direction, folding ploughs 530, 540 move toward each other and if the servo motor is operated in a clockwise direction, folding ploughs 530, 540 move away from each other.

Figure 15:
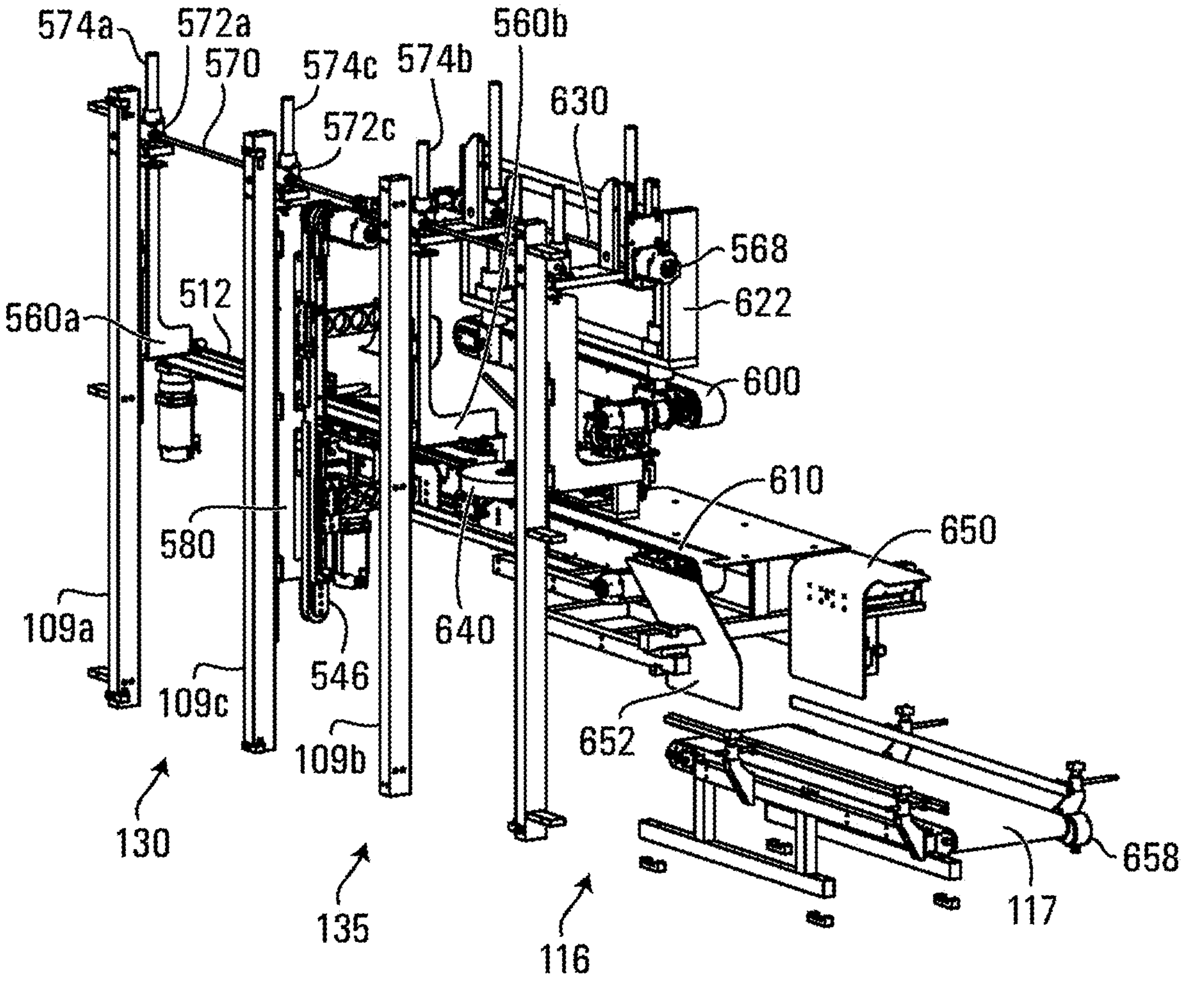
FIG. 15 is a bottom perspective view of the portion of FIG. 14.

Referencing FIGS. 1 and 15 along with FIGS. 12 and 13, the horizontal rail 512 on which fins 500, 510 run is attached at either end to the base of L-shaped supports 560*a*, 560*b*. The L-shaped supports ride in channels 562 of vertical ribs 109*a*, 109*b* of frame 109. A servo motor 568 is geared to a common drive shaft 570 to turn pinions (not shown) inside hubs 572*a*, 572*b*. The pinions mesh with ring gear portions of shafts 574*a*, 574*b* in order to turn, and thereby adjust, the vertical position of the shafts. The shafts are rotatably connected to the top of L-shaped supports 560*a*, 560*b*. The result is that operation of the servo motor 568 in one rotational direction raises the L-shaped supports 560*a*, 560*b*—and therefore fins 500, 510—and operation of the servo motor 568 in the opposite rotational direction lowers the L-shaped supports 560*a*, 560*b*.

Similarly, vertical rail 546 on which folding ploughs 530, 540 run via support arms 532, 542 and carriages 534, 544 is attached to a linear support 580 that rides in a channel of vertical rib 109*c* of frame 109. Common drive shaft 570 also turns a pinion (not shown) inside hub 572*c* and this pinion meshes with a ring gear portion of shaft 574*c* in order to turn, and thereby adjust, the vertical position of shaft 574*c*. The shaft is rotatably connected to the top of linear support 580. The result is that operation of the servo motor 568 in one rotational direction raises the linear support 580—and therefore folding ploughs 530, 540—and operation of the servo motor 568 in the opposite rotational direction lowers the linear support 580. Moreover, since all of supports 560*a*, 560*b*, and 580 are adjusted by common drive shaft 570, these supports are all adjusted to the same vertical extent by operation of servo motor 568.

Figure 14:
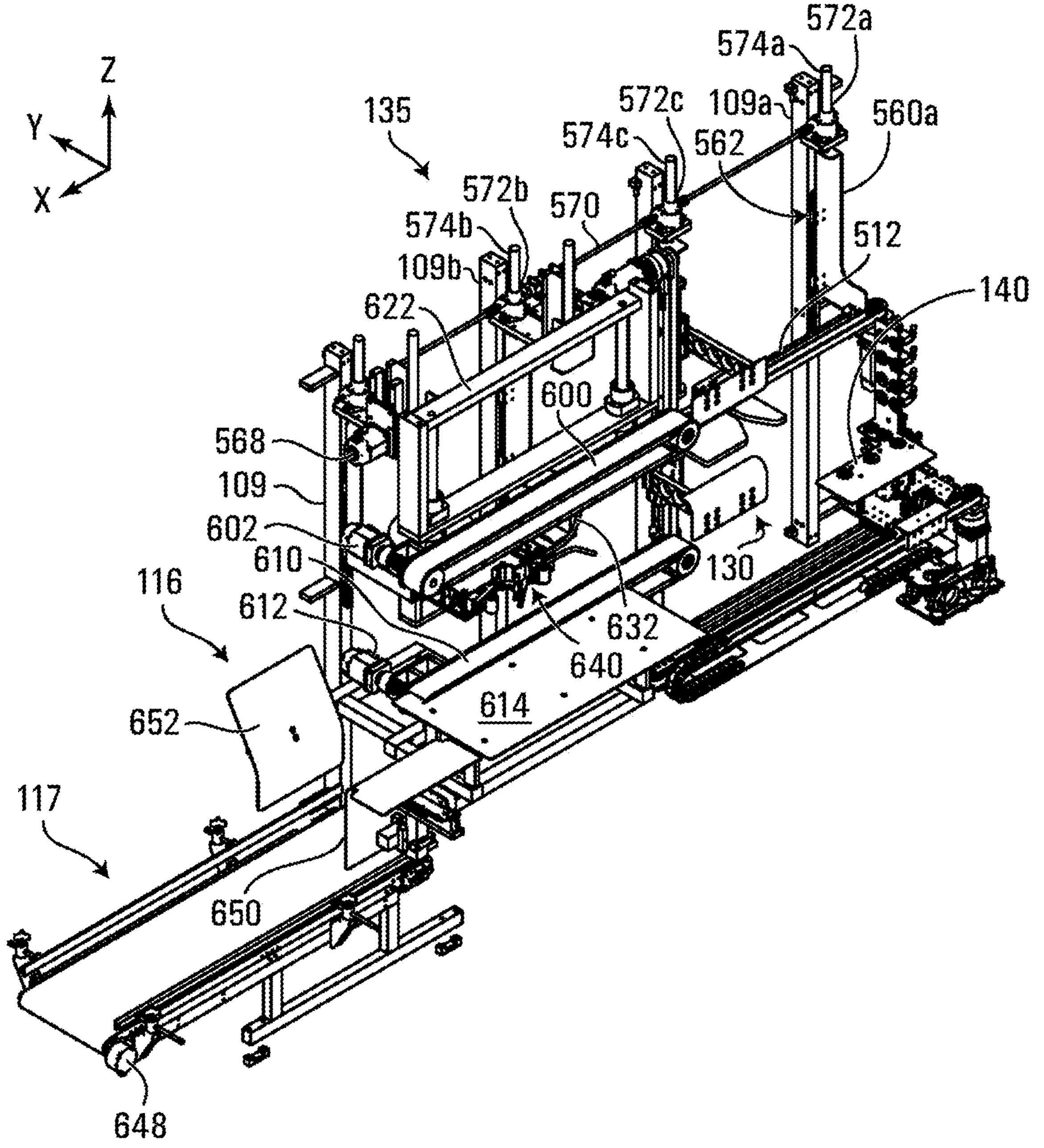
FIG. 14 is a top perspective view of another portion of the system of FIGS. 1 and 2.

Referring to FIGS. 1, 14, and 15 the sealing station 135 has a tape sealer 640 and flap folding rods 632 which are supported by fin supporting rail 512 and so move vertically with fins 500, 510. The sealing station also has a pair of opposed conveyor belts, upper conveyor belt 600 driven by servo motor 602 and lower conveyor belt 610 driven by servo motor 612, with the tape sealer 640 disposed between the conveyor belts 600, 610. The lower conveyor belt 610 and a supporting platform 614 are supported by the factory floor. The upper conveyor belt is mounted to a sub-frame 622. Servo motor 568 has a second drive shaft 630 that is operatively associated with a drive train (not shown) so that operation of the servo motor 568 adjusts the vertical position of sub-frame 622 and, therefore, the upper conveyor belt 600 with respect to the lower conveyor belt 610. Moreover, it will be noted that drive shaft 630 and common drive shaft 570 are driven by the same servo motor, motor 568, such that a vertical adjustment of upper conveyor belt 600 is mirrored by a vertical adjustment of fins 500, 510 and ploughs 530, 540. However, the drive train is configured with a 2:1 drive ratio so that the drive shaft 630 rotates twice for any rotation of common drive shaft 570. The result is that a vertical adjustment of n cm of the fins, folding ploughs, tape sealer and flap supporting rods results in a vertical adjustment of 2*n* cm of the upper conveyor belt 610. This ensures that the centreline of a carton sleeve remains at the level of the fins and tape sealer for any position of the upper conveyor belt 600.

The sealing station terminates at carton re-orienting station 116. The carton re-orienting station has a pair of deflection plates 650, 652 which re-orient a carton as it falls off the end of the sealing station to the discharge conveyor 117 from a position lying on its side at the sealing station 135 to an upright position on the discharge conveyor with its open top facing upwardly. The discharge conveyor 117 is a simple endless belt conveyor driven by a servo motor 658.

A sensor 243 (FIG. 3) such as an electronic eye model 42KL-P2LB-F4 made by ALLEN BRADLEY may be located at the input of the discharge conveyor. Sensor 243 may be positioned and operable to detect the presence or absence of an erected carton at the input to the discharge conveyor 117. In this way, PLC 132 can be digitally signalled if an erected carton blank 111 remains at the input of the discharge conveyor such that another erected carton cannot be discharged. If so, the system 100 can be stopped by PLC 132 until any fault at discharge conveyor 117 can be rectified.

Figure 16:
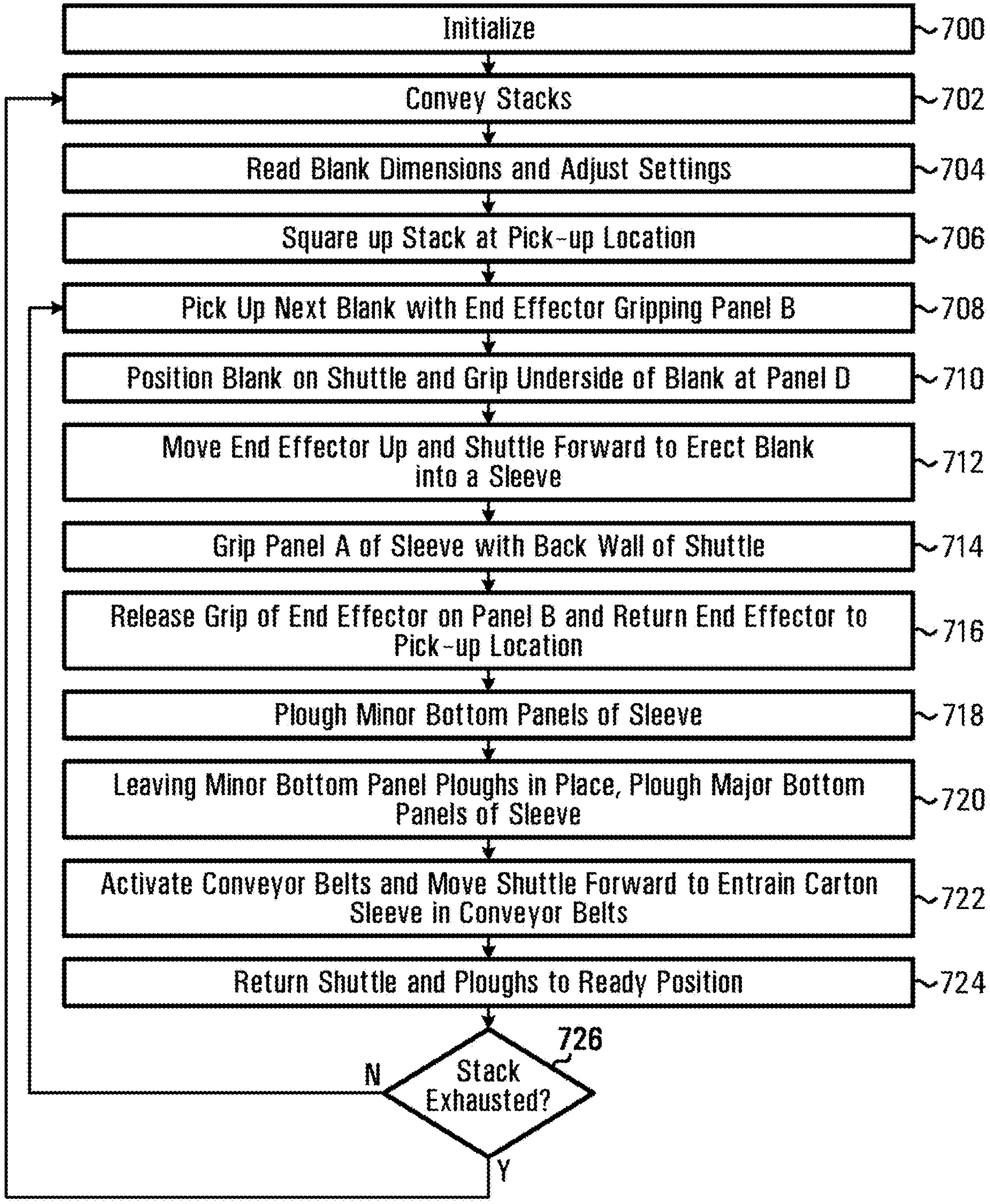
FIG. 16 is a flow diagram illustrating operation of a controller of the system of FIG. 1.

The overall operation of system 100 will now be described further in conjunction with FIG. 16, which is a flow diagram of the sequence of operations of the PLC.

To prepare system 100 for operation, one or more stacks of knock-down carton blanks 111 may be placed at the input end of conveyor 204. In this regard, it is assumed the blanks are placed on the conveyor 204 with panels A and B, and flaps E, F, I, and J facing up, as shown in FIG. 4A, and the common edge of end flaps F and J facing side wall 200 as shown by the blank 111 in FIG. 1. System 100 may then be activated, such as by PLC 132 being instructed through HMI 133 to commence the processing of blanks 111. As an initial step PLC 132 may initialize the system by ensuring that all components are put in their "start" positions (step 700). PLC 132 may then send an instruction to the drive motor of input conveyor 204 causing stack(s) of blanks 111 to be conveyed downstream in the X-direction (step 702) toward an identification reader. An identifier on the first stack may then be read by the identification reader 205 which identifies the dimensions of the blanks in the first stack. With this information and in order to adapt system 100 to process blanks of the size in the first stack, the PLC adjusts the stroke of both the outer side wall 201 and the shuttle 140, the path of end effector 120, the vertical position of the folding fins 500, 510, the folding ploughs 530, 540, the tape sealer 640 and flap folding rods 632, and upper conveyor 600 (step 704).

Sometime prior to a stack of blanks reaching alignment conveyor 206, the outer side guide wall 201 under control of PLC 132 will be driven by servo motor 260 to expand wide enough to allow the stack of blanks to enter alignment conveyor 206, even if the stack is misaligned and/or the blanks in the stack are not perfectly square with each other. The stack(s) of blanks moves downstream, until the front edge of the (first) stack of blanks passes the downstream edge of conveyor 204 at which time sensor 242 sends a signal to PLC 132 indicating that the front edge of the stack has reached the input to alignment conveyor 206. In response, PLC 132 may stop input conveyor 204 and send an instruction to the drive motor of alignment conveyor 206 to cause the stack of blanks 111 to move downstream towards end picket wall 218 of magazine 110. Once the front edge of the stack of blanks 111 reaches end wall 218, sensor 240 will send a signal to PLC 132 indicating that the front edge of the stack of blanks has reached end wall 218. In response, PLC 132 can then move the outer side wall 201 inwardly to straighten the stack laterally and initiate the tamping sequence to "square up" the stack of blanks longitudinally, as detailed above (step 706).

In review, the sequence for ensuring the blanks are properly squared up at the pick-up location may include the following steps. The side guide wall 201 moves inwardly to make contact with the side of the stack of blanks and press the stack against the left hand side guide wall 200. This aligns the blanks so the lateral edges of the blanks are aligned with each other. This also moves the tamping plate 280 in behind the stack. The tamping plate 280 may then move forwardly to press the stack forward against the picket wall 218, thereby aligning the blanks in the stack longitudinally so that their front and rear edges are vertically aligned with each other. The stack of blanks 111 is then properly positioned at the pick-up location so that the end effector 120 can begin picking up blanks from the stack.

End effector 120 will be positioned by the control of PLC 132 over movement apparatus 115, at the zero position calibrated for the end effector 120. PLC 132 may then cause servo motors 150 and 154 to be operated to achieve the following sequence of operations.

First the end effector 120 may be moved to the pick-up location as shown in FIG. 1 such that the end effector is directly over panel B of the top blank in the stack of blanks at the pick-up location.

As the end effector 120 is brought vertically downwards to retrieve the top blank on the stack of blanks 111 in magazine 110, the end effector's movement just prior to suction cups 312 contacting with the upper surface of the blank will be generally vertically downwards. Prior to the suction cups 312 contacting the surface of a panel B of a blank, sensor rod 380 will contact the surface of panel B and be pushed upwardly. This upward movement of sensor rod 380 relative to plate 327 will cause a sensor to be activated and send a signal to PLC 132. PLC 132 responds to that signal by causing servo drives 150 and 154 to slow down so that the final few centimeters (e.g. 3.5 cm) of movement downwards towards contact between cups 312 and the upper surface of panel B occurs at a much slower rate. Also, PLC knows how much further vertically downwards the end effector 120 must be lowered to establish proper contact between suction cups 312 and panel B. PLC 132 will then operate the valve device 330 on end effector 120 to cause suction force to be developed at suction cups 312. Sensor rod 380 and its associated sensor device can also be used to ensure that PLC 132 is aware of whether, once a blank has been engaged in the magazine 110, it remains engaged with end effector 120 until it is intentionally released.

With the end effector 120 in the pick-up location and the suction force being applied at suction cups 312, the end effector 120 engages panel B of the top blank and then lifts the blank lift upwards (step 708).

When the end effector 120 has reached a determined height it is moved laterally in the Y-direction until it is positioned over shuttle 140.

Figure 17:
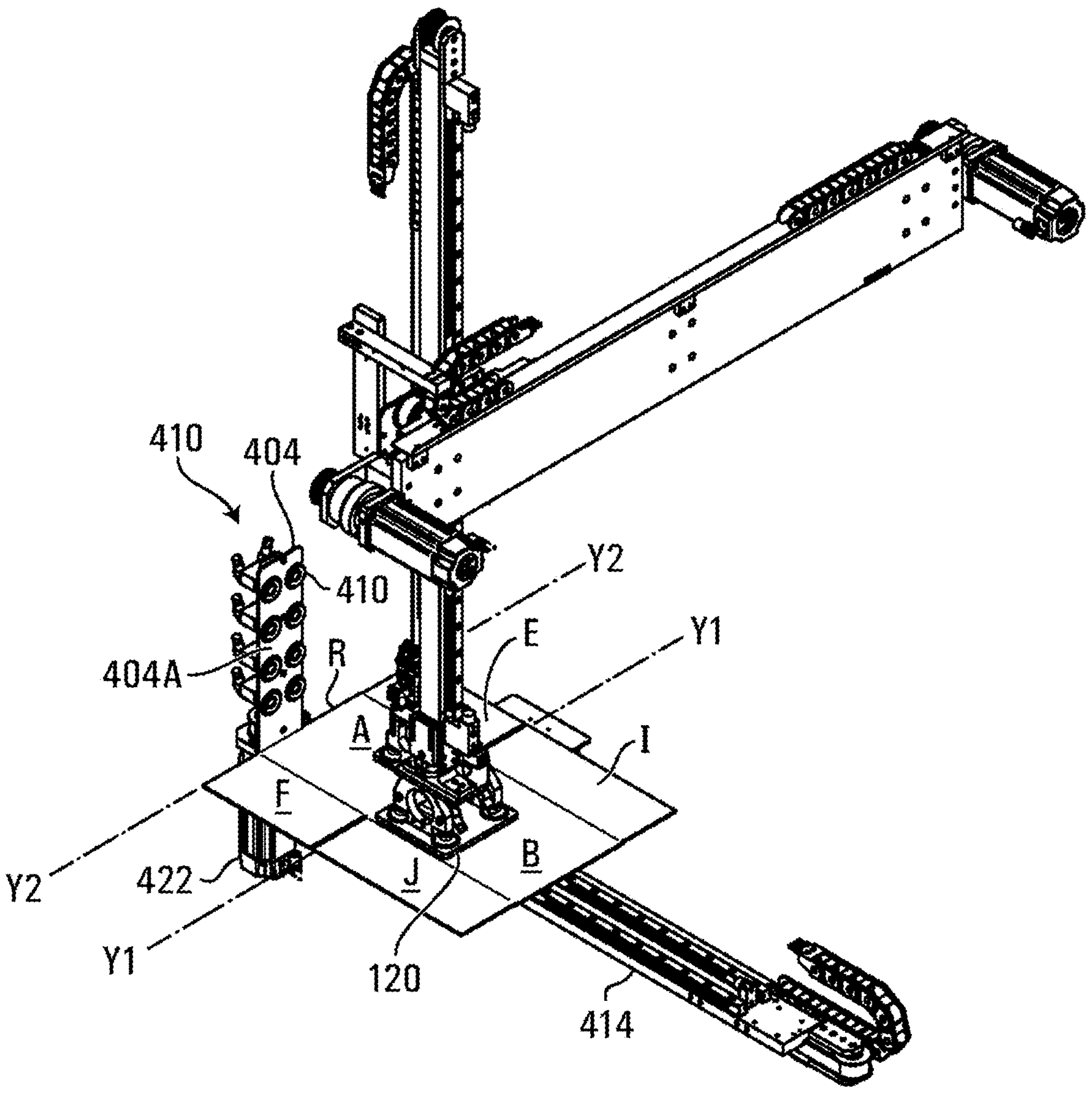
FIGS. 17 to 20 and 22 are top perspective views of a portion of the system of FIGS. 1 and 2 illustrating erection of a knock-down blank into a carton.

Next, with reference to FIG. 17, the end effector descends until the blank sits on the bed 400 of the shuttle with the hinge line R between side panel A and side panel D (FIG. 4B) positioned against the vertically extending back wall 404 of the shuttle 140. The PLC then activates the suction cups 408 at the base 402 of the shuttle bed to grip the underside of the blank, and specifically side panel D of the blank (step 710). Notably, side panel D, being the panel directly underneath side panel A in the knock-down blank, is not directly hinged to panel B, which panel is gripped by the end effector.

Figure 18:
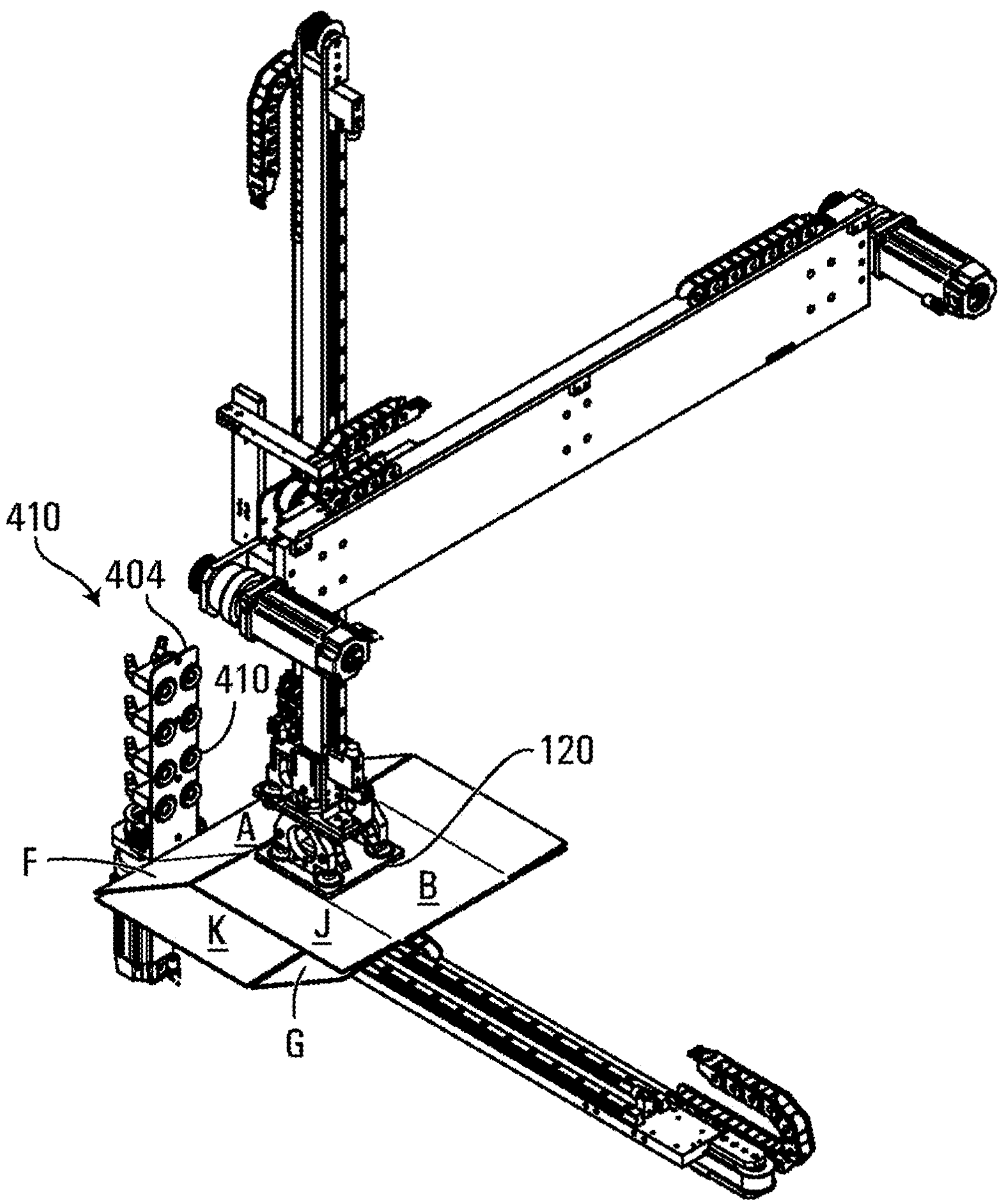

The end effector 120 is then raised vertically in the Z-direction while, simultaneously, the shuttle 140 is moved forwardly in the X-direction. In consequence of these operations, provided the simultaneous motions of the end effector and shuttle are appropriately co-ordinated, since underside panel D of the blank is gripped at the base of the shuttle and top panel B of the blank is gripped by the end effector, the blank begins to open up as illustrated in FIG. 18.

Figure 19:
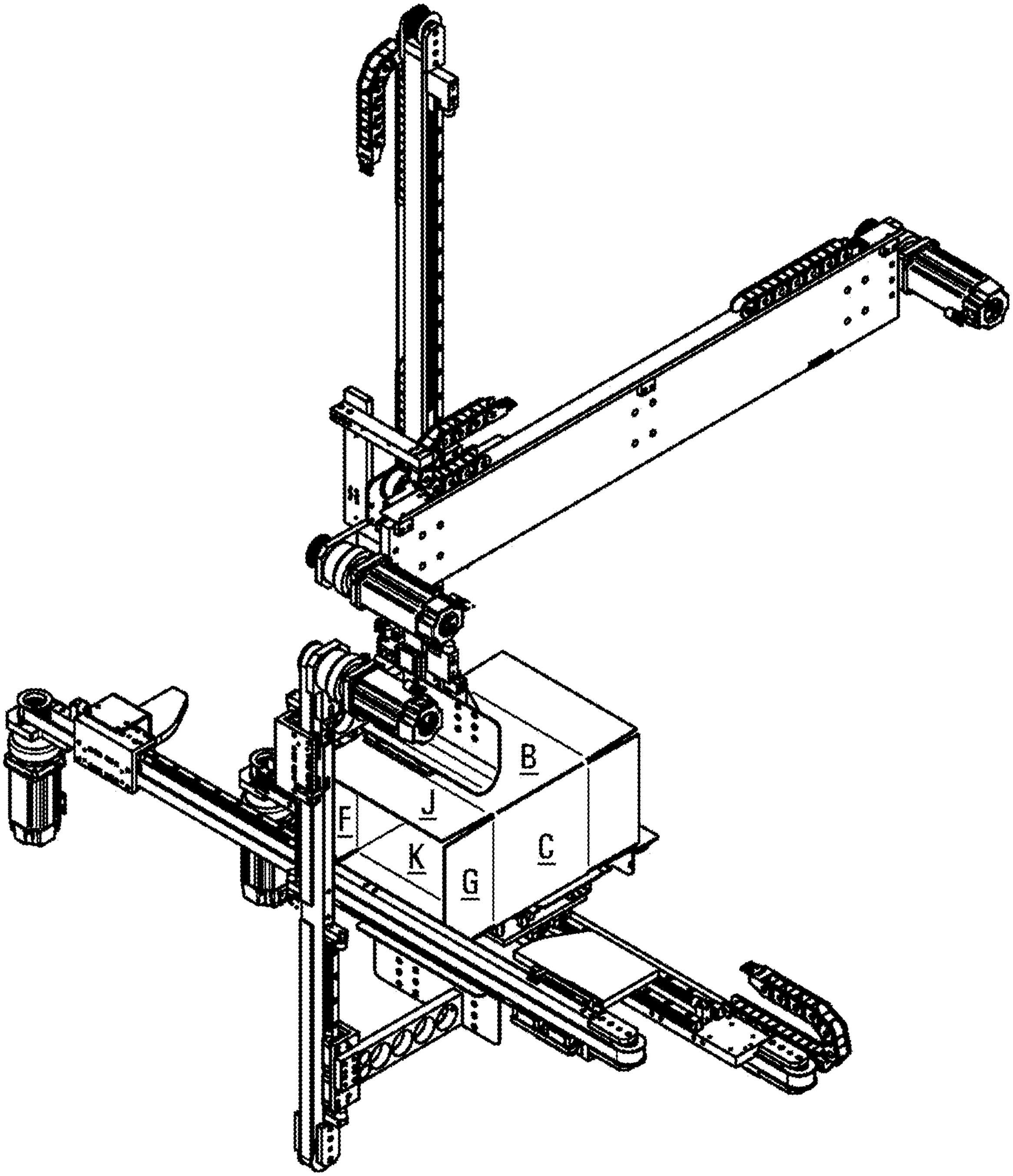

The end effector 120 continues to move vertically upwardly and the shuttle simultaneously continues to move forwardly until the blank is fully erected into a carton sleeve as illustrated in FIG. 19. The PLC will recognize this end point due to its knowledge of the dimensions of the sleeve. With the blank formed into a carton sleeve, panel A of the sleeve (seen in FIG. 18) abuts the back wall 404 of the shuttle 140 (step 712).

With panel A abutting the back wall 404 of the shuttle, the suction cups 410 of the back wall are activated so that panel A is gripped by the back wall 404 of the shuttle (step 714). With both panels A and D held by the shuttle, the carton sleeve is held in its erect position without need of support from end effector 120. Therefore, at this stage, the suctions cups 312 of the end effector 120 are de-activated and the end effector is moved away from the shuttle 140 back to the pick-up location (step 716).

Figure 20:
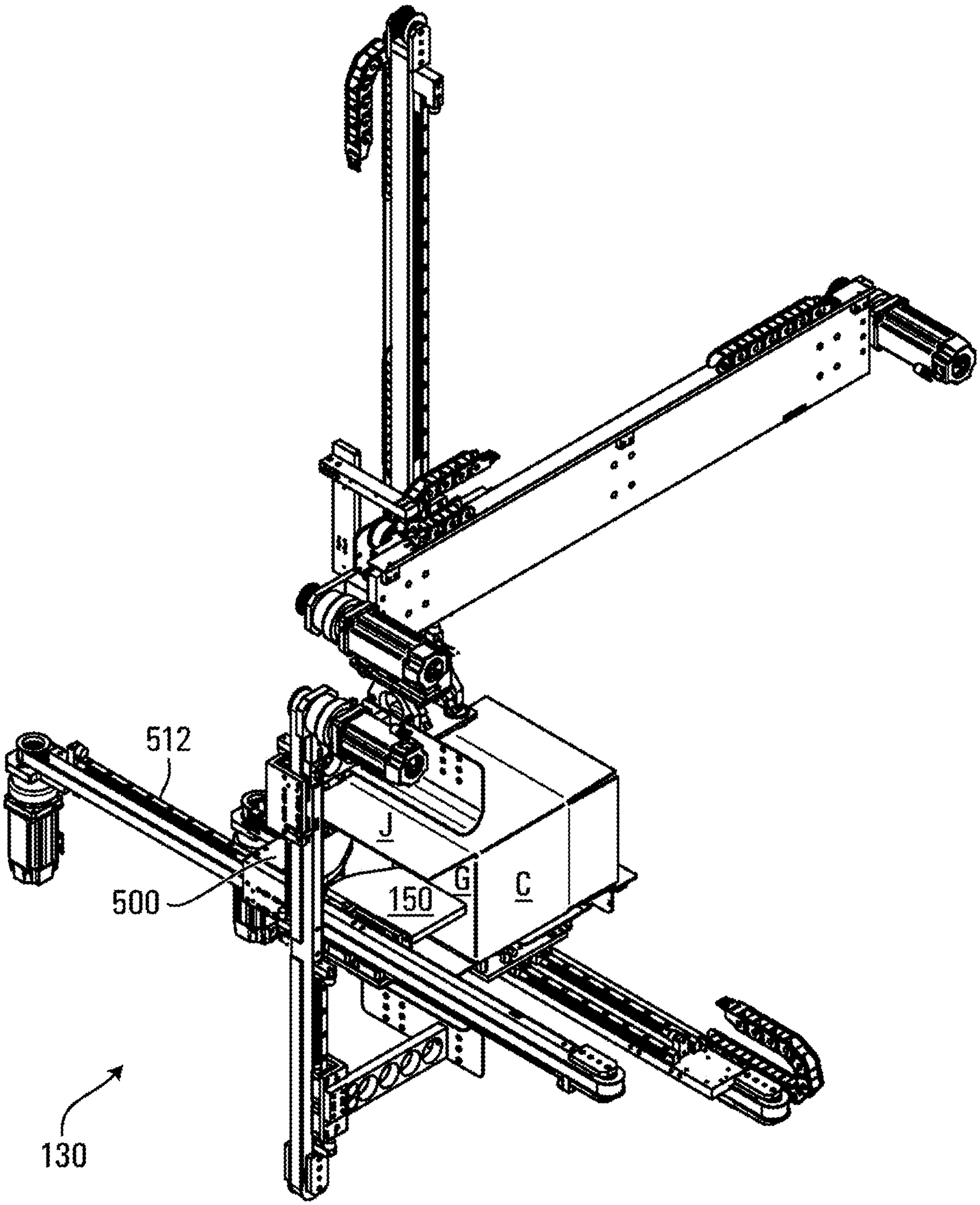
Figure 21:
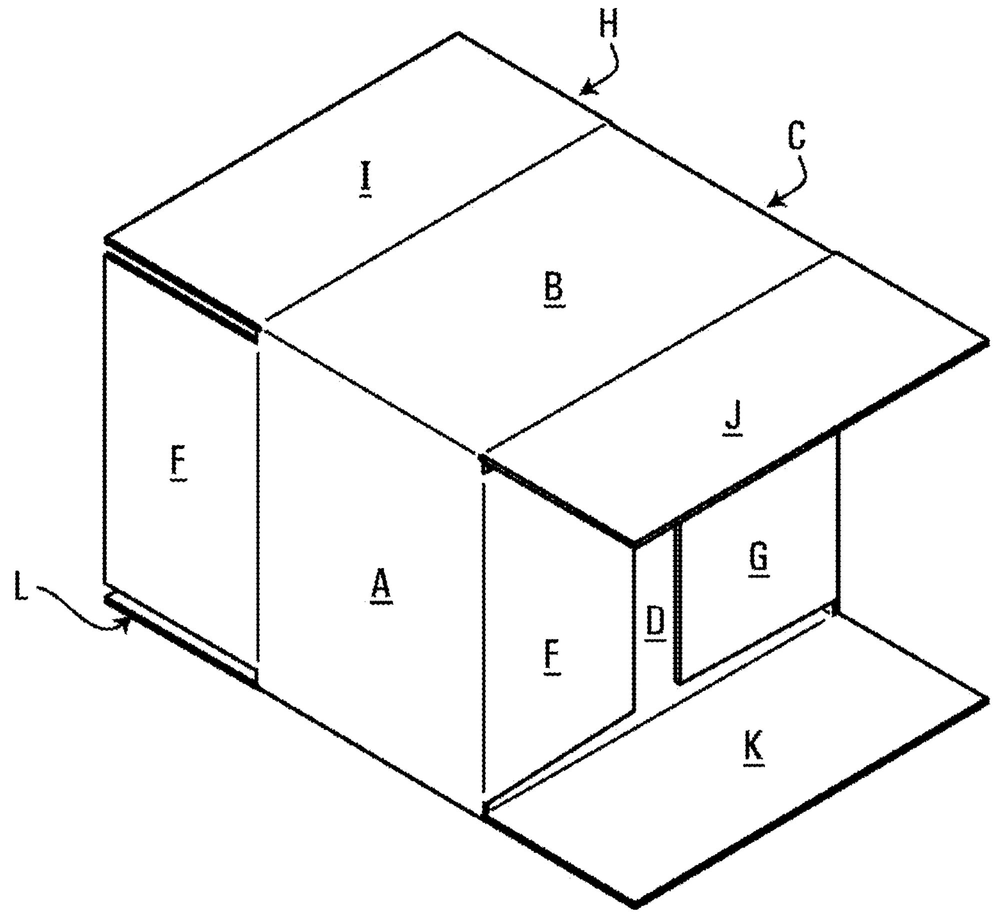
FIGS. 21 and 23 are perspective views of a carton sleeve at different stages of being erected into a carton.

Next, with shuttle 140 held stationary, fin ploughs 500, 510 are moved toward one another until they are adjacent one another as shown in FIG. 20 (step 718). This has the effect of folding minor bottom end panels F and G of the carton sleeve inwardly, as shown in FIG. 21. In this regard, it will be recalled that the vertical position of the fin ploughs 500, 510 was set based on the size of the blank. This setting is so as to result in the fin ploughs contacting panels F and G at their midpoint.

Figure 22:
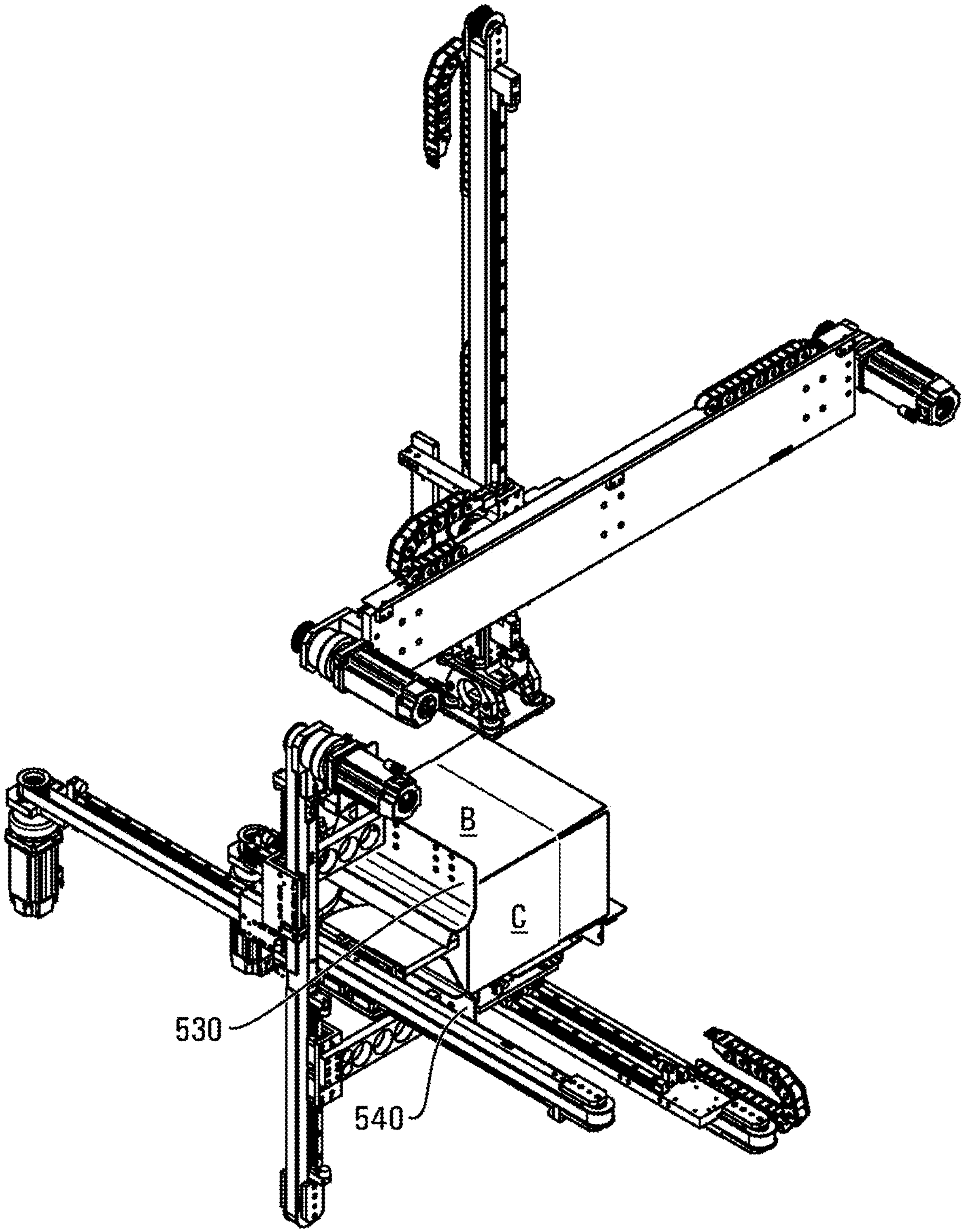
Figure 23:
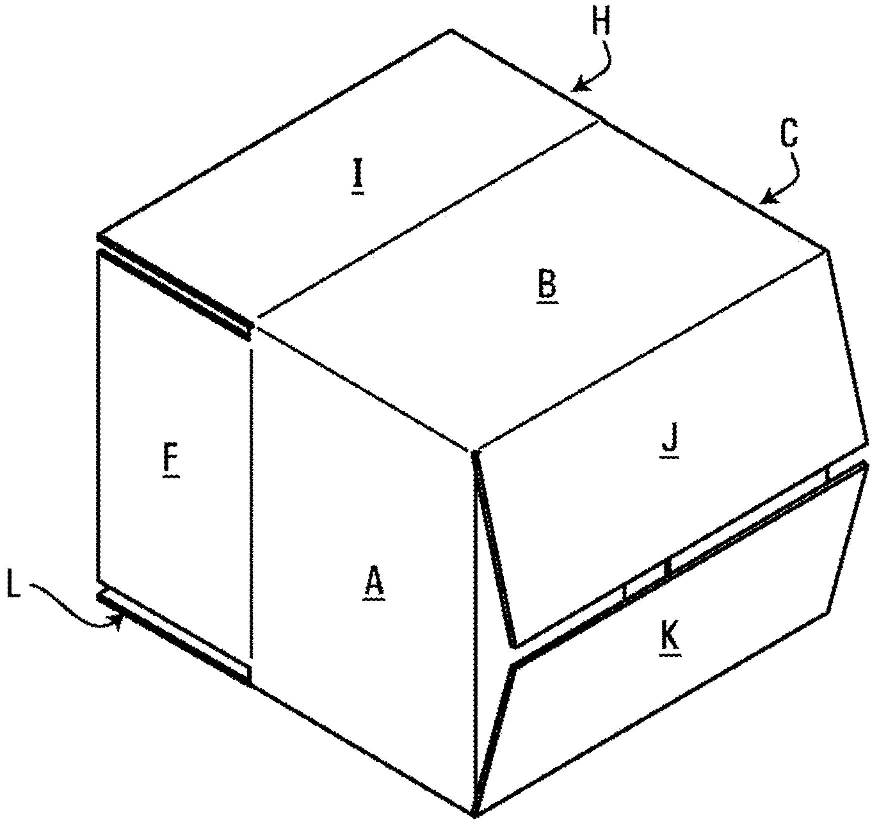

With the shuttle remaining stationary and the fin ploughs remaining adjacent one another, the upper and lower ploughs 530, 540 are next moved toward one another until these ploughs are positioned at a small stand off from fin ploughs 500, 510 as shown in FIG. 22 (step 720). This has the effect of folding major bottom flaps J and K of the carton sleeve inwardly, as shown in FIG. 23.

Leaving all of the ploughs in place, the PLC next activates conveyor belts 600, 610 and moves the shuttle 140 downstream until the belts frictionally grip side panels B and D of the carton sleeve and pull it downstream, extracting it from the ploughs (step 722).

As the sleeve is pulled downstream from the ploughs 500, 510, 530, 540, the outside surface of major bottom flaps J and K are brought into contact with folding rods 632 which progressively complete the fold of flaps J and K. The carton sleeve is then pulled past taping sealer 640 by conveyor belts 600, 610 at which sealer the seam between flaps J and K is taped in order to tape closed the bottom of the carton sleeve to form a carton. The carton is then ejected to the re-orienting station where it is deflected by deflector plates 650, 652 as it falls onto the discharge conveyor 117 so that the bottom of the carton (i.e., flaps J and K) rest on the discharge conveyor. The discharge conveyor then conveys the carton to the output of system 100.

Once the carton sleeve has moved downstream from the ploughs 500, 510, 530, 540, these ploughs are retracted from one another and the shuttle 140 is returned to its initial position in order to prepare system 100 for processing the next carton blank (step 724); the end effector can then pick up the next blank in the stack (step 726).

After exhausting the current stack of blanks, the next stack is conveyed to the information reader 205 and the PLC will read the dimensions of blanks in the next stack (step 726). Thereafter, once the last blank in the current stack has moved downstream of the conveyor belts 600, 610, if the blanks in the next stack have different dimensions from the dimensions of blanks in the now exhausted stack, the PLC adjusts the stroke of the outer side wall 201 and the shuttle 140, the path of end effector 120, and the vertical position of the folding fins 500, 510, the folding ploughs 530, 540, tape sealer 640 with folding rods 632, and upper conveyor 600. System 100 is then readied to handle the next stack and it is moved to the pick-up location and the described processing operations repeated.

The system provides a relatively high processing capacity in part due to the relatively short "stroke" (i.e. longitudinal distance) that the end effector and shuttle must travel when carrying out the blank retrieval and erection. This means that the components do not have to travel such a great distance as in conventional carton erectors.

The system also has a relatively small footprint due to the U-shaped path provided for cartons blanks erected into cartons by the system. More specifically, incoming blanks are conveyed in an upstream X-direction to the pick-up location. These blanks are then conveyed in a Y (and Z) direction to the shuttle where they are then conveyed downstream in the X-direction.

Many variations of the embodiments described above are possible. By way of example the system may employ a second movement apparatus and end effector, identical in construction to movement apparatus 115 and end effector 120, but a mirror image thereof. With such an arrangement, the two devices may be mounted side-by-side with the two end effectors operating in the same plane. Collisions between the two end effectors can be avoided by operating the two movement apparatus such that the two end effectors are always 180° out of phase with one another.

Figure 24:
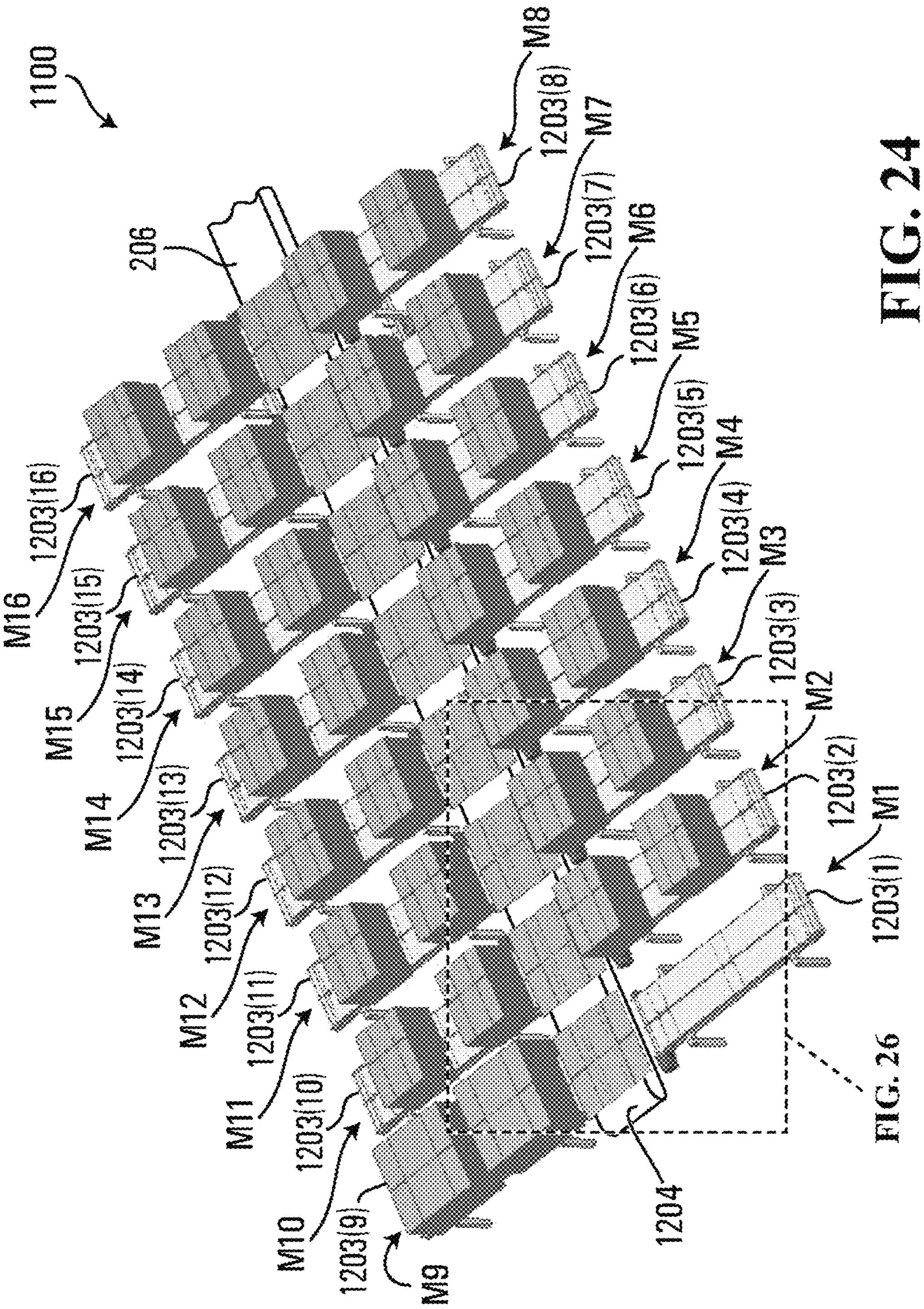
FIG. 24 is a perspective view of an input end of a system made in accordance with another embodiment.
Figure 25:
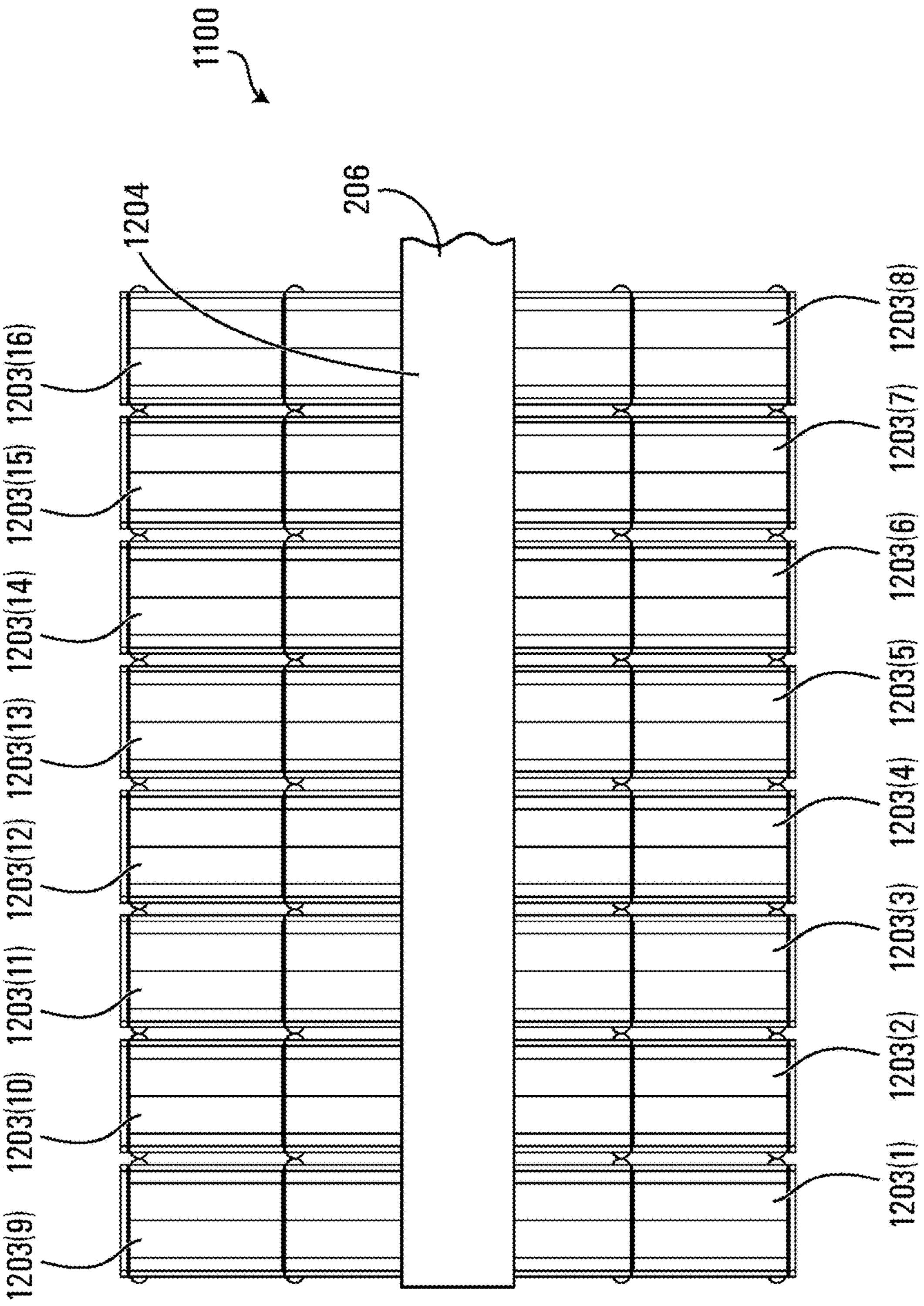
FIG. 25 is a plan view of FIG. 24.

In another embodiment, as an alternate to magazine 110 in carton forming system 100 as described above, a modified carton forming system 1100 may have a plurality of magazines. FIGS. 24 and 25 illustrate the input end of such a modified system 1100 with a plurality of magazines M1-M16 that feed to a common in-feed conveyor 1204. The in-feed conveyor 1204 feeds to alignment conveyor 206, and the remainder of the modified system, being identical to system 100, is not illustrated.

Magazines M1-M16 may each contain one or more stacks of product packaging, such as case blanks which each may generally be like blanks 111 processed by system 100, with at least some of the magazines M1-M16 containing different types/sizes and/or configurations of packaging/case blanks to other magazines. The size, configurations and types of case blanks (and the cases that can be formed therefrom) can vary to provide a range of case sizes, configurations and types that can be automatically processed by the system 1100 without the need for any manual intervention to modify any components of the system. PLC 132 of system 1100 may be programmed such that the particular dimensions/overall size/configuration (e.g. such as regular slotted carton or "RSC")/type of each of the blanks held in each one of the magazines M1-M16 is stored in the memory of the PLC 132.

Each magazine M1-M16 may have its own blank transfer apparatus that may each include a transversely oriented magazine conveyor 1203(1) to 1203(16) respectively. Each conveyor 1203(1) to 1203(16) (referred to generically as a magazine conveyor 1203) may be controlled by PLC 132, such that a stack of blanks in each magazine M1-M16 may be moved to a position adjacent a longitudinally oriented, central case blank in-feed conveyor 1204. Each magazine M1-M16 may have a transfer apparatus under the control of PLC 132 that is operable to extract and move a blank from a stack in the magazine M1-M16 adjacent to in-feed conveyor 1204 and feed it onto central in-feed conveyor 1204 so that it may be transported.

Figure 26:
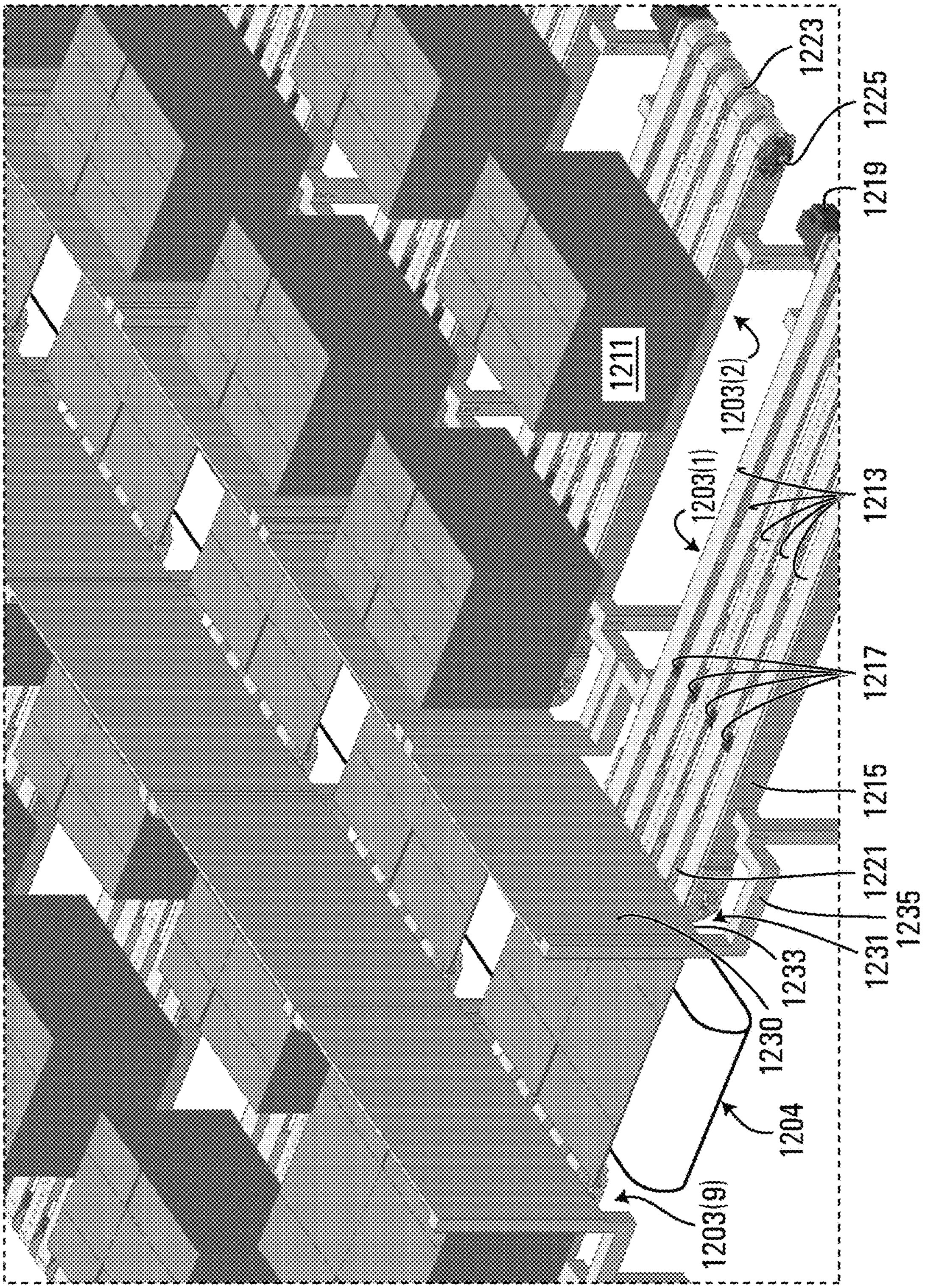
FIG. 26 is a detail perspective view of a portion of FIG. 24.

With reference now to FIG. 26, by way of representative example of the construction of a magazine, magazine conveyor 1203(1) may include a frame 1215 that supports five, generally parallel, and spaced continuous belts 1213 that may be made of any suitable flexible material such as Ropanyl. The belts 1213 may each extend between rotatable idler wheels 1221 mounted on a freely rotatable shaft and rotatable drive wheels 1223. Drive wheels 1223 may be mounted for rotation with and to a common drive shaft 1225 of a servo motor 1219 that may be interconnected via and in communication with a servo drive to the PLC 132 of system 1100. Conveyor belts 1213 may each have an upper belt portion that together may support one or more stacks of blanks 1211 thereon. PLC 132 may give an instruction (such as by order fulfilment processor 1300) to form a case, and if required, PLC 132 may cause upper belt portion of belt 214 to move towards in-feed conveyor 1204 by operation of servo motor 1219 rotating drive wheels 1223. In this way belt 214 can, if necessary, move a stack of blanks 1211 to a position adjacent to the in-feed conveyor 1204.

Positioned proximate the end of each magazine conveyor 1203 adjacent in-feed conveyor 1204 may be a vertically and longitudinally oriented plate 1230 (not shown in FIGS. 24 and 25). Each plate 1230 may be supported by a plurality of plate support members 1235 that may be part of frame 1215. A lower longitudinally extending edge 1233 of plate 1230 may be positioned so that only the bottom blank in a stack of blanks (i.e. the blank that is immediately above the upper portions of the belts) can pass through a slot provided beneath lower edge 1233 of plate 1230 and the horizontal plane formed by the upper surface of the upper portions of the belts 1213. In this way, a slot 1231 can be provided that can permit a single blank at a time from the bottom of the stack to be pushed transversely through the slot and onto the in-feed conveyor 1204.

A pushing mechanism may be provided to respond to signals from PLC 132 of the case former to push a blank in a magazine from the bottom of the stack though the slot 1204 and onto in-feed conveyor 1204. The pushing mechanism may be any suitable type of device and may for example include a plurality of lugs 1217 located in the spaces between belts 1213. The lugs may be driven in a cyclical path by a common type crank mechanism (not shown) that may include a common pneumatic or hydraulic cylinder with a piston controlled by PLC 132 by activating appropriate valves to suitably control the flow of pressurized air/hydraulic fluid to the cylinder. The cylinder may have a piston arm attached to a longitudinally oriented bar member that may be mounted for rotation. The crank mechanism may be configured to provide a path for the lugs 1217 that commences in a position behind the bottom blank in a stack, then moves transversely between the belts 1213 while engaging the rear side edge of the bottom blank thereby pushing the bottom blank through the slot 1231. Once the crank mechanism reaches the end of the stroke, the lugs 1271 will descend downwards beneath the stack of blanks and move transversely in an opposite direction back to the starting position, while at the same time not engaging the next bottom blank on the stack and passing beneath the stack. The path returns the lugs 1217 back to the start position so that when signalled by PLC 132 to load another blank onto conveyor 1204, the operation can be repeated.

In summary, PLC 132 can thus control motor 1219 and thus the movement of each conveyor 1203 as well as the movement of the lugs 1281, and thus is able to selectively move and transfer a single blank at a time onto in-feed conveyor 1204 from any one of magazines M1 to M16.

Therefore, unlike in system 100 where a stack of case blanks may be fed to the alignment conveyor 206 by in-feed conveyor 204, in the modified system separate individual case blanks may be fed in series and longitudinally by in-feed conveyor 1204 to alignment conveyor 206. The particular sequence/order of carton blanks that are placed onto in-feed conveyor 1204 of system 1100 may be determined and selected by PLC 132 such that case blanks may arrive at alignment conveyor 1206 in such a desired manner in which it is desired to process the blanks at least within system 1100.

Further, PLC 132 may maintain in its memory records of case blanks that have been placed onto in-feed conveyor 1204. For example, this information may include the type/size/configuration of the case blank and, where the system 1100 includes a labeller, the label information to be applied to the carton blank. A new record can be added each time a request for a new carton is received and, optionally, records can be removed once a carton has been formed (and labelled). Thus, such records may be organized and maintained in sequence in the memory of PLC 132 using a conventional shift registering technique. In this way, the record for the next carton blank scheduled to arrive at alignment conveyor 206 may be provided at the output of the shift registers as that carton blank arrives, and the type/configuration/size of that carton blank and the label information for that case blank may be determined from the provided output.

Once transferred from in-feed conveyor 1204 to alignment conveyor 206, the alignment conveyor 206 may then under the control of PLC 132 move each blank sequentially to the pick-up location in the manner described previously with respect to system 100. In this regard, conveyor 1204 may be constructed substantially like conveyor 204.

A sensor (not shown) such as an electronic eye model 42KL-D1 LB-F4 made by ALLEN BRADLEY, may be located within the horizontal gap between in-feed conveyor 1204 and alignment conveyor 206. The sensor may be positioned and operable to detect the presence of the front edge of a blank as each blank in turn begins to move over the gap between the conveyors. Upon detecting the front edge, sensor may send a digital signal to PLC 132 signalling that a particular blank (the size/configuration/type of which PLC 132 is aware) has moved to a position where conveyor 206 can start to move. PLC 132 can then cause the motor for conveyor 206 to be activated to move the blank downstream. In this way, there can be a "hand-off" of each blank from in-feed conveyor 1204 to alignment conveyor 206.

Once the rear edge of each blank passes the sensor, a signal may be sent to PLC 132 which can then respond by sending a signal to shut down the motor driving conveyor 1204. Conveyor 1204 is then in a condition to await a further signal thereafter to feed the next blank in the series of blanks on the conveyor 1204 to alignment conveyor 206. Meanwhile system 1100 can be operated to move the blank on alignment conveyor 206 to the pick-up location in the manner described in conjunction with system 100 so that processing of the blank can continue as described in conjunction with system 100.

Optionally, PLC 132 may verify that the type/size/configuration of the case blank at the pick-up location matches the expected case blank. For example, the top surface of each case blank may include a bar code identifying its type/size/configuration, and this bar code may be read at the pick-up location by a suitably positioned bar code reader. The type/size/configuration of the case blank read from this bar code may be compared to the expected type/size/configuration of case blank, which may be determined from a record of the next scheduled case blank stored in memory of the PLC, as described above. Verification is successful when there is a match. When there is not a match, PLC 132 may issue a signal requesting manual operator intervention.

The system has been described as having a PLC. Optionally, any other suitable controller may be substituted, such as a programmed general purpose computer.

The carton blank, and resulting sleeve, has been described as being gripped with suction cups. Of course, any other suitable grippers may be employed As noted above, it is contemplated that within a certain range of types/sizes/shapes of blanks, carton forming systems 100/1100 can process different types/sizes/shapes of blanks (within certain constraints/limits) without manual adjustment of any components of system 100/1100. Also, it is contemplated that PLC 132 in systems 100/1100 may store information about the dimensions of different types/sizes/shapes of blanks 111 (eg. a height dimension "Ht"; a length dimension "L"; a major panel Length "Q" and also a case depth $D_p$—as shown in FIG. 4A) and then PLC 132 can determine adjustments, if any, that need to be made to (a) the components of the magazine; (b) the movement of the end effector 120; (c) the movement of the shuttle 140; and (d) at least some of the components of the folding apparatus 130 and some components at the sealing station 135 to be able to process a particular blank. The result is that system 100 may be able to automatically process several different types of blanks to form different size/shape/type cartons, without having to make manual operator adjustments to any components of system 100.

With reference to FIG. 4A, it is contemplated that, by way of example only, that system 100 can process case blanks have the following ranges of dimensions:

Height Ht—in the range of 7" to 30" (17.78 cm to 76.2 cm)

Length L—in the range of 9" to 40" (22.86 cm to 101.6 cm)

Depth $D_p$—in the range of 4.5" to 20" (11.43 cm to 50.8 cm)

Major Panel Length Q—in the range of 4" to 20" (10.16 cm to 50.8 cm).

Figure 1A:
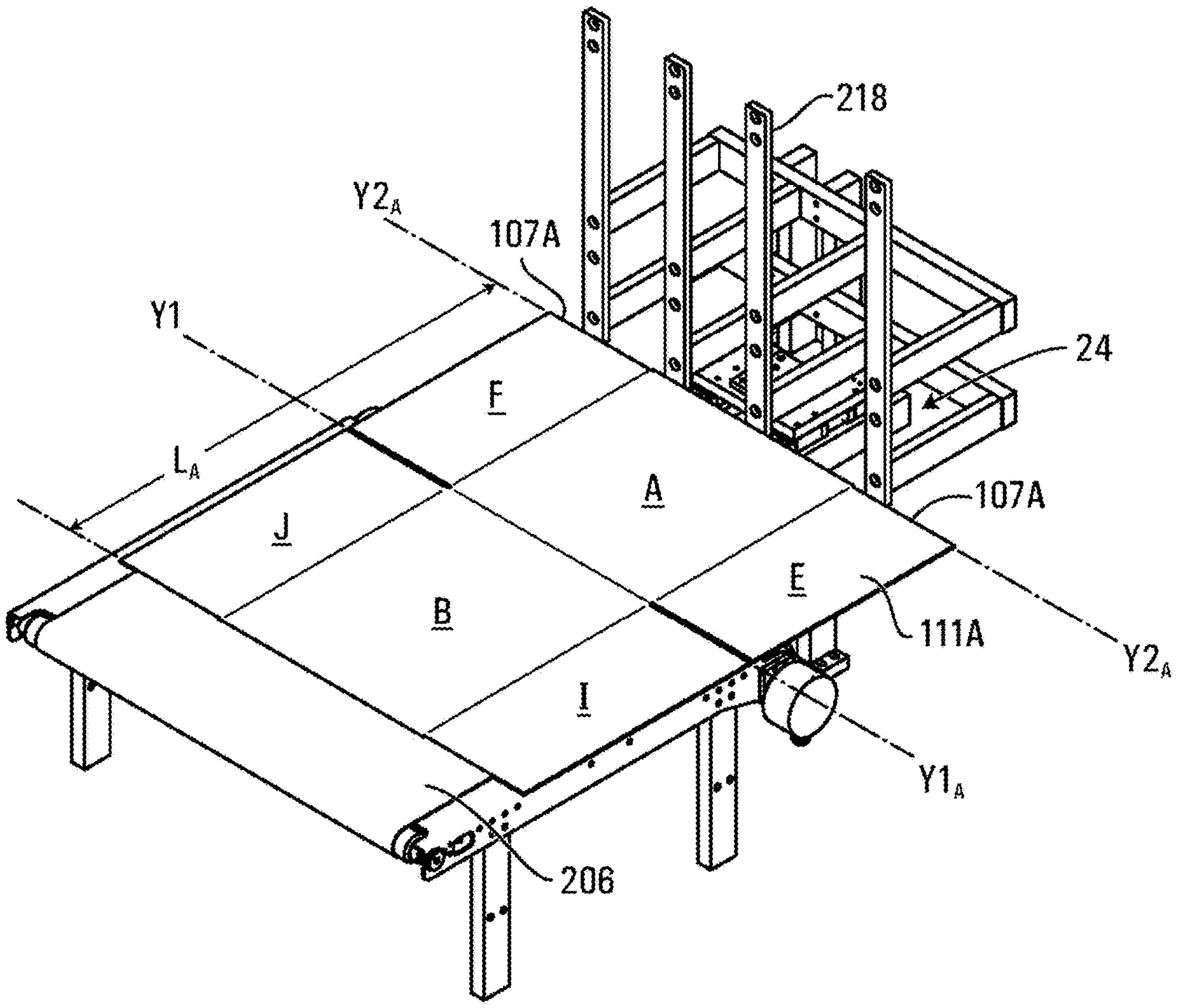
FIGS. 1A to 1E and 1H, 1I are various perspective views of parts of the system of FIG. 1.

To further assist in the handling of case blanks 111 of different sizes/types/shapes, systems 100/1100 may include some additional features, as described hereinafter. With reference to FIGS. 1A, 1G and 1I, a case blank 111A is shown (FIGS. 1A and 1G) resting in a pick-up position on alignment conveyor 206, with a leading edge 107A defined by the aligned, front horizontal and transverse edges of top panels F, A and E and opposite bottom panels L, D, and K (see also corresponding edges 107 in FIGS. 4A and 4B). Leading transverse edge 107A is proximate to, and preferably abuts up against the facing surfaces of picket wall 218 such that leading transverse edge 107A is substantially aligned with a transverse horizontal axis $\mathbf{Y2}_A$ which extends along the facing surfaces of front picket wall 218 (also referred to herein as blank front edge guide 218). Axis $\mathbf{Y2}_A$ also continues to run transversely and horizontally parallel to axis Y through system 100 including, preferably, along the forward facing surface 404A (FIGS. 1G and 17) of back wall 404 of shuttle 140 when the shuttle is in the longitudinal start position before it commences its advancement to open the case blank—in the manner as described above. As an aside, it should be noted that some aspects of system 100 at the pick-up location area are shown in isolation in FIG. 1A-C, 1H-I, for clarity.

The adjacent inner horizontal and transverse edges of upper panels F, A and E and respective adjacent upper panels J, B, and I, form a transverse horizontal crease line that is substantially aligned with a transverse horizontal axis $\mathbf{Y1}_A$ which runs transversely and horizontally, and parallel to axis $\mathbf{Y2}_A$ through system 100. A corresponding, but slightly lower, axis $\mathbf{Y1}_A$' (that is vertically aligned with and parallel to axis $\mathbf{Y1}_A$ also runs through inner horizontal and transverse edges of opposite lower panels L, D, and D and respective adjacent lower panels H, C, and G to form a corresponding lower crease line. These two crease lines typically will lie in the same vertical and transverse plane. Axis $\mathbf{Y1}_A$ and axis $\mathbf{Y2}_A$ are separated by a distance $X_{YA}$ (FIG. 1G).

Figure 1B:
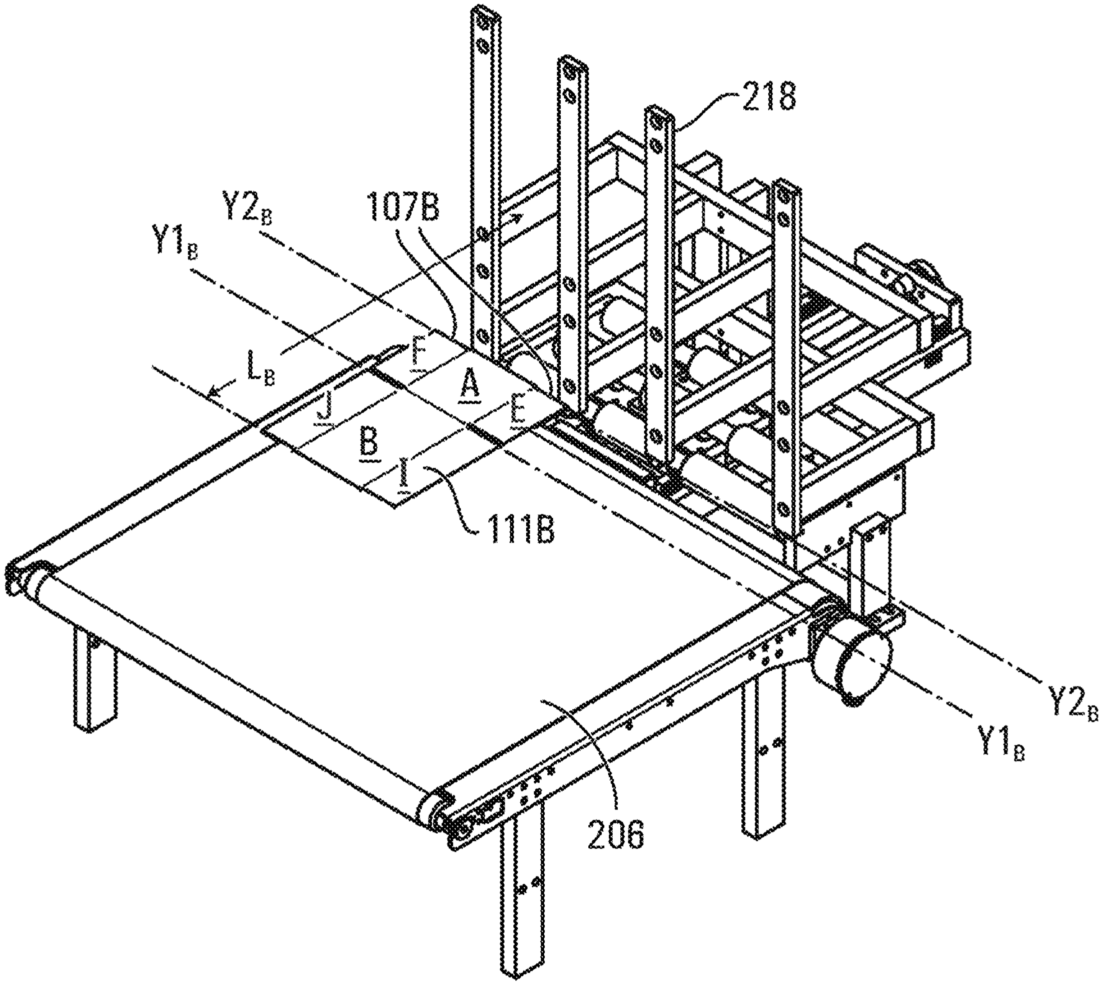
Figure 1C:
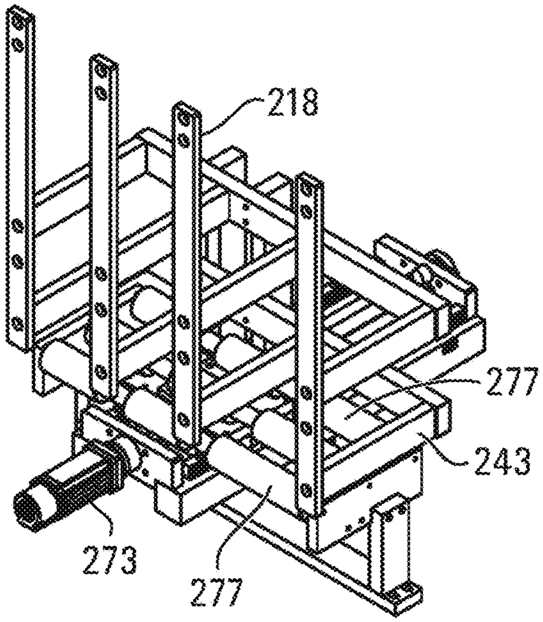
Figure 1D:
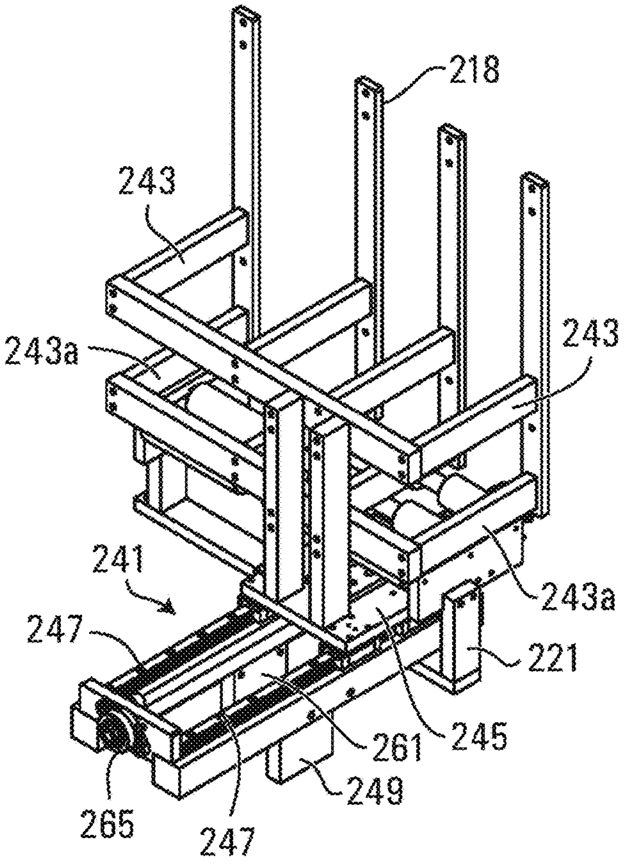
Figure 1E:
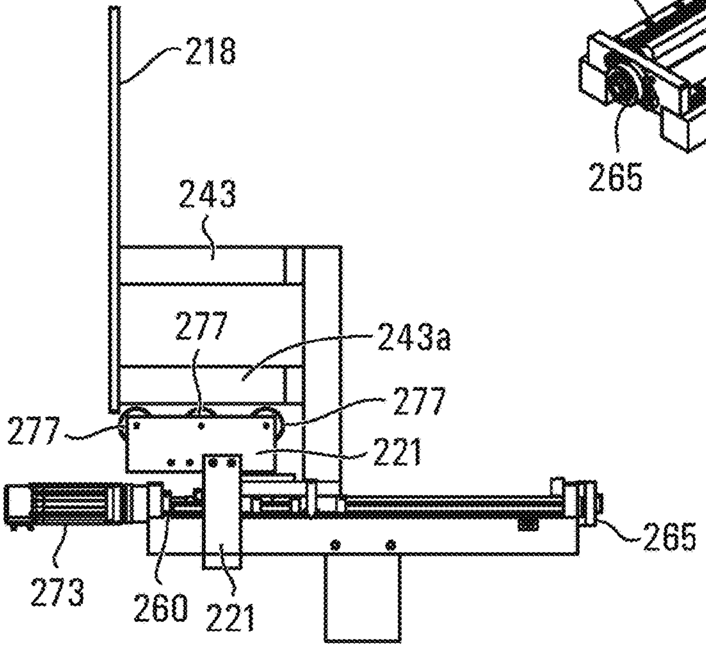
Figure 1F:
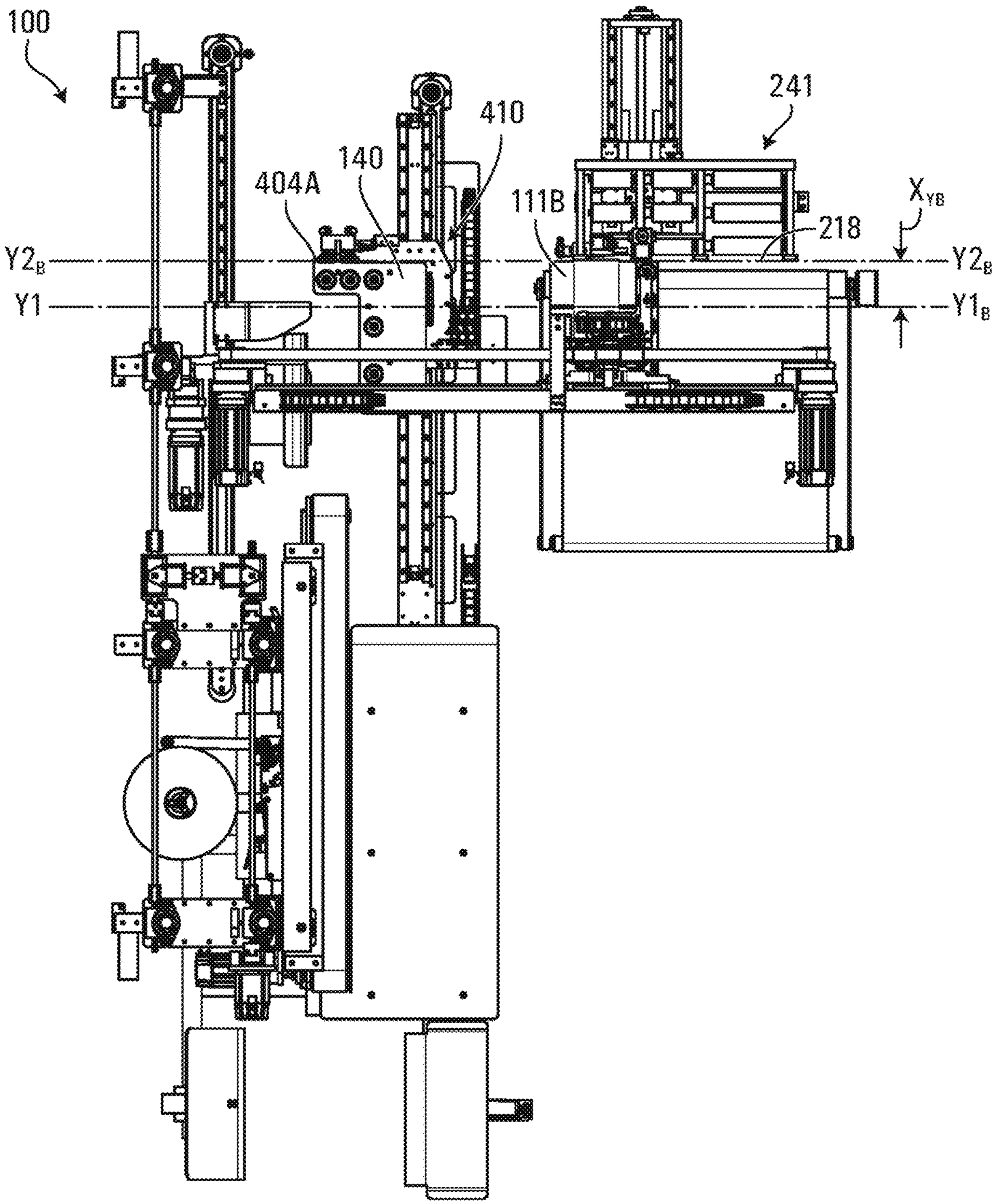
FIGS. 1F and 1G are plan views of the system of FIG. 1.
Figure 1G:
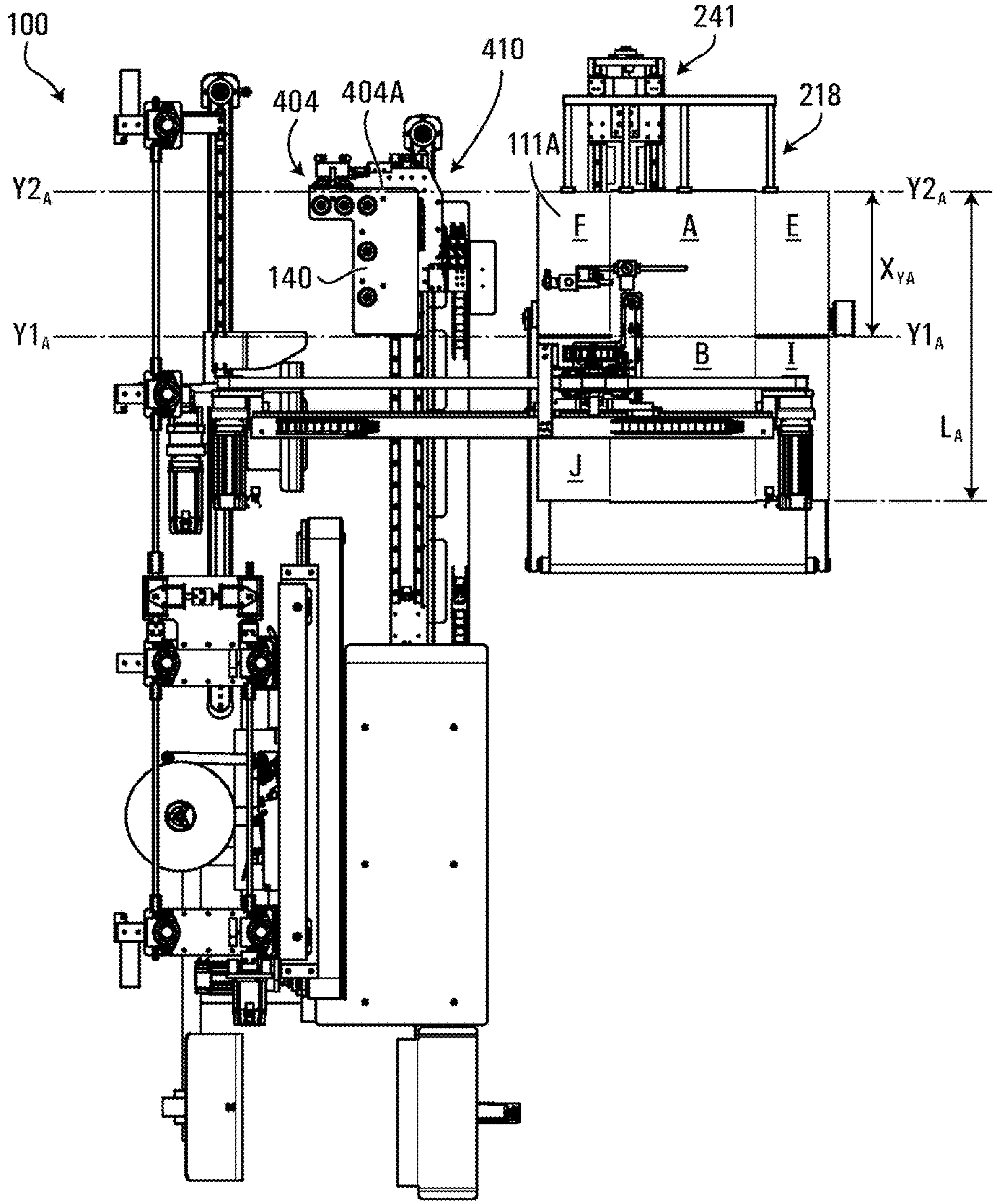
Figure 1H:
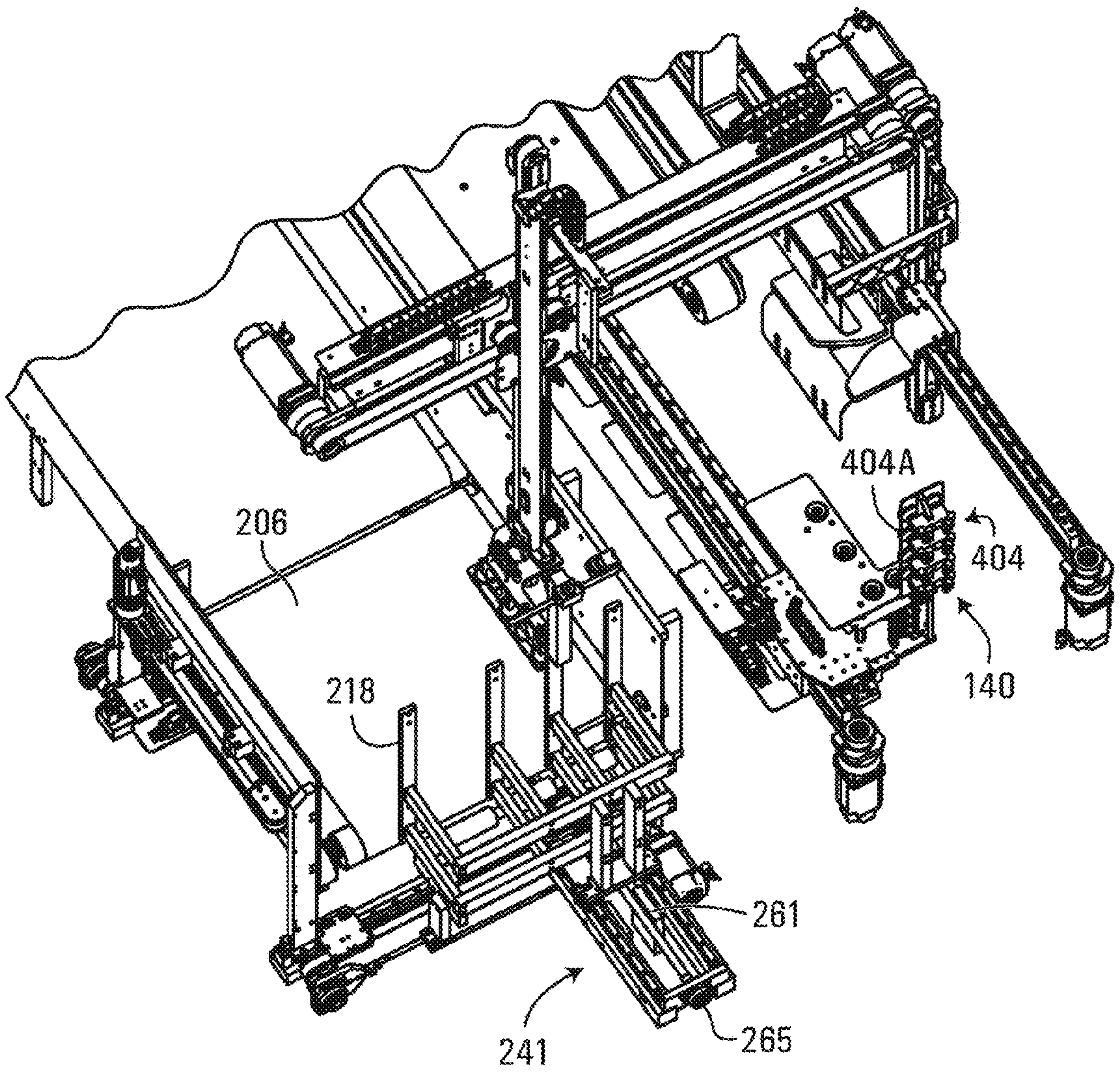
Figure 1I:
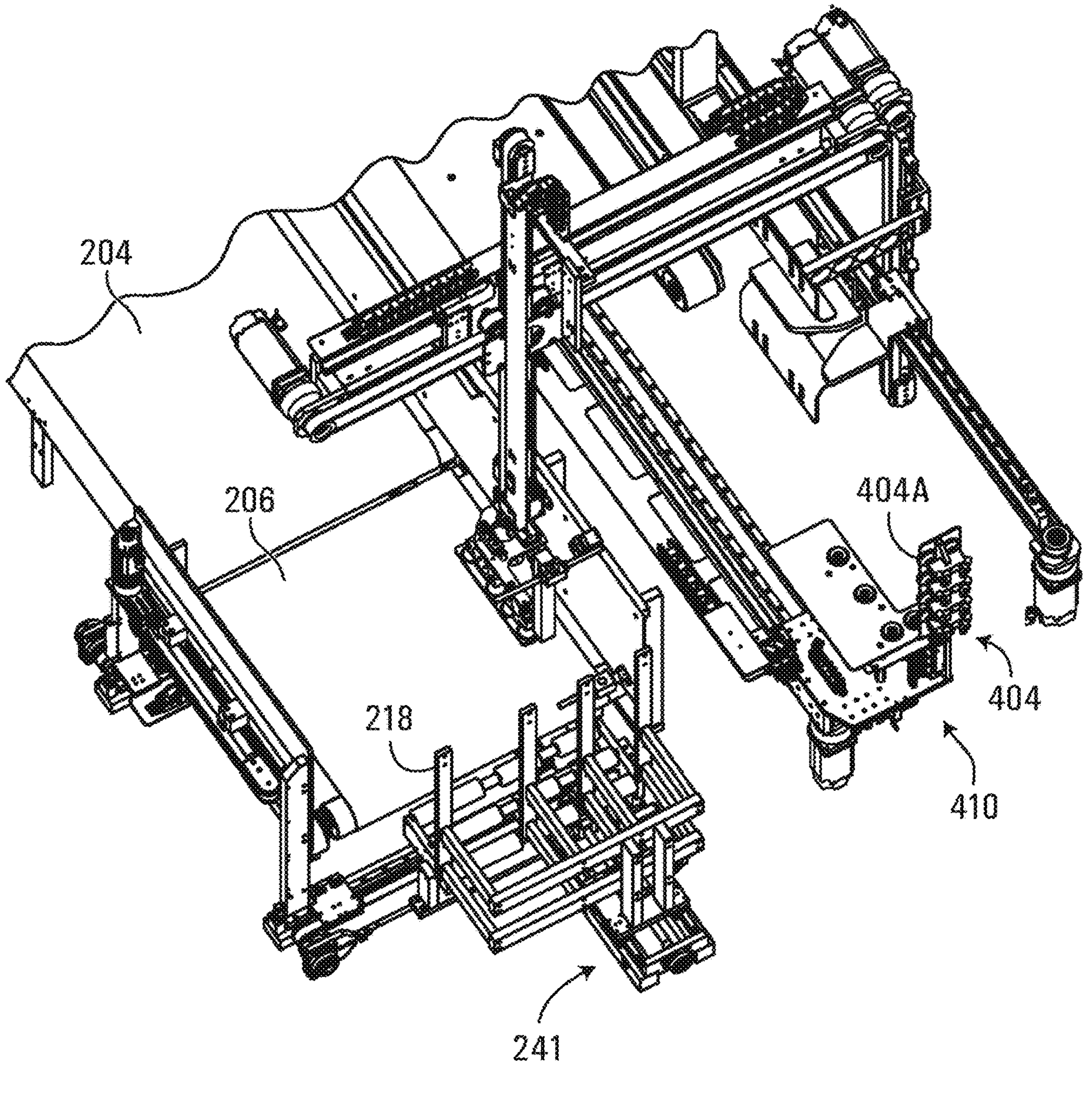

By contrast, with reference to FIGS. 1B, 1H and 1F, a blank 111B (which has generally smaller dimensions than blank 111A—including a length $L_B$ that is shorter than length $L_A$, and which may also have a height Ht that is shorter than height Ht of blank 111A) is shown resting in a pick-up position on conveyor 206, with a leading transverse edge 107B defined by the aligned, front edges of panels I, B and J. Leading transverse edge 107B of blank 111B is also positioned proximate to, and preferably is in abutment with the facing surfaces of picket wall 218 such that leading edge 107B is substantially aligned with a transverse horizontal axis $\mathbf{Y2}_B$ which extends along the forward edge surfaces of front picket wall 218. Axis $\mathbf{Y2}_B$ also continues to run transversely and horizontally parallel to axis Y through system 100 including also preferably, along the front surface of back wall 404 of shuttle 140, when in the longitudinal start position before it commences its advancement to open the second case blank—as described aboveAxis $\mathbf{Y1}_B$ and axis $\mathbf{Y2}_b$ are separated by a distance $X_{YB}$ (FIG. 1F). Distance $X_{YB}$ is shorter than distance $X_{YA}$.

The adjacent inner horizontal and transverse edges of upper panels F, A and E and respective adjacent upper panels J, B and I, form a transverse crease line that is substantially aligned with a transverse horizontal axis $\mathbf{Y1}_B$ which runs transversely and horizontally and parallel to axis Y and to axis $\mathbf{Y2}_B$ through system 100. A corresponding, but slightly lower, axis $\mathbf{Y1}_B$' (that is vertically aligned with and parallel to axis $\mathbf{Y1}_B$ also runs through inner horizontal and transverse edges of opposite lower panels L, D, and K, and respective adjacent lower panels H, C and G to form another transverse crease line. These two crease lines typically will lie in the same vertical and transverse plane.

During the operation of system 100 in processing blanks having different lengths $L_A$, $L_B$, the longitudinal axes $\mathbf{Y1}_A$ and $\mathbf{Y1}_B$ of the two differently sized blanks 111A, 111B are co-linear (the crease lines in both blanks run along the same transverse line/axis—or at least run in the same vertical transverse plane). Similarly, the longitudinal axes $\mathbf{Y1}_A$' and $\mathbf{Y1}_B$' of the two differently sized blanks 111A, 111B are co-linear (the crease lines may also run along the same transverse line/axis—or at least run in the same vertical transverse plane). Thus, in system 100, no matter what length L of case blank that is being processed, a transverse and vertical plane through the crease lines between panels I, B and J and respective adjacent panels E, A and F remains in a constant longitudinal (ie. X direction) position, and similarly, a transverse and vertical plane through the crease lines between panels L, D and K, and respective adjacent panels H, C and G will also typically remain in a constant longitudinal (ie. X direction) position.

It will be appreciated however, that in system 100, for blanks 111A, 111B, with different lengths L, the transverse axes $\mathbf{Y2}_A$ and $\mathbf{Y2}_B$ will not be not co-linear (eg. the front edges of the case blanks do not run along the same line/axis parallel to axis Y or through the same vertical and transverse plane). Therefore, in system 100, if the length L of a case blank that is being erected during operation, changes from case blank to the next case blank, the transverse axis Y2 at the front edge of panels E, A and F will be in a different longitudinal (ie. X direction) position.

When end effector 120 is positioned by the control of PLC 132 at the pick-up location (such as shown in FIG. 1G) the end effector is located directly over panel B of a blank 111A and preferably right behind, or a short distance behind, in the X direction, the crease line axis $\mathbf{Y1}_A$ and when, when end effector 120 is positioned by the control of PLC 132 at the pick-up location (such as shown in FIG. 1G) the end effector is directly over panel B of a blank 111B the end effector 120 will be the distance in the X direction behind the crease line axis $\mathbf{Y1}_B$.

Therefore, in order to accommodate case blanks of different lengths L, the forward-facing surfaces of front picket wall/front edge guide 218, and typically also the start position of the front surface 404A of back wall 404 of shuttle 140 will have to be moved to corresponding different longitudinal start positions. Adjustment of the start position of shuttle 140 can be controlled by PLC 132, and the corresponding stroke of shuttle 140 may also be adjusted by PLC 132.

In order to provide a corresponding varying, appropriate pick-up positions of case blank 111A and case blank 111B, on conveyor 206, the longitudinal (ie. in direction of axis X) position of picket wall/front edge guide 218, must also be adjusted by PLC 132. Accordingly, a longitudinal, picket wall movement mechanism 241 may be provided in system 100. Picket wall movement mechanism 241 may be controlled by PLC 132 which can adjust the longitudinal position of picket wall 218 to provide a proper pick up position for a case blank on conveyor 206, to ensure that the crease line between panels I, B and J and respective adjacent panels E, A and F (eg. axes $Y1_A$ and $Y1_B$) will be in the same longitudinal (X axis) position through system 100, regardless of the length L of case blank 111 that is being processed at any particular time by system 100). Thus, when end effector 120 is positioned by the control of PLC 132 at the pick-up location (such as shown in FIG. 1G) the end effector is directly over panel B of a blank 111A a short distance in the X direction behind the crease line axis $Y1_A$ and when, when end effector 120 is positioned by the control of PLC 132 at the pick-up location (such as shown in FIG. 1G) the end effector is directly over panel B of a blank 111B the end effector 120 will be the same short distance in the X direction behind the crease line axis $Y1_B$.

It should be noted that if the height Ht of the cases also vary (such as between case blank 111A and case blank 111B) the transverse, pick-up position of the end effector 120 on the blank while on conveyor 206, and the transverse, lowering down position of the end effector for lowering the blank onto the base 402 of shuttle 140, may vary in the transverse direction (Y direction) by PLC 132 so that the end effector 120 is properly positioned transversely at both the pick-up, and lowering, of the blank. When picking up a blank, the end effector 120 may be positioned movement apparatus 115 directly over the central area in the transverse position in the Y direction of panel B, dependent upon the height Ht of the respective blank 111A, 111B—which may vary between blank 111A and blank 111B. PLC 132 can also adjust the transverse movement of movement apparatus 115 so that when the end effector 120 descends towards the base 402 of bed 400 of shuttle 140 such that the front edge 107 is positioned against the vertically extending back wall 404 of the shuttle 140, the end effector will be generally directly above the base 402 and the blank properly positioned transversely on the bed 402.

With reference also to FIGS. 1C, 1D and 1E, picket wall 218 may be supported by a support frame generally designated 243. Support frame 243 has lower longitudinal members 243*a* which may rest on a plurality of transverse rollers 277 that are supported on a sub-frame 221. Support frame 243 is also mounted to a slidable carriage 245. Carriage 245 may be operable to ride/slide on a pair of horizontal, longitudinally extending rails 247 extending in the X-direction. Rails 247 may be supported by a sub-frame 249 on the factory floor. Carriage 245 may have a depending belt block 261 attached to an endless drive belt 263 From the belt block 261, the drive belt extends along rails 247 to free-wheel 265 device located at one end of rails 247, around the free-wheel device 265 and back along the rails 247 to the its other end where the belt passes around drive wheel of a servo motor 273 and then returns along the rails 247 again to the belt block 261. According to some embodiments, as shown in FIG. 1C, the drive belt may include an acme screw arrangement. According to other embodiments, screw type actuators may be alternatively implemented with drive belts for high-speed actuations. Given this arrangement, PLC 132 may operate the servo motor 273 to move the belt block 261, and thus carriage 245 and also picket wall 218 (which is supported in such movement by support frame 243 riding on rollers 277) such that picket fence 218 can be moved in forward/backward directions (in the X direction) in order to properly position the picket wall 218 in the correct longitudinal position for the particular sized case blank to be processed and erected into a case. Thus PLC 132 can adjust the longitudinal positions of both picket wall 218 and shuttle 140, to accommodate changes in the lengths L of the case blanks that are being fed in series by conveyor 206 to the pick-up location.

In yet another embodiment, as shown schematically in FIG. 26A, a system 5100 is depicted schematically in which system 5100 is constructed substantially the same as systems 100/1100, except as described hereinafter. In system 5100, a plurality of magazines M1-M5 may be supported by one or more frame structures above a common in-feed conveyor 5204 (which may be constructed generally like in-feed conveyor 204, including as depicted in FIGS. 24, 25 and 26). Magazines M1-M5 may be arranged in spaced longitudinal relation to each other vertically above in-feed conveyor 5204. In-feed conveyor 1204 feeds an alignment conveyor 5206 (which may be like alignment conveyor 206 described above), and except as described herein, the remainder of the modified system 5100, may be the same as systems 100/1100.

Magazines M1-M15 may each contain one or more stacks of product packaging, such as case blanks which each may generally be like blanks 111 processed by system 100, with at least some and possibly each of the magazines M1-M15 containing different types/sizes and/or configurations of packaging/case blanks compared to other magazines. The size, configurations and types of case blanks (and the cases that can be formed therefrom) can vary to provide a range of case sizes, configurations and types that can be automatically processed by the system 5100 without the need for any manual intervention to modify any components of the system. PLC 132 of system 5100 may be programmed such that the particular dimensions/overall size/configuration (e.g. such as regular slotted carton or "RSC")/type of each of the blanks held in each one of the magazines M1-M5 is stored in the memory of the PLC 132.

Each magazine M1-M5 may provide a vertical stack of case blanks above infeed conveyor 5204 and be operable to dispense single case blanks on demand under the control of PLC 132, in a flattened orientation onto infeed conveyor 5204. An example arrangement of a suitable type of vertical case dispensing magazine, is the magazine that forms part of the 310E case erector made by Wepackit Inc. of Orangeville, Ontario, Canada (http://www.wepackitmachinery.com/310E/301E.pdf).

PLC 132 may give an instruction to form a case, and if required, PLC 132 may cause one of magazines M1-M5 to dispense a blank of an appropriate configuration/size onto in-feed conveyor 5204 for delivery to alignment conveyor 5206. PLC 132 is able to selectively move and transfer a single blank at a time onto in-feed conveyor 5204 from any one of magazines M1 to M5. Therefore, separate individual case blanks may be fed in series and longitudinally in a desired sequence by in-feed conveyor 5204 to alignment conveyor 5206. The particular sequence/order of carton blanks that are placed onto in-feed conveyor 5204 of system 5100 may be determined and selected by PLC 132 or another control system as described hereinafter, such that case blanks may arrive at alignment conveyor 5206 in such a desired sequence in which it is desired to process the blanks within system 5100.

PLC 132 may maintain in its memory records of the sequence of case blanks that have been placed onto in-feed conveyor 5204. For example, this information may include the type/size/configuration of the case blank and, where the system 5100 includes a labeller, the label information to be applied to the carton blank. A new record can be added each time a request for a new carton is received and, optionally, records can be removed once a carton has been formed (and labelled). Thus, such records may be organized and maintained in sequence in the memory of PLC 132 using a conventional shift registering technique. In this way, the record for the next carton blank scheduled to arrive at alignment conveyor 5206 may be provided at the output of the shift registers as that carton blank arrives, and the type/configuration/size of that carton blank and the label information for that case blank may be determined from the provided output.

Once transferred from in-feed conveyor 5204 to alignment conveyor 5206, the alignment conveyor 5206 may then under the control of PLC 132 move each blank sequentially to the pick-up location in the manner described previously with respect to systems 100 and 1100. In this regard, conveyors 5204 and 5206 may be constructed substantially like conveyor 204/1204 and 206.

As described above, a sensor (not shown) such as an electronic eye model 42KL-D1 LB-F4 made by ALLEN BRADLEY, may be located within the horizontal gap between in-feed conveyor 5204 and alignment conveyor 5206. The sensor may be positioned and operable to detect the presence of the front edge of a blank as each blank in turn begins to move over the gap between the conveyors. Upon detecting the front edge, sensor may send a digital signal to PLC 132 signalling that a particular blank (the size/configuration/type of which PLC 132 is aware) has moved to a position where conveyor 5206 can start to move. PLC 132 can then cause the motor for conveyor 5206 to be activated to move the blank downstream. In this way, there can be a "hand-off" of each blank from in-feed conveyor 5204 to alignment conveyor 5206.

Once the rear edge of each blank passes the sensor, a signal may be sent to PLC 132 which can then respond by sending a signal to shut down the motor driving conveyor 5204. Conveyor 5204 is then in a condition to await a further signal thereafter to feed the next blank in the series of blanks on the conveyor 5204 to alignment conveyor 5206. Meanwhile system 5100 can be operated to move the blank on alignment conveyor 5206 to the pick-up location in the manner described in conjunction with system 100 so that processing of the blank can continue as described in conjunction with system 5100.

Optionally, and as in the system described above, in system 5100, PLC 132 may verify that the type/size/configuration of the case blank at the pick-up location matches the expected case blank. For example, the top surface of each case blank may include a bar code identifying its type/size/configuration, and this bar code may be read at the pick-up location by a suitably positioned bar code reader. The type/size/configuration of the case blank read from this bar code may be compared to the expected type/size/configuration of case blank, which may be determined from a record of the next scheduled case blank stored in memory of the PLC, as described above. Verification is successful when there is a match. When there is not a match, PLC 132 may issue a signal requesting manual operator intervention.

Figure 26A:
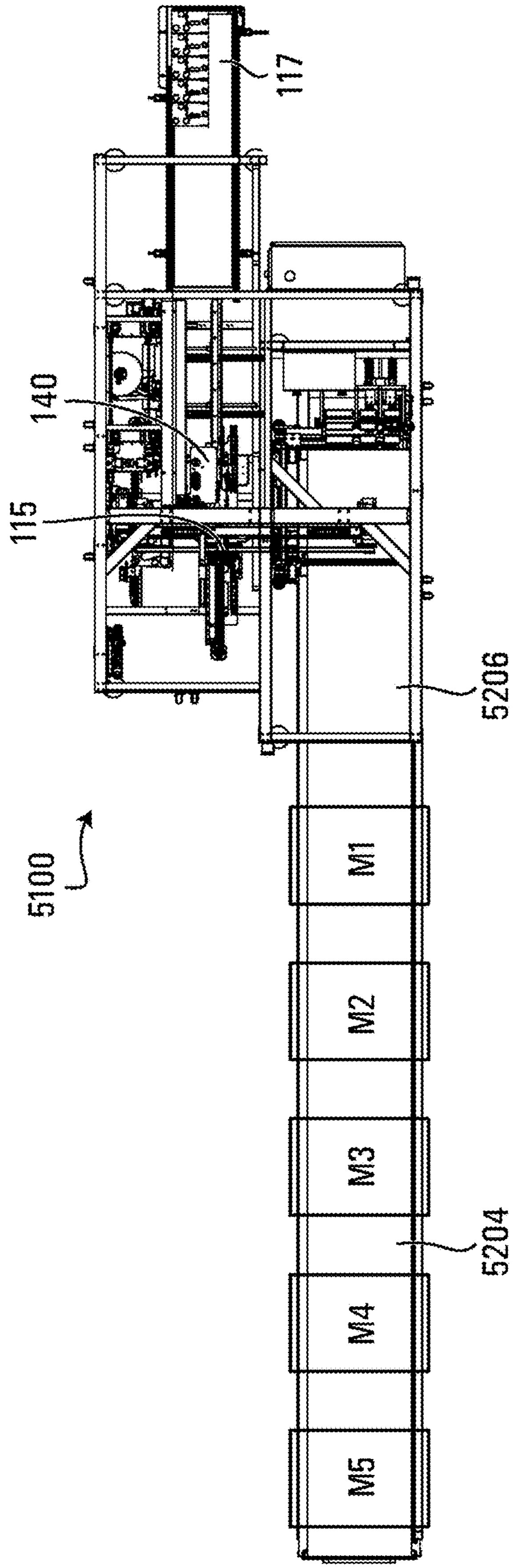
FIG. 26A is a plan view of another alternate case forming system.

It may also be observed in FIG. 26A that the overall configuration of system 5100 provides for a generally S-shaped path (or, if mirrored, a Z-shape) for case blanks through system 5100. More specifically, incoming blanks are conveyed in a downstream X-axis direction to the pick-up location. These blanks are then conveyed in a perpendicular Y-axis direction to the shuttle where they are then conveyed again downstream in the same X-axis direction. Such an S-shaped configuration may be suitable when system 5100 is integrated into a larger system, such as a pack line system as described hereinafter, of which system 5100 is only a part.

The generally S-shaped path may be achieved by generally reversing the orientation of shuttle 140 and its components (on an X direction axis), including L-shaped bed 400 with its horizontally extending base 402 and vertically extending back wall 404 such that the shuttle is oriented in a the same downstream—X axis—direction as infeed conveyor 5204 and alignment conveyor 5206. Additionally, end effector 120 may be positioned so as to engage on a top surface of panel A,—so that during that during opening of the case blank 111, the shuttle 120 will push against the rearward edges of panels J, B and I, while end effector 120 lifts panel vertically, causing panel B to rotate from a horizontal orientation to a vertical orientation (See FIGS. 4A and 4B). Alternatively, each blank 111 may be fed to the alignment conveyor in an opposite direction (ie. so that panels J, B and I are leading panels and panels F, A and E are the trailing panels). Thus, the end effector 120 may then pick up the case blank 111 on panel B and the shuttle 120 will push against the rearward edges of panels F, A and E, while end effector 120 lifts panel B vertically, causing panel A to rotate from a horizontal orientation to a vertical orientation. In each such arrangement, the transverse axis through the crease lines Y1 of the panels will remain the same longitudinal position during operation, regardless of the length of the case blank 111.

System 5100 may also have its a folding apparatus generally designated 130, configured to fold one or more flaps of each sleeve, and a sealing station 135 at which flaps of the cartons are sealed arranged in an opposite direction. System 100 may also include a carton re-orienting station 116 and a carton discharge conveyor 117 arranged in an opposite longitudinal direction—as shown. Thus, system 5100 is operable to feed an erected case to a carton re-orienting station 116 and a carton discharge conveyor 117 which are also oriented in the same downstream—longitudinal X-axis—direction from the case erecting station, as depicted in FIG. 26A.

The use of carton forming systems 1100/5100 described above, have the ability to process a relatively large number of different size case blanks from a relatively small footprint on a factory floor. By moving case blanks in their flattened configuration, on conveyor systems to the end effector 120 where they are translated transversely, also in their flattened state, and only opened in the combined movements of the shuttle and the end effector, provides a very technically efficient mechanism for erecting cases of different sizes. It will be noted that several steps of the case forming process are able to be performed at the same time (in parallel to each other). For example, the systems may be configured such that infeed and alignment conveyors may be moving to the pick-up position one case blank, while another case blank is being moved transversely by the end effector (of the end effector is at least being moved), while an erected case is completing its sealing/labelling steps. The result is that it is believed that systems 100/1100/5100 may be able to process in the order of at least 20-30 cases per minute.

Figure 27:
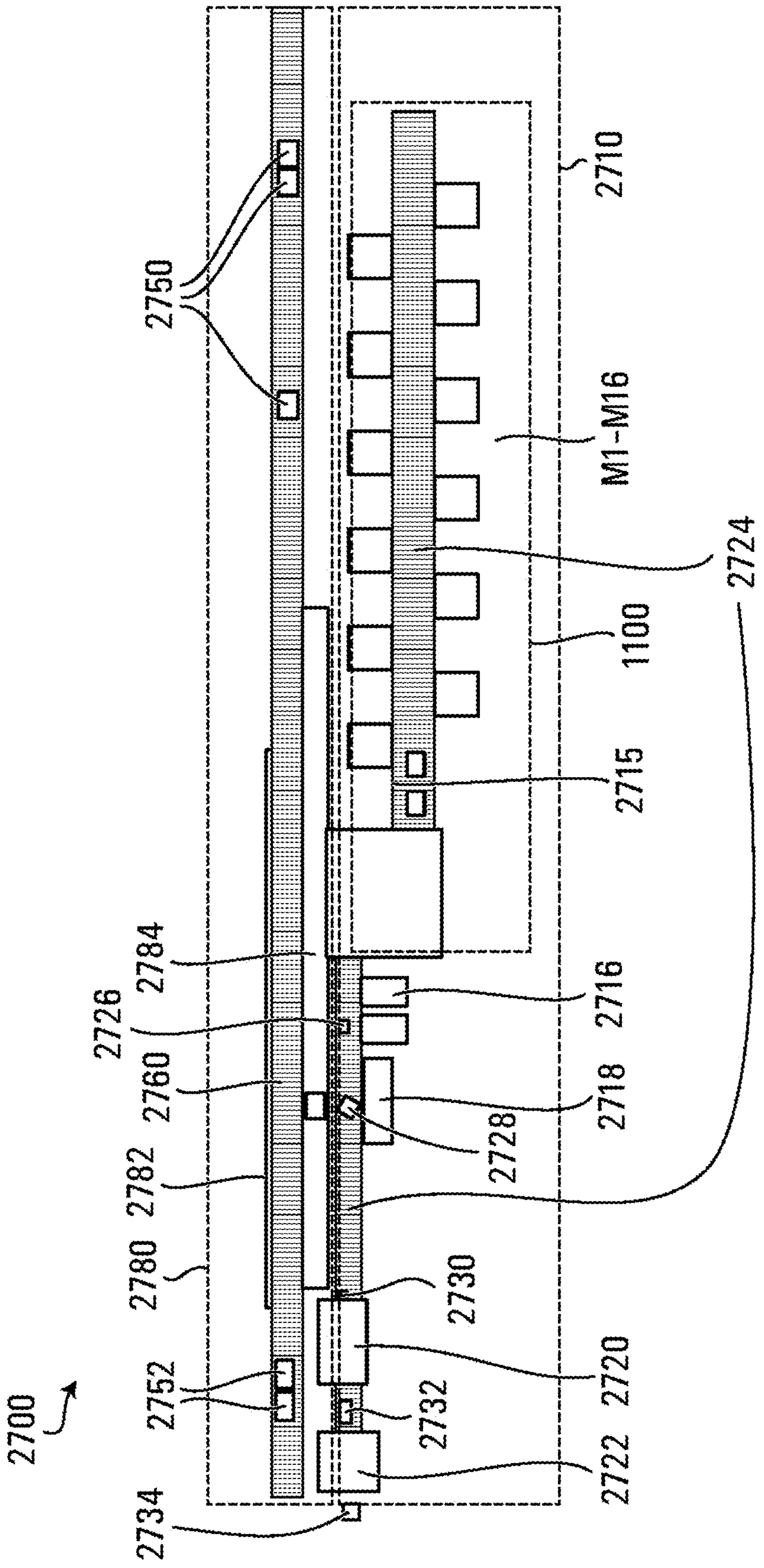
FIG. 27 is an example of an order packing system.

According to another embodiment, the carton forming system 100 or modified carton forming systems 1100/5100 can be very effectively used in an order packing system. FIG. 27 depicts an example of such an order packing system 2700. The order packing system comprises an order staging subsystem 2780 and a packing cell 2710. Although a single packing cell 2710 is shown, embodiments may include multiple packing cells.

Order staging subsystem 2780 carries a sequence of individual orders of products to be packaged and shipped. In the depicted example, each order of products is held in a container, e.g. a resuable bin. Order staging subsystem 2780 transports orders of products to a packing position 2718 at which products may be packed for shipping. Specifically, order staging subsystem comprises an order bin conveyor 2782 for carrying filled order bins 2750 to packing position 2760 and carrying out, from the packing position 2760, empty order bins 2752. In the depicted example, a branch conveyor 2784 is provided, onto which filled order bins 2750 may be diverted for packing at packing cell 2710.

The order bin conveyor 2782 according to some embodiments may be a series of sub-conveyors. The conveyor has multiple input and output points such that bins may be introduced to or removed from the conveyor at multiple locations. An exchange mechanism including one or more diverters may be provided, such that a path for each bin may be defined by selectively operating the mechanism. The order bin conveyor 2782, according to some embodiments, may be configured to orient or tilt a filled order bin 2750 to a specific angle.

The packing cell 2710 comprises the modified case forming system 1100 or 5100, a dunnage dispenser 2716, a packing station 2718, a case sealer 2720, and a case labeller 2722. These components of the packing cell 2710 are connected by a case conveyor 2724.

Modified case forming system 1100 or 5100 receives blanks 111 from case blank magazine M1-M16 by way of case conveyor 2724, and forms erected cases 2726 from the blanks 111 in the same manner as systems 100, 1100 and 5100 as described above.

Modified case forming system 1100 or 5100, according to some embodiments, is configured to construct cases of different sizes, from the blanks 111 of different sizes. The modified case forming system 1100 or 5100 can receive an instruction of the size of the case to construct from the blank 111, and may if necessary, modify its construction mechanism as described hereinbefore to construct the case to said size.

Erected cases are transported by case conveyor 2724 to dunnage dispenser 2716 to receive dunnage. Dunnage can be generally defined as packing material to protect products during shipping. For example, types of dunnage include bubble wrap, packing peanuts, paper or corrugated cardboard inserts. Dunnage dispenser 2716 may include any mechanisms suitable for providing dunnage of one or more types. For example, dunnage dispenser 2716 may include one or more of: rolls for dispensing wrap such as bubble wrap, or hoppers for dispensing particles such as packing peanuts. At dunnage dispenser 2716, according to some embodiments, the type of dunnage, the length or amount of dunnage are selected, and the dunnage is dispensed into the constructed case.

Next, cases with dunnage 2728 are transported by case conveyor 2724 to the packing station 2718 to become packed cases 2730.

At packing station 2718, products from a bin 2750 at packing position 2760 are removed from the bin and placed into the constructed case with dunnage 2728. Products may be manually transferred from filled order bin 2750 to the constructed and dunned case 2728 by a human operator, or automatically transferred by a suitable machine, or a combination thereof. In an example, the products may be transferred by a mechatronic system including a robotic arm.

After being packed at packing station 2718, the packed cases 2730 are transported by case conveyor 2724 to sealing station 2720 to be closed and sealed. Sealing station 2720 is configured to control the selection, dispensing, and application of the sealing material. For example, a type of tape may be selected and applied to a case. Sealing station 2720, according to some embodiments, may be a robotic articulated arm, or any other electromechanical device that can apply the seal to the box. According to some embodiments, sealing station 2720 can include individual or combined electromechanical systems for dispensing of a sealing material and the application of the sealing material to a case.

Sealed cases 2732 are transported over a case conveyor 2724 to label station 2722 to be labelled for shipment. Cases outputted from label station 2722 are completed cases 2734, ready for postal/courier distribution. The label station is configured to generate the shipping label, print the shipping label, and apply the shipping label. A shipping label can include information such as the postal address, and the method of shipping to be applied to the case. According to some embodiments, shipping information may be encoded in a barcode or any other encoded visual data structure. label station 2722, may be a robotic articulated arm, or any other electromechanical device that can apply the shipping label to the case. According to some embodiments, label station 2722 can include individual or combined electromechanical systems for printing the shipping label and the application of the shipping label to a case.

The order bin conveyer 2782 and the case conveyor 2724 are configured to deliver to the packing station 2718 the bins and constructed cases in corresponding sequences. That is, a case may be selected for each order, based on the physical size or weight of the products in the order. As will be described in greater detail, the sequence of orders and cases presented at packing station 2718 may be matched to one another such that a case that corresponds to the size of each order is brought to the packing station along with the bin containing that order.

As shown, a sequence or queue of order bins is formed on branch conveyor 2784 by diverting bins from the order bin conveyor 2782. The sequence of bins are positioned so that the bin at the front of the sequence located proximate packing position 2760. Similarly, a sequence or queue of constructed cases is formed on the case conveyor 2724 approaching the packing position 2760. Each case in the sequence of cases corresponds to a filled order bin 2750 containing products. The size of the case constructed in the sequence of cases is based on the products in the corresponding filled order bin 2750.

Figure 28:
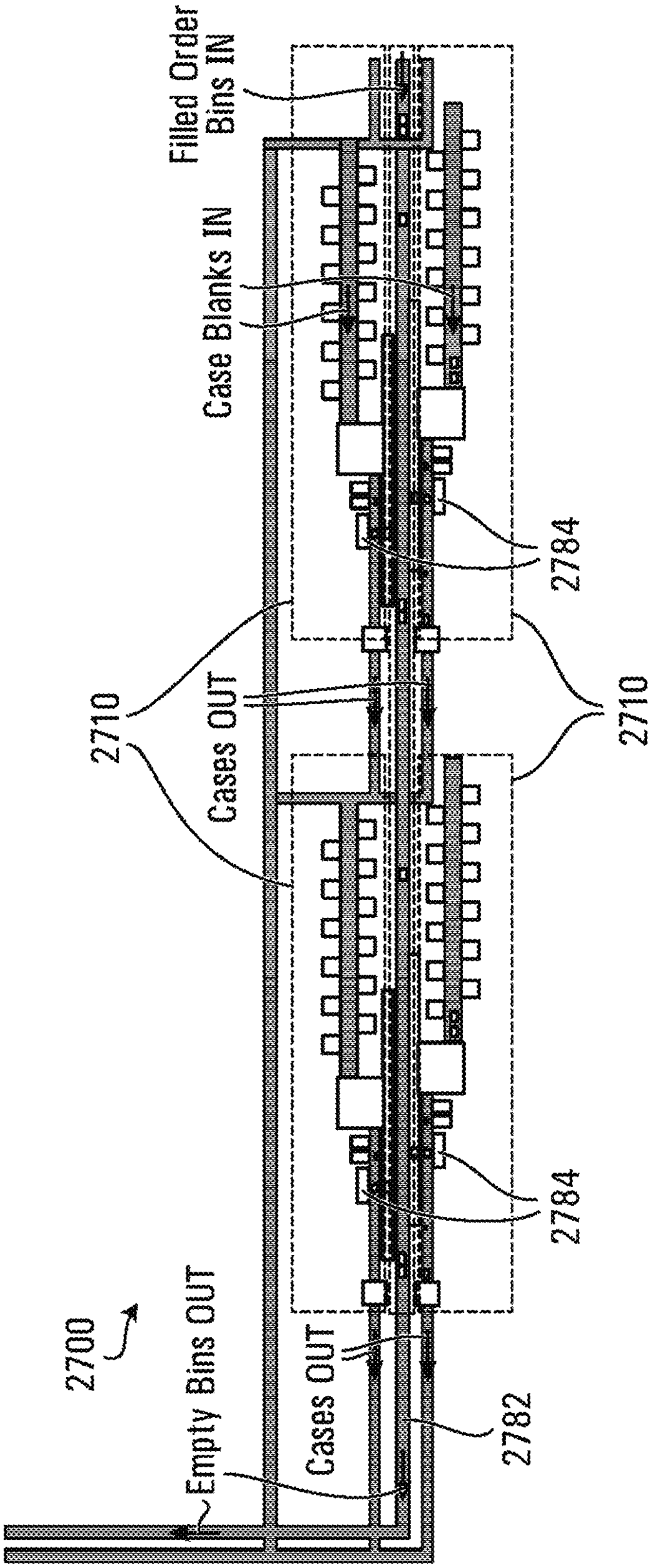
FIG. 28 is an example of an order packing system having multiple packing cells.

In some embodiments, the order packing system may include multiple packing cells. As shown in in FIG. 28, the order packing system 2700 comprises four packing cells 2710. However, any number of packing cells may be present, subject to space and logistical limitations. As depicted, the four packing cells are commonly fed by a single order bin conveyor 2782. However, in other embodiments, multiple separate order bin conveyors may be provided.

Increasing the number of packing cells 2710 may enable greater throughput of orders through the system. Further, the plurality of packing cells 2710 may enable optimization through configuration of the individual packing cells. For example, when multiple packing cells 2710 are present, a greater range of case and dunnage types and sizes may be accommodated. For example, certain packing cells 2710 may only have case blanks 111 corresponding to smaller cases, to be used for order bins that contain smaller products.

Order staging subsystem 2780, according to some embodiments, may further include branch conveyers 2784 to feed the various packing cells 2710. The order staging subsystem 2780 and packing cell 2710 may also use the branch conveyor 2784 and the order bin conveyor 2782 to transport the empty bins for reuse, and the case conveyor 2724 to transport the completed orders (i.e. with a constructed case from a selected blank, filled with dunnage and products, sealed and labelled) towards an output for delivery to a customer.

According to some embodiments, order bin conveyor 2782 may orient the bins at an angle for easy unloading of the contents from the bin. For example, bins may be oriented with an opening facing packing position 2760.

Order staging subsystem 2780, branch conveyors 2784 and packing cells 2710, may be controlled by a control system 2900. For example, the control system may dictate any of the speed and position of orders and cases within the system, and the sequences of order bins and cases that are presented at packing location 2760 of any given packing cell.

Control system 2900 may be implemented in any combination of programmable logic controllers (PLCs) and computing devices such as PCs. Each PLC 132 associated with a particular carton forming system 100, 1100, 5100 can form part of control system 2900.

Figure 29:
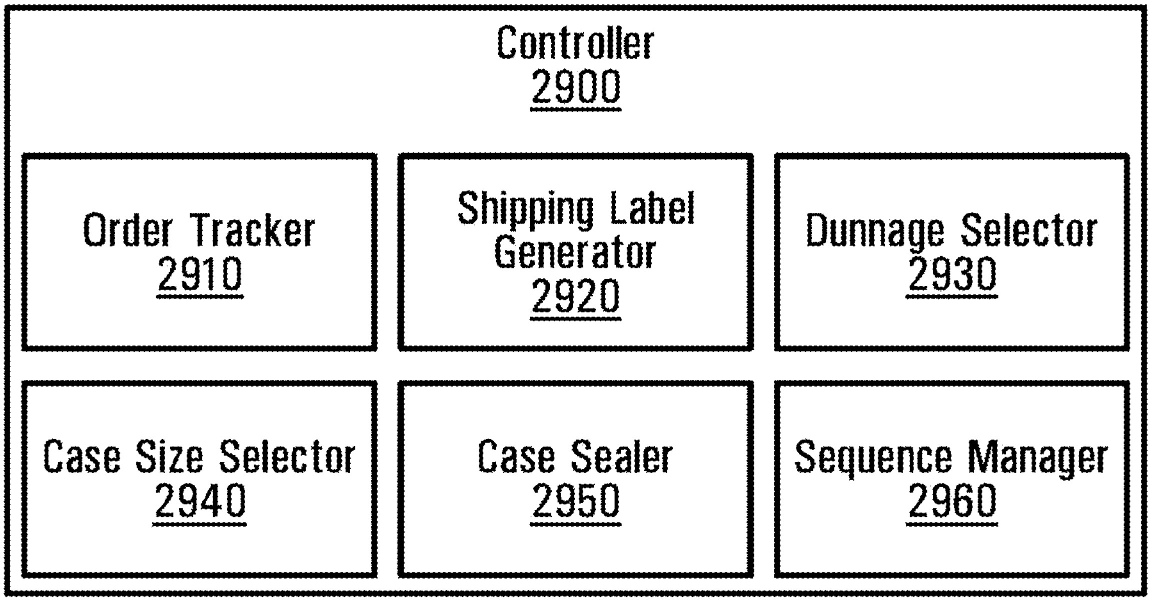
FIG. 29 is a block diagram of example hardware components of a control server.

FIG. 29 is a block diagram of example hardware components of control server 2900. Control server 2900 may be hosted on a computer 3000 including processor 3002, network interface 3004, a suitable combination of persistent storage memory 3006, random access memory and read only memory and one or more I/O interfaces 3008. Processor 3002 may be an Intel x86, PowerPC, ARM processor or the like. Network interface 3004 interconnects control server 2900 to a network (not shown). Memory 3006 may be organized using a conventional filesystem. Control server 2900 may include input and output peripherals interconnected to control server 2900 by one or more I/O interfaces 3008. These peripherals may include a keyboard, display, mouse and one or more devices such as DVD drives, USB ports and the like for reading computer-readable storage media. Software components exemplary of embodiments of the present invention may be loaded into memory 3006 over network interface 3004 or from one or more peripheral devices.

Figure 30:
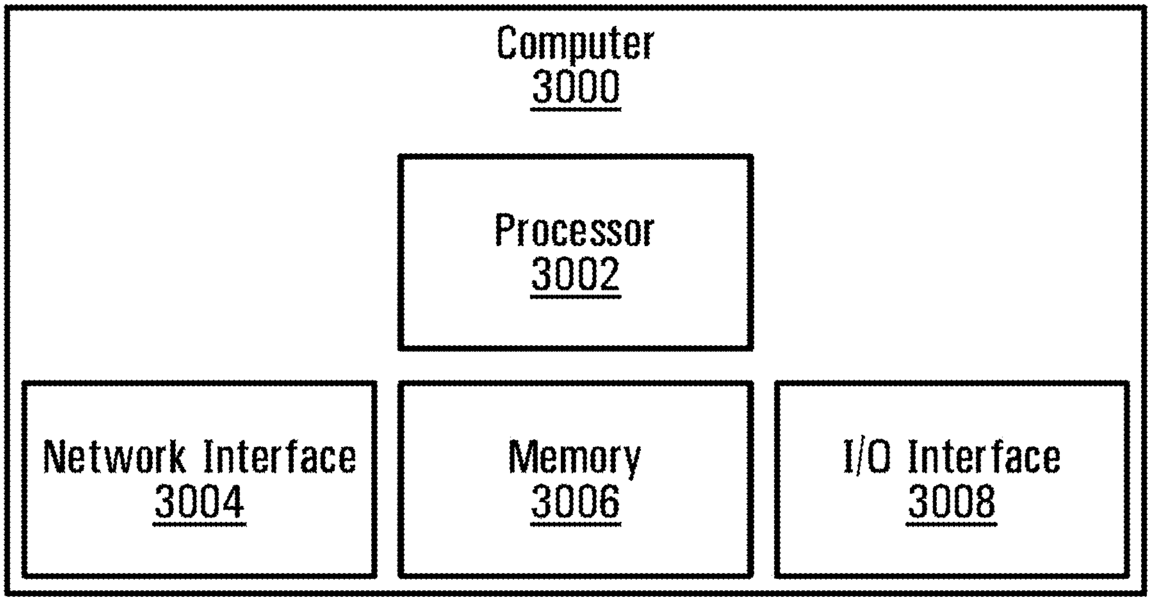
FIG. 30 is software components of a control system.

FIG. 30 depicts a simplified organization of example software components stored at a computing device of control system 2900. The control server 2900 can include functional modules to control individual components of the packing cell. As depicted, the modules include order tracker 2910, shipping label generator 2920, dunnage selector 2930, case size selector 2940, case sealer 2950 and sequence manager 2960, each are able to interface with the components of packing cell 2710 and order staging subsystem 2780 via one or more PLCs (such as PLC 132) to cause physical operations to occur as described herein. Further, the software components are able communicate with each other and to access any appropriate database required to complete the functions as will be described. For example, the software components may be configured to communicate with each other via individual function calls between software components or requests to access the information stored at locations in a memory 3006.

Figures 31, 32:
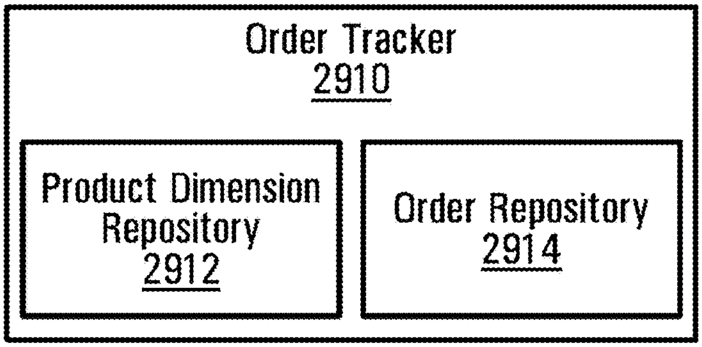
FIG. 31 is software components of an order tracker.
FIG. 32 is an example product dimension repository.

Order tracker 2910 maintains records of orders being fulfilled and details, e.g. physical dimensions, of products within such orders. As shown in FIG. 31, the order tracker includes a product dimension repository 2912 (e.g. a database or database table) and order repository 2914 (e.g. a database or database table). Order repository 2914 functions to keep a record of all orders in the system. An order includes at least one product, and can comprise multiple products to be shipped to a location. The order repository 2914 may also include the shipping address to send the order to, or may link to another table including shipping addresses, according to some embodiments. The product dimensions repository 2914 can include the dimensions of each product, such as height, width, and depth. Individual products may have a unique SKU ID number associated with them. According to some embodiments, the database is stored locally in memory 3006. According to other embodiments, this database is stored in a memory accessible on another server by way of a network. According to some embodiments, the order tracker 2910 further includes weights for each product and an indication of the product fragility.

FIG. 32 is an example of a product dimension repository 2912 stored in the order tracker 2910, made up of information about the products in the order and their dimensions. As depicted, product dimension repository 2912 is a database table. The product dimension repository 2912 comprises products each having a unique product ID 3206. Each product 3206 has dimensions 3208. The product dimension repository 2912 would have entries for each possible product that could be used in orders within the order fulfilment system 2700.

Order tracker 2910 also includes an order repository 2914, stored as a table to track a sequence of orders having an order ID 3302, wherein each order corresponds to an individual bin containing at least one product 3306. Each product 3306 corresponds to a product that can be found in product dimensions 2912. Each individual bin may be tracked using an individual bin ID 3304. The order database, as will be described later, can also keep track of the case size 3308 selected to be constructed from the case construction apparatus, the dunnage type 3310 to be used in packing the case, the dunnage length 3312 to be used when packing the case, and the specific packing cell 3314 that the bin will be transported to. The case size 3308, dunnage type 3310, dunnage length 3312, and packing cell 3314 can serve as operational parameters delivered to order staging subsystem 2780 and a packing cell 2710.

As will be apparent, product dimension repository 2912 and order repository 2914 may be linked tables within a database schema of order tracker 2910.

Figures 34, 35:
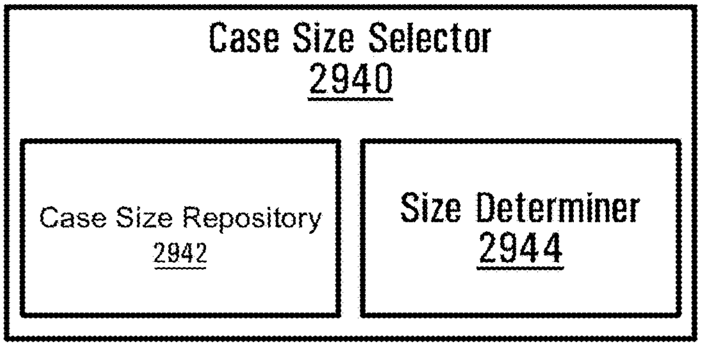
FIG. 34 is software components of a case size selector.
FIG. 35 is an example case size repository.

Case size selector 2940, as shown in FIG. 34 comprises a case size repository 2942 and size determiner 2944. In operation, case size repository 2942 comprises a database of available case sizes and the volume of the constructed case, along with the packing cell 2710 that includes blanks for the case size. Size determiner 2944 receives an input comprising an order ID 3302, including the product IDs 3306 and the individual product dimensions 3208, and calculates a volume for the order. Based on the order volume, the most appropriate case size is selected for use for the order.

FIG. 35 is an example of case size repository 2942. As depicted, case size repository 2942 is a database table. Each case size is identifiable by a unique case size ID 3502. For each case size ID 3502, case dimensions 3508 for height, width, and depth are defined. Optionally, additional capacity parameters may be recorded. For example, as shown, case size table 2942 includes a volume minimum 3504 and volume maximum 3506. Additionally or alternatively, other suitable parameters could be recorded such as minimum and maximum order weights. Case size repository 2942 further includes an indicator 3510 of which packing cells 2710 includes blanks in magazines M1-M16 corresponding to the case size having ID 3502.

Figure 36:
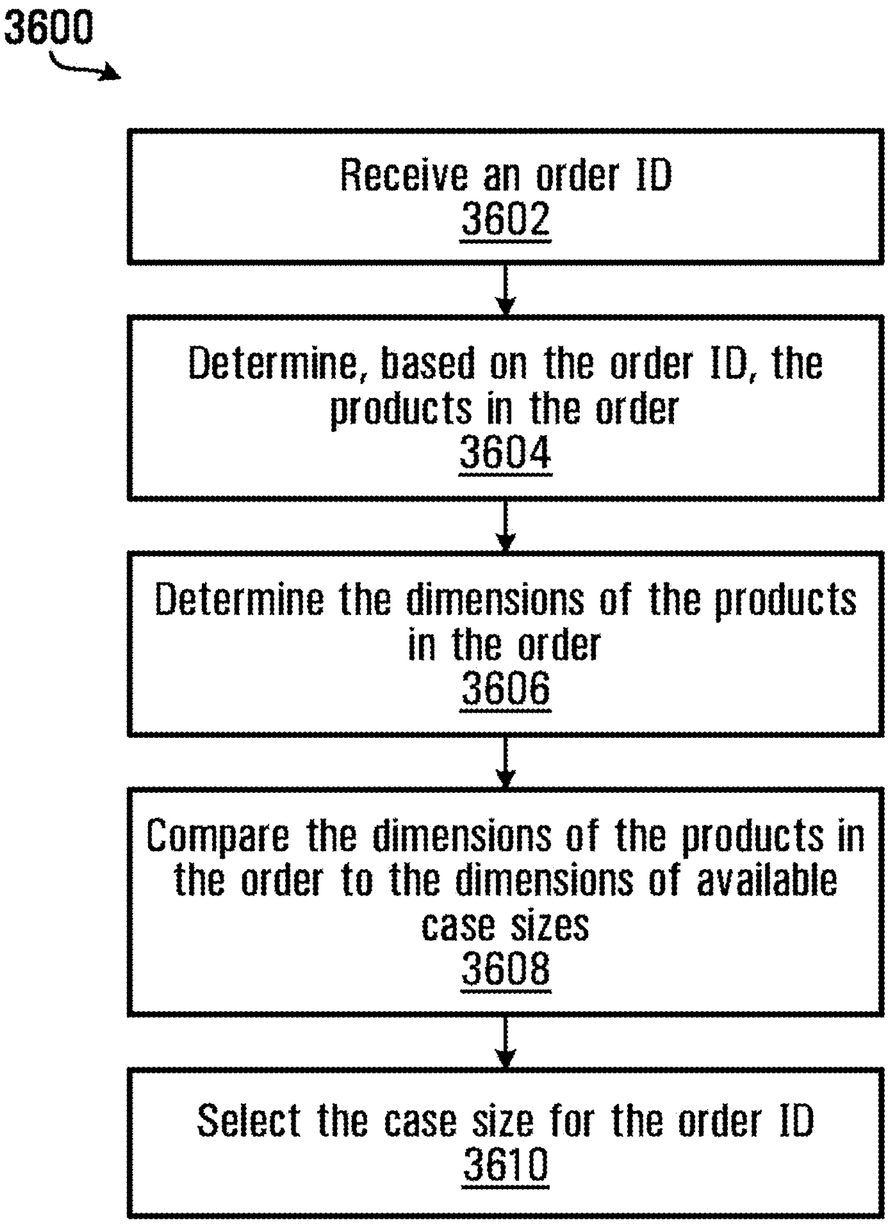
FIG. 36 is a flowchart showing an example method of use of the case size selector.

FIG. 36 is an example method 3600 for the use of the case size selector 2940. First, at block 3602, an order ID 3302 is received. The order ID 3302 may be a unique identifier for an individual order such as, for example, a purchase of products from an online marketplace. The order ID 3302 can be used to query a database stored in a memory in a network for additional information.

At block 3604, the products in the order are determined, based on the order ID 3302. This may be done, for example, by querying order repository 2914 (FIG. 33) stored in a memory on a network to return all product IDs 3306 for the individual order ID 3302.

At block 3606, the dimensions of the products in the order are determined. This may be done, for example, by performing a lookup in product dimension repository 2912 (FIG. 32) to return the dimensions 3208 for each individual product ID 3206 in for the product IDs 3306 associated with individual order ID 3302.

At block 3608, a query of case size table 2941 (FIG. 35) is performed to identify candidate case types, namely, those case types that are capable of holding the products in the order. In an example, the dimensions of the products in the order are compared with the dimensions of available case sizes. Candidate cases may, for example, be those with length, width and height greater than the largest product in the order. Candidate cases may be filtered according to other capacity values. For example, according to some embodiments, a total volume of the products in the order is calculated and compared that to the total volume available in all cases in case size repository 2942. Cases with internal volume less than the total volume of products in the order, or with internal volume less than a defined multiple of the total product volume (e.g. 1.5×) may be eliminated as candidates. According to other embodiments the individual product dimensions are compared to those of cases in case size repository 2942.

Finally, at block 3610, the case size for the order ID 3302 is selected. According to some embodiments, the candidate case with the smallest internal volume is selected as the generated case size to use for the order. According to other embodiments, the case size selected as the case size for the order ID 3302 is the case in case size repository 2942 with the smallest maximum dimension, i.e. the smallest length, weight or height.

An example approach for selecting case size is disclosed in U.S. Pat. No. 6,876,958 to Chowdhury et al., issued to assignee New Breed Corporation on Apr. 5, 2005 (hereinafter, "Chowdhury"), the contents of which is hereby incorporated by reference herein in its entirety. In particular, Chowdhury's product packaging utility processes each order placed by a customer to automatically identify, from available case types/sizes/configurations, a type/size/configuration of suitable case (or cases) suitable for packaging the products in the order. Chowdhury's a product packaging utility identifies/determine suitable case(s) according to an algorithm/function that accesses and uses one or more electronically-stored characteristics of each product in the order (e.g., dimensions, weight, etc.) and one or more electronically-stored characteristics of available case types (e.g., dimensions, size, configuration, type, maximum volume that can be held, maximum weight that can be held, etc.). This algorithm identifies suitable cases such that a minimum number of cases and the smallest size cases suitable for packaging the products in the order may be provided. Thus, identification of suitable case types/sizes/configurations can be optimized to provide an optimal case type/size/configuration which minimizes packaging material used and to minimize empty space in cases, and a case identified as suitable may be referred to as an "optimal" case. It will be appreciated that identification of suitable case types/sizes/configurations may also be identified or optimized according other pre-defined criteria. The case identification algorithm of Chowdhury's product packaging utility may also take into account other factors and constraints such as, e.g., the availability of each type/size/configuration of case, the maximum fill ratio of each type/size/configuration of case, the maximum number of products that can be placed into each type/size/configuration of case, and whether certain products are pre-packaged together and therefore must be placed in the same case. Thus, using Chowhury's product packaging utility, case size selector 2940 may process a customer order for specific products by accessing information in it memory and utilizing an algorithm/function to identify a suitable case (or cases) for packaging those products from a plurality of available cases.

It should be noted that the size of the case may be the overall internal available volume of the case in which items may be held. The size may also be the specific dimensions of the case. The type of case may include the reference to what material the blanks is made from (e.g. paperboard or corrugated cardboard). Its configuration may an indication of it being a top opening case which is generally cuboid in shape when closed, or another configuration such as a regular slotted case, etc.

Chowdhury's product packaging utility may also generate, for each case of a particular type/size/configuration identified to fulfil an order, a packing list indicating the order in which each of the products is to be preferably placed into the case, as well as placement information indicating where each product is to be preferable placed in the case. For example, this placement information may be expressed using coordinates (e.g., 0, 0, 0) in a coordinates system defined for the case and/or descriptors of locations in the case (e.g., front, right hand side, second layer, etc.). Thus, when order the case size selector 2940 includes a product packaging utility such as Chowdhury's product packaging utility, case size selector 2940 may generate a packing list and/or placement information for each identified case. Case size selector 2940 may also generate a diagram illustrating a desired optimal physical arrangement of the products in each case. Such a diagram may be readily generated using placement coordinates for each product, as provided by Chowdhury's product packaging utility.

The generated case size can be inputted as an operational parameter to one of packing cells 2710, wherein the selected case size corresponds to a case blank 111 stored in one of the associated magazines M1-M16. The generated case size can be recorded in the corresponding record of order repository 3300.

Figures 37, 38:
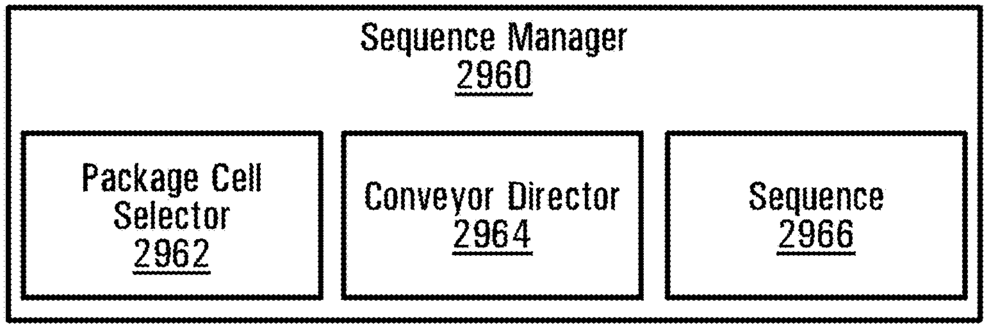
FIG. 37 is software components of a sequence manager.
FIG. 38 is an example sequence.

FIG. 37 shows sequence manager 2960, comprising a packing cell selector 2962, conveyor director 2964, and sequence 2966. The packing cell selector 2962 functions to select, based on the case size or any other optimization algorithm, the appropriate packing cell 2710 to manage the order fulfilment. Sequence manager 2960, using the packing cell selector 2962, will generate and modify a sequence 2966 of cases constructed in the packing cell 2710. The conveyor director 2964, based on input from the packing cell selector 2962, will supply operational signals to conveyors (such as order bin conveyor 2782 and case conveyor 2762) to transport the blanks from case magazine M1-M16 in sequence 2966 to the appropriate packing cell 2710. In operation, the filled order bin 2750 will be directed towards the packing cell 2710, where each corresponding case will transported by the conveyor 2762 to the packing station 2718.

The conveyor director can define a path, i.e. a set of conveyors to be traversed for the case or bin to take to reach the appropriate packing cell. At intersections of conveyors, the system may include a diverter mechanism, to divert a bin or case from one conveyor path to a next conveyor path.

FIG. 38 is an example of sequence 2966 for a chosen packing cell 3314 managed by the sequence manager 2960. As depicted, the sequence 2966 is a list to track the filled order bins 2750, and the properties of the corresponding erected case 2726. Sequence manager 2960 will generate an individual sequence 2966 for each packing cell 2710 in the order packing system 2700. The sequence 2966 may be linked to product dimension repository 2912 and order repository 2914 within a database schema of order tracker 2910.

As new orders 3302 having bins 3304 enter the order packing system 2700, the sequence manager 2960 can add the order 3302 to the sequence 2966 for the chosen packing cell 3314. As completed cases 2734 and empty order bins 2752 leave the chosen packing cell 3314, sequence manager 2960 can remove the order 3302 from the sequence 2966. In the same order as the sequence 2966, the filled order bins 2750 will be delivered by order staging subsystem 2780 to the chosen packing cell 3314. Similarly, in the same order as the sequence 2966, the chosen packing cell 3314 will be given operational parameters for the order 3302, such as case size 3308, dunnage type 3310, dunnage length 3312.

Figure 39:
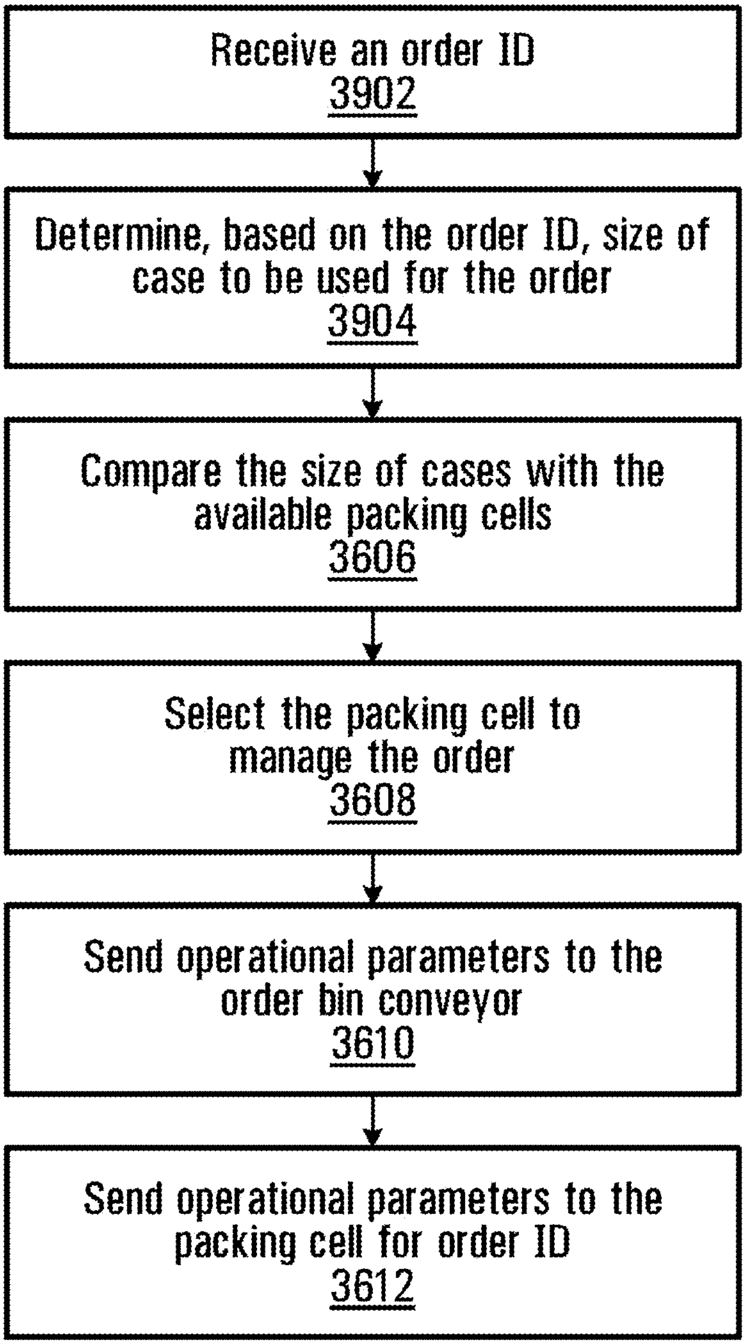
FIG. 39 is a flowchart showing an example method of use of the sequence manager.

FIG. 39 is an example method 3900 for the use of the sequence manager 2960.

At block 3902, an order ID 3302 corresponding to a filled bin on order bin conveyor 2782 is selected.

Next, at block 3904, the size of case to be used for the order is determined. This can be done using a case size selector 2940 and the method as shown in FIG. 36.

Next, at block 3906, the case size for the order from block 3904 is compared with the cases available at each of packing cells 2710. This can be done by case size repository 2942 (FIG. 35) across the different packing cells 2710. The packing cells 2710 that have magazines containing blanks for the case size determined from block 3904 are identified.

Next, at block 3908, a packing cell 2710 to handle the order is selected. According to embodiments where there are multiple packing cells 2710, it is possible that the different packing cells 2710 may be configured based on specific sizes of cases (i.e. a specific packing cell 2710 for smaller cases, and a specific packing cell 2710 for larger cases). Alternatively, in other non-limiting embodiments, the packing cell 2710 selected may be random or evenly distributed.

Next, at block 3910, parameters are sent to the order bin conveyor to direct the filled order bin to the selected packing cell 2710 selected at block 3908. The individual path for the bin across the conveyors will be defined and any instructions for intersection conveyors or diverter mechanisms may also be defined and communicated.

Finally, at block 3912, operational parameters are sent to the packing cell 2710 for the order ID 3302. This can include the case size to construct as determined in block 3904, among any other operational parameters.

Figure 40:
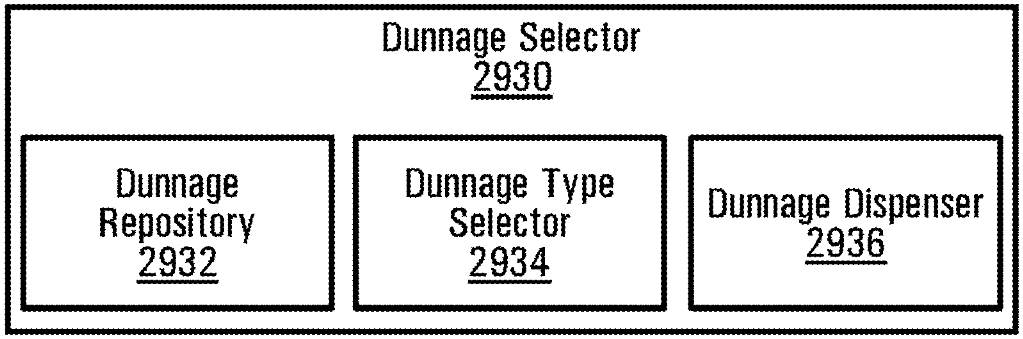
FIG. 40 is software components of a dunnage selector.

FIG. 40 shows components of the dunnage selector 2930. Dunnage selector 2930 includes a dunnage repository 2932, a dunnage type selector 2934 and dunnage dispenser 2936. In operation, an order ID 3302 is provided to dunnage selector 2930. Based on order information such as product dimensions 3208, weights and fragility, a type of dunnage and quantity of dunnage is determined, then dispensed. Examples of dunnage types include bubble wrap, packing peanuts, or loose paper. In some embodiments, dunnage types or quantities may be selected based on customer preference in addition to the product information (such as size or weight). For example paper dunnage may be selected for orders by customers who have expressed a preference for eco-friendly packaging.

The dunnage repository 2932 stores the types of dunnage available to be dispensed, and quantity increments in which it may be dispensed. For example, packing peanuts may be dispensed in defined volume increments and bubble wrap may be dispensed in discrete sheet sizes. Dunnage type selector 2924, based on the information in the order tracker 2910, determines the type and length to be dispensed by the dunnage dispenser 2926 of a packing cell 2710. Determinations by the dunnage selector 2930 can be passed as operational parameters to a packing cell 2710.

Figure 41:
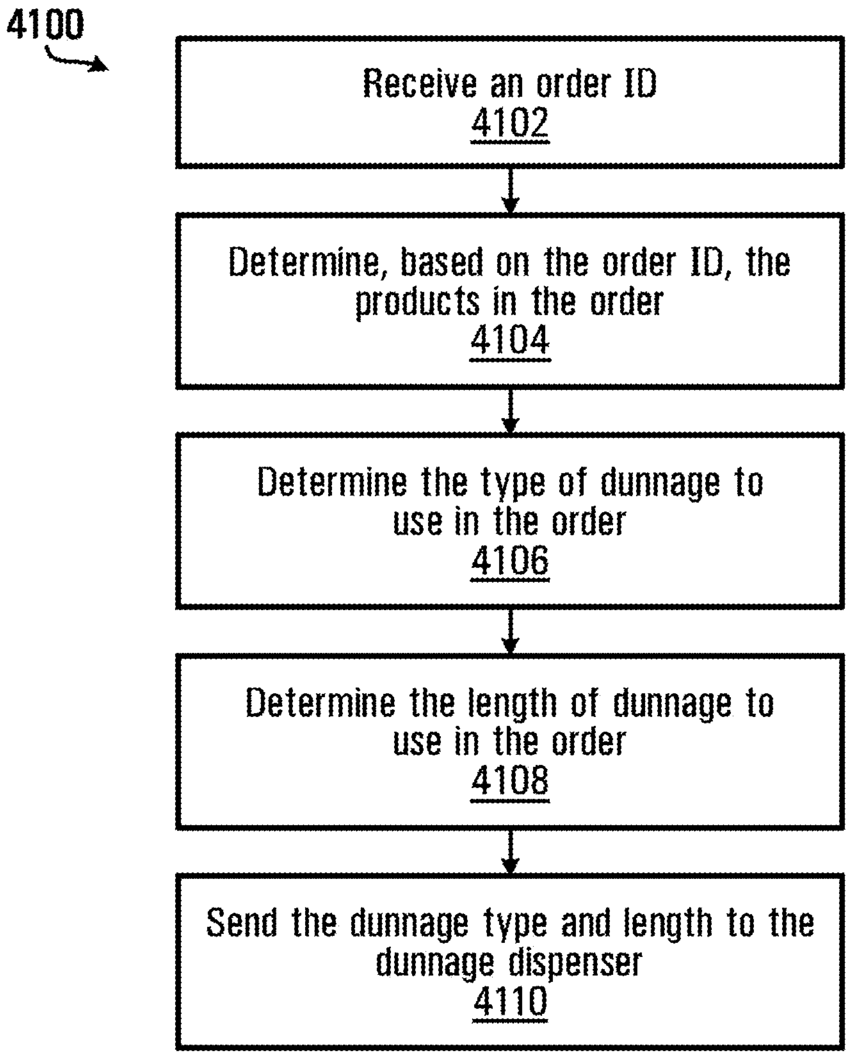
FIG. 41 is a flowchart showing an example method of use of the dunnage selector.

FIG. 41 is an example method 4100 for the use of the dunnage selector 2930.

At block 4102, an order ID 3302 is received.

At block 4104, the products in the order are determined, based on the order ID 3302. This may be done, for example, by querying a database stored in a memory on a network to return all products IDs 3306 associated with the individual order ID 3302. Individual products, as shown in FIG. 32, may themselves have unique identifiers 3206 and individually recorded dimensions 3208. In some embodiments, blocks 4102, 4104 may be performed based on a single instruction message received by dunnage selector 2930. For example, the instruction message may include order ID 3302 along with all of the corresponding record of order repository 3300. Alternatively, an instruction received at 4102 may include only an order ID 3302 and dunnage selector may responsively query for product information from order repository 3300.

At block 4106, the type of dunnage to use in the order is determined. Examples of dunnage types include bubble wrap, packing peanuts, or loose paper. Dunnage types may be selected based on the product information (such as size or weight), or based on information stored in the database about a user who has made the order, for example that they would prefer an eco-friendly dunnage type.

At block 4108, the quantity (e.g. length or volume) of dunnage to use in the order is determined. According to some embodiments, quantity of dunnage to use in the order may be a function of the empty space left in the case, including the space occupied by the products in the order.

Finally, at block 4110, instructions are sent to the packing cell 2710 for the order ID 3302. This can instruct the packing cell 2710 that for each case in the sequence of constructed cases, to dispense the amount and type of dunnage determined by the method 4100.

Figure 42:
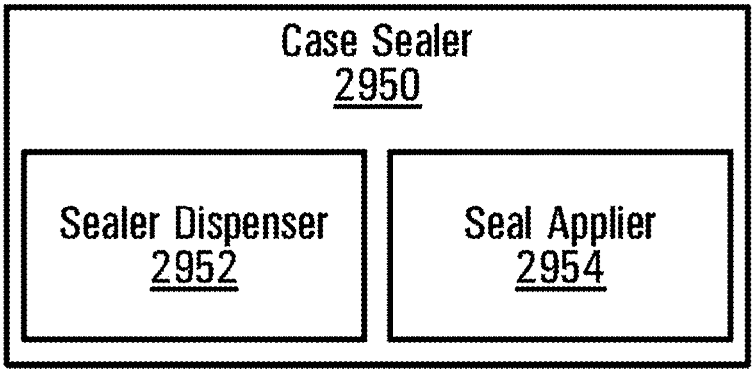
FIG. 42 is software components of a case sealer.

Case sealer 2950, as shown in FIG. 42, operates to seal the constructed cases once they have been filled at packing station 2718. Case sealer 2950 includes sealer dispenser 2952 and seal applier 2954. In operation, seal dispenser 2952 will dispense the appropriate amount of sealing material (such as tape, for example) for the seal applier 2952 to apply to the constructed case.

Case sealer 2950, in operation, will receive an order ID 3302. The order ID 3302 can be used to query a database stored in a memory in a network for additional information. The database can include product information such as weight, or a case size previously determined for the order.

Based on this information, case sealer will determine the appropriate amount of sealing material to dispense. For example, based on the order ID 3302, the case sealer 2950 can determine that the box has a depth of 50 cm, and then instruct the seal dispenser 2952 to dispense 50 cm of tape for the seal applier 2854 to apply.

Figure 43:
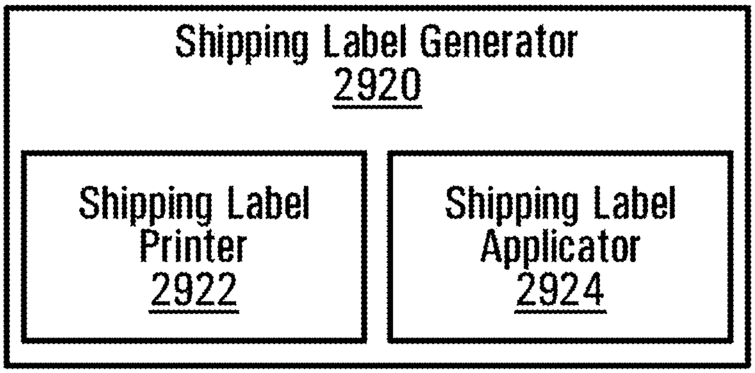
FIG. 43 is software components of a shipping label generator.

Shipping label generator 2920, as shown in FIG. 43, operates to print and apply shipping labels to the sealed cases for shipping. Shipping label generator 2920 includes shipping label printer 2922 and shipping label applicator 2924. In operation, shipping label printer 2922 will print the necessary details, for example a shipping address or bar code, for an order to a paper or sticker that can be applied to the case. Shipping label applicator 2924 will take the printed shipping label and apply the label to the sealed case.

Shipping label generator 2920, in operation, will receive an order ID 3302. The order ID 3302 can be used to query a database stored in a memory (such as the repositories in order tracker 2910) in a network for additional information. The database can include information such as shipping address, shipping type, and any information. Based on this information, shipping label printer 2922 will print the appropriate label for the shipping label applicator 2924 to apply to the case.

Figure 44:
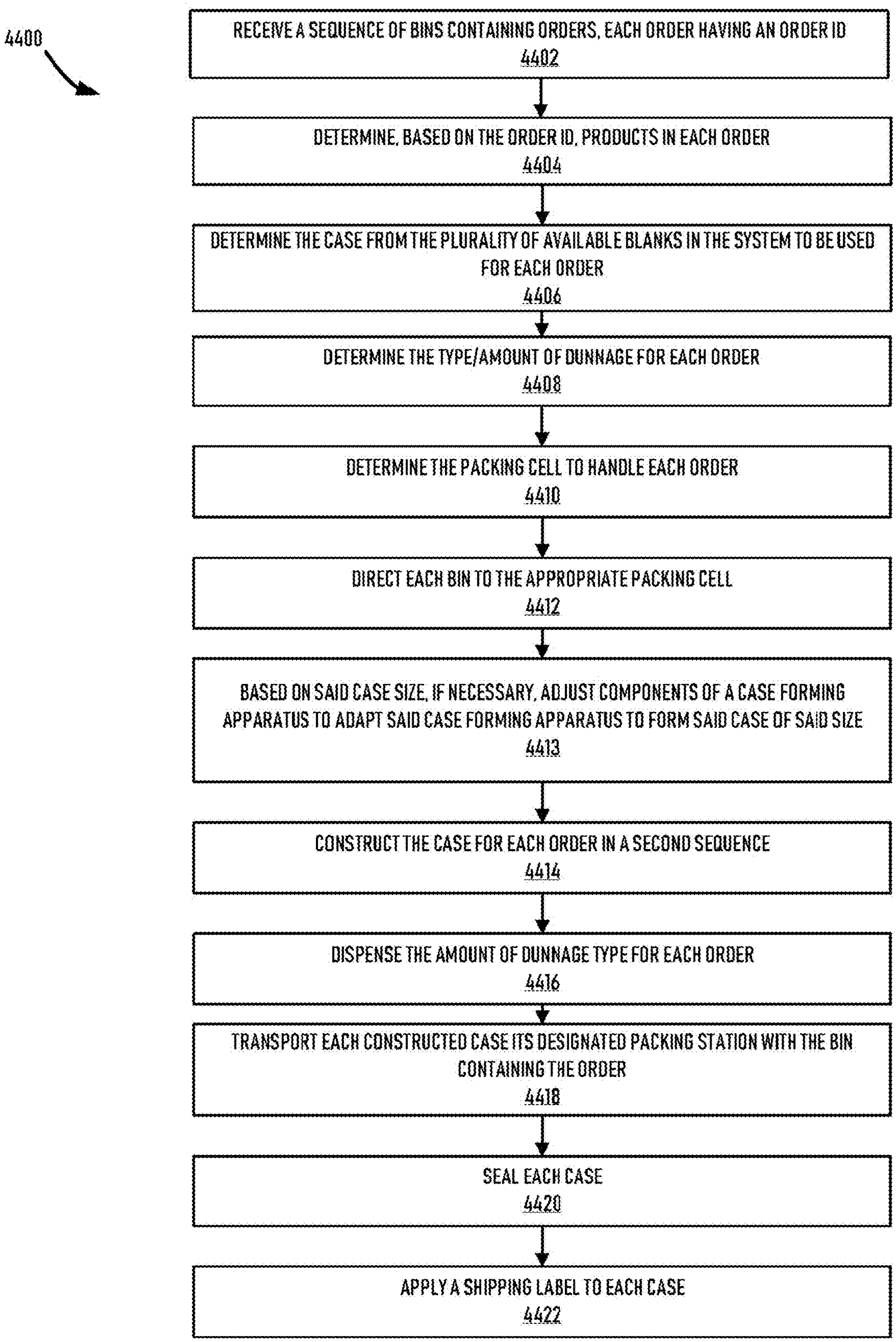
FIG. 44 is a flowchart showing an example method of packing orders.

FIG. 44 is an example method 4400 of packing product orders. The method includes receiving a sequence of bins 4402, determining the products in the order 4404, determining the case to be used for the order 4406, determining the dunnage for the order 4408, determining the packing cell for the order 4410, directing the bin to the packing cell 4412, constructing the case for each order 4414, dispensing the dunnage for each order 4416, transporting the case to the packing station 4418, sealing the case 4420, and applying a shipping label to the case 4422.

At block 4402, a unique sequence of bins containing orders, each order having order ID 3302, are received via order bin conveyor 2782. By querying a database with this order ID 3302, one can determine information about the order, for example the products in the order, their dimensions, their weight, the shipping address for the order, etc.

Accordingly, at block 4404, based on the product ID, products in the order are determined. This can be done by querying a database or repository (such as those in order tracker 2910) for the products in each order.

Next, at block 4406, based on the products in the order, a case from a magazine of blanks is selected for use with the order. This can be done by a case size selector 2940 as described above with reference to the method of FIG. 36. The case size selector 2940 will determine, based on the products in the order determined at block 4404, and the available case sizes to case constructors in packing cells 2710, the appropriate case size to be constructed for the order.

Next, at block 4408, the type and length of dunnage are selected. This can be done by dunnage selector 2930 as described above with reference to the method of FIG. 41. The available case volume from the case determined at block 4406, along with the fragility and weight of the products in the order are considered when selecting the type and amount of dunnage to dispense.

Next, at block 4410, based on the size of case, type of dunnage, and any optimization algorithm, a packing cell 2710 is selected by the sequence manager 2960 for fulfilling the order as described above with reference to the method of FIG. 39. For example, if the size of cases in only available at a specific packing cell 2710, this will be the packing cell 2710 selected.

The determinations of steps 4406, 4408, and 4410, may be given to the order bin conveyor 2782, case conveyor 2724, and packing cell 2710 as operational parameters.

At block 4412, each bin is directed to the appropriate packing cell 2710. According to embodiments where order bin conveyor 2782 comprises multiple sub-conveyors, the path instructions and diversion mechanisms will be defined for delivering the bin to the packing cell 2710. The bins will be delivered in a sequence.

At block 4413, if necessary, components of the modified case forming system 1100 or 5100 are adjusted to adapt the modified case forming system 1100 or 5100 to form the case of the appropriate size. It is noted that components of the modified case forming system 1100 or 5100 may not need to be adjusted in all situations, for example when selected case size is the same or similar to the size of the case most recently constructed prior to the selected case size in the sequence.

According to some embodiments, at block 4413, a position of an alignment component of a case blank alignment device is set so that when said case blank abuts said alignment component, said case blank has a predetermined position.

Additionally or alternatively, at block 4413, based on said size of said case, a stroke of a second alignment component may be adjusted. The first alignment component, according to some embodiments, is a laterally moveable first side guide for abutting a first side of said case blank in order to set a predetermined lateral position of said case blank and wherein the second alignment component is a laterally moveable second side guide for urging said case blank into abutment with said first side guide.

Next, at block 4414, modified case forming system 1100 or 5100 will construct a sequence of cases. The sequence of cases corresponds to the bins being delivered from block 4412. That is, for each order at a particular packing cell 2710, a corresponding case will be constructed of the size determined at block 4406. In operation, a blank will be transported by a conveyor from a magazine storing a plurality of case blanks to a case construction apparatus able to construct cases of various sizes.

Next, at block 4416, the length of dunnage type is dispensed for each order. The case is transported from case construction apparatus to a dunnage dispenser. The length and type of dunnage dispensed into a constructed case will correspond to that determined at block 4408.

At block 4418, the cases is transported to a packing station with the bin containing the order that corresponds to the case. At the packing station, products are transferred from the bin to the constructed case. According to some embodiments, product transfer can be done by a person. According to other embodiments, product transfer can be done by a robotic device.

Next, at block 4420, each case is transported to a case sealer, configured to seal the case with the appropriate amount and type of sealer. The type of seal can be determined based on the case size.

Finally, at block 4422, a shipping label is applied to each case. The shipping label can include information such as the shipping address, a barcode, and any other information required to ship the case.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. An apparatus for use in erecting a first case from a first knock-down blank having a first length L1 and after erecting said first case, erecting a second case from a second knock-down blank having a second length L2 that is a different length than L1, said apparatus comprising:

a knock-down blank feeding apparatus operable to feed a first knock down blank and a second knock down blank to a pick up station;

a shuttle having a bed with a horizontally extending base having base grippers;

shuttle drive apparatus for driving said shuttle in a horizontal advancement direction;

an end effector having end effector grippers;

an end effector movement device for moving said end effector;

a movable edge guide;

a controller operatively associated with said movable edge guide, said shuttle drive apparatus, said end effector movement device and said grippers and configured to:

operate said feeding apparatus to feed a first knock down blank to a pick-up position in which a leading edge abuts said movable edge guide;

operate said movement device and said end effector to grip a top side panel of said first knock-down carton blank and move said first knock down blank and place said first knock-down carton blank on said horizontally extending base of said shuttle such that a bottom side panel of said first knock-down carton blank abuts said horizontally extending base;

activate said base grippers to grip said bottom side panel of said first knock-down blank;

operate said movement device to raise said top side panel of said first knock-down carton blank with said end effector while horizontally advancing said shuttle in order to open said first knock-down carton blank into a first carton sleeve;

adjust the position of said movable edge guide;

operate said feeding apparatus to feed a second knock down blank to a pick-up position in which a leading edge abuts said movable edge guide;

operate said movement device and said end effector to grip a top side panel of said second knock-down carton blank and place said second knock-down carton blank on said horizontally extending base of said shuttle such that a bottom side panel of said second knock-down carton blank abuts said horizontally extending base;

activate said base grippers to grip said bottom side panel of said second knock-down blank;

operate said movement device to raise said top side panel of said second knock-down carton blank with said end effector while horizontally advancing said shuttle in order to open said second knock-down carton blank into a second carton sleeve.

2. The apparatus of claim 1 wherein said bed has an upstanding back wall having back wall grippers, said controller is operatively associated with said back wall grippers, and said controller is further configured to operate said back wall grippers to sequentially grip a further side panel of said first carton sleeve and a further side panel of said second carton sleeve.

3. The apparatus of claim 2 wherein said controller is further configured to, after operating said back wall grippers to grip said further side panels, operate said end effector to sequentially release said top side panels.

4. The apparatus of claim 3 further comprising a pair of horizontally reciprocating ploughs disposed beside said bed and wherein said controller is further configured to, after releasing said top side panel of said knock-down carton blank, advancing said pair of horizontally reciprocating ploughs toward one another to fold minor end flaps of said carton sleeve inwardly toward one another.

5. Apparatus for use in erecting a carton, comprising:

a shuttle having a bed with a horizontally extending base having base grippers;

shuttle drive apparatus for driving said shuttle in a horizontal advancement direction;

an end effector having end effector grippers;

an end effector movement device for moving said end effector;

a controller operatively associated with said shuttle drive apparatus, said end effector movement device and said grippers and configured to:

operate said movement device and end effector to grip a top side panel of a knock-down carton blank and place said knock-down carton blank on said horizontally extending base of said shuttle such that a bottom side panel of said knock-down carton blank abuts said horizontally extending base;

activate said base grippers to grip said bottom side panel of said blank;

operate said movement device to raise said top side panel of said knock-down carton blank with said end effector while horizontally advancing said shuttle in order to open said knock-down carton blank into a carton sleeve.

6. The apparatus of claim 5 wherein said bed has an upstanding back wall having back wall grippers, said controller is operatively associated with said back wall grippers, and said controller is further configured to operate said back wall grippers to grip a further side panel of said carton sleeve.

7. The apparatus of claim 6 wherein said controller is further configured to, after operating said back wall grippers to grip said further side panel, operate said end effector to release said top side panel.

8. The apparatus of claim 6 further comprising a pair of horizontally reciprocating ploughs disposed beside said bed and wherein said controller is further configured to, after releasing said top side panel of said knock-down carton blank, advancing said pair of horizontally reciprocating ploughs toward one another to fold minor end flaps of said carton sleeve inwardly toward one another.

* * * * *